US011634539B2

(12) United States Patent
Allen et al.

(10) Patent No.: US 11,634,539 B2
(45) Date of Patent: Apr. 25, 2023

(54) POLYCARBONATE BLOCK COPOLYMERS AND METHODS THEREOF

(71) Applicant: Saudi Aramco Technologies Company, Dhahran (SA)

(72) Inventors: Scott D. Allen, Fairport, NY (US); Dibyendu Debnath, Rochester, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 609 days.

(21) Appl. No.: 16/580,705

(22) Filed: Sep. 24, 2019

(65) Prior Publication Data

US 2020/0095375 A1 Mar. 26, 2020

Related U.S. Application Data

(60) Provisional application No. 62/875,232, filed on Jul. 17, 2019, provisional application No. 62/735,371, filed on Sep. 24, 2018.

(51) Int. Cl.
| | | |
|---|---|---|
| *C08G 64/18* | (2006.01) | |
| *C08G 64/32* | (2006.01) | |
| *C08G 64/34* | (2006.01) | |
| *B01J 31/14* | (2006.01) | |
| *B01J 31/18* | (2006.01) | |
| *C08G 64/30* | (2006.01) | |

(52) U.S. Cl.
CPC .......... *C08G 64/183* (2013.01); *B01J 31/146* (2013.01); *B01J 31/1805* (2013.01); *C08G 64/30* (2013.01); *C08G 64/34* (2013.01); *B01J 2531/0252* (2013.01); *B01J 2531/845* (2013.01)

(58) Field of Classification Search
CPC ........ C08G 64/18; C08G 64/32; C08G 64/34; C08G 64/183
See application file for complete search history.

(56) References Cited

U.S. PATENT DOCUMENTS

| | | | |
|---|---|---|---|
| 3,248,415 | A | 4/1966 | Stevens et al. |
| 4,686,276 | A | 8/1987 | Myers |
| 4,826,953 | A | 5/1989 | Kuyper et al. |
| 5,637,739 | A | 6/1997 | Jacobsen et al. |
| 5,663,393 | A | 9/1997 | Jacobsen et al. |
| 5,665,890 | A | 9/1997 | Jacobsen et al. |
| 5,929,232 | A | 7/1999 | Jacobsen et al. |
| 6,130,340 | A | 10/2000 | Jacobsen et al. |
| 6,309,997 | B1 | 10/2001 | Fujita et al. |
| 6,639,087 | B2 | 10/2003 | Larrow et al. |
| 6,844,448 | B2 | 1/2005 | Jacobsen et al. |
| 6,884,750 | B2 | 4/2005 | Kim et al. |
| 6,903,043 | B2 | 6/2005 | Kim et al. |
| 7,145,022 | B2 | 12/2006 | Luinstra et al. |
| 7,244,805 | B2 | 7/2007 | Park et al. |
| 7,858,729 | B2 | 12/2010 | Allen |
| 8,163,867 | B2 | 4/2012 | Lee et al. |
| 8,207,365 | B2 | 6/2012 | Zheng et al. |
| 8,232,267 | B2 | 7/2012 | Groves |
| 8,247,520 | B2 | 8/2012 | Allen et al. |
| 8,252,891 | B2 | 8/2012 | Cherian et al. |
| 8,252,955 | B2 | 8/2012 | Gao et al. |
| 8,324,337 | B2 | 12/2012 | Allen |
| 8,461,290 | B2 | 6/2013 | Carpentier et al. |
| 8,470,956 | B2 | 6/2013 | Allen et al. |
| 8,507,733 | B2 | 8/2013 | Ok et al. |
| 8,580,911 | B2 | 11/2013 | Allen et al. |
| 8,598,309 | B2 | 12/2013 | Jeong et al. |
| 8,604,155 | B2 | 12/2013 | Allen et al. |
| 8,642,721 | B2 | 2/2014 | Ok et al. |
| 8,785,591 | B2 | 7/2014 | Allen et al. |
| 8,791,274 | B2 | 7/2014 | Ok et al. |
| 8,921,508 | B2 | 12/2014 | Allen et al. |
| 8,952,104 | B2 | 2/2015 | Allen |
| 9,012,675 | B2 | 4/2015 | Allen et al. |
| 9,023,979 | B2 | 5/2015 | Jeong et al. |
| 9,029,498 | B2 | 5/2015 | Allen et al. |
| 9,102,800 | B2 | 8/2015 | Allen et al. |
| 9,376,531 | B2 | 6/2016 | Allen et al. |

(Continued)

FOREIGN PATENT DOCUMENTS

| | | |
|---|---|---|
| CN | 105542142 B | 6/2017 |
| CN | 107868239 A | 4/2018 |

(Continued)

OTHER PUBLICATIONS

Cohen, C.T. et al., Cobalt catalysts for the alternating copolymerization of propylene oxide and carbon dioxide: Combining high activity and selectivity, Journal of the American Chemical Society, 127:10869-10878 (2005).
International Search Report for PCT/US2019/052656, 5 pages (dated Dec. 6, 2019).
Written Opinion for PCT/US2019/052656, 9 pages (dated Dec. 6, 2019).
ASTM D4273-99. Standard Test Methods for Polyurethane Raw Materials: Determination of Primary Hydroxyl Content of Polyether Polyols, 7 pages (retrieved Jun. 27, 2019).
Chisholm, M.H. and Zhou , Z., Concerning the Mechanism of the Ring Opening of Propylene Oxide in the Copolymerization of Propylene Oxide and Carbon Dioxide To Give Poly(propylene carbonate), J. Am. Chem. Soc., 126: 11030-11039 (2004).

(Continued)

*Primary Examiner* — Caixia Lu
(74) *Attorney, Agent, or Firm* — Charles E. Lyon; John P. Rearick; Michael A. Shinall

(57) ABSTRACT

The present disclosure relates to block copolymers comprising, and methods of making thereof, a polycarbonate chain linked to a hydrophilic polymer. Such block copolymers may have the formula B-A-B, where A is a polycarbonate or polyethercarbonate chain and B is a polyether. Provided methods are useful in reducing the amount of waste generated from the synthesis of polycarbonates and provide improved thermal stability and high primary hydroxyl content. Provided block copolymers also have utility as additives in enhanced oil recovery methods, and foam polymer applications.

15 Claims, 16 Drawing Sheets

(56) References Cited

U.S. PATENT DOCUMENTS

| | | |
|---|---|---|
| 9,388,277 B2 | 7/2016 | Farmer |
| 9,399,701 B2 | 7/2016 | Allen et al. |
| 9,422,397 B2 | 8/2016 | Allen et al. |
| 9,453,100 B2 | 9/2016 | Allen et al. |
| 9,512,259 B2 | 12/2016 | Allen et al. |
| 9,809,678 B2 | 11/2017 | Allen et al. |
| 9,834,710 B2 | 12/2017 | Allen et al. |
| 9,850,345 B2 | 12/2017 | Farmer |
| 9,868,816 B2 | 1/2018 | Allen et al. |
| 9,884,937 B2 | 2/2018 | Allen et al. |
| 9,994,760 B2 | 6/2018 | Allen et al. |
| 10,047,188 B2 | 8/2018 | Allen et al. |
| 10,138,369 B2 | 11/2018 | Allen et al. |
| 10,301,426 B2 | 5/2019 | Allen et al. |
| 10,308,759 B2 | 6/2019 | Simoneau |
| 10,351,654 B2 | 7/2019 | Allen et al. |
| 10,392,556 B2 | 8/2019 | Allen et al. |
| 10,428,173 B2 | 10/2019 | Allen et al. |
| 2006/0089252 A1 | 4/2006 | Coates et al. |
| 2010/0256329 A1 | 10/2010 | Nozaki et al. |
| 2013/0274401 A1 | 10/2013 | Allen et al. |
| 2013/0296450 A1 | 11/2013 | Hofmann et al. |
| 2014/0249279 A1 | 9/2014 | Williams et al. |
| 2015/0344751 A1 | 12/2015 | Allen et al. |
| 2016/0115288 A1 | 4/2016 | Waddington |
| 2017/0240702 A1 | 8/2017 | Raghuraman et al. |
| 2019/0100648 A1 | 4/2019 | Allen et al. |
| 2019/0233586 A1 | 8/2019 | Allen et al. |
| 2019/0322802 A1 | 10/2019 | Eagan et al. |

FOREIGN PATENT DOCUMENTS

| | | |
|---|---|---|
| EP | 0222453 A2 | 5/1987 |
| EP | 0403313 A2 | 12/1990 |
| EP | 2258745 A1 | 12/2010 |
| EP | 2146977 B1 | 11/2012 |
| EP | 2257559 B1 | 10/2014 |
| JP | 2008-081518 | 4/2008 |
| JP | 2008-280399 A | 11/2008 |
| WO | WO-98/04538 A1 | 2/1998 |
| WO | WO-99/00444 A1 | 1/1999 |
| WO | WO-2008/136591 A1 | 11/2008 |
| WO | WO-2009/148889 A2 | 12/2009 |
| WO | WO-2010/013948 A2 | 2/2010 |
| WO | WO-2010/022388 A2 | 2/2010 |
| WO | WO-2010/028362 A1 | 3/2010 |
| WO | WO-2010/033703 A1 | 3/2010 |
| WO | WO-2010/033705 A1 | 3/2010 |
| WO | WO-2010/062703 A1 | 6/2010 |
| WO | WO-2010/147421 A2 | 12/2010 |
| WO | WO-2011/005664 A2 | 1/2011 |
| WO | WO-2012/027725 A1 | 3/2012 |
| WO | WO-2012/037282 A2 | 3/2012 |
| WO | WO-2012/071505 A1 | 5/2012 |
| WO | WO-2012/094619 A1 | 7/2012 |
| WO | WO-2012/154849 A1 | 11/2012 |
| WO | WO-2013/012895 A1 | 1/2013 |
| WO | WO-2013/016331 A2 | 1/2013 |
| WO | WO-2013/022932 A1 | 2/2013 |
| WO | WO-2013/096602 A1 | 6/2013 |
| WO | WO-2013/158621 A1 | 10/2013 |
| WO | WO-2013/177546 A2 | 11/2013 |
| WO | WO-2014/031811 A1 | 2/2014 |
| WO | WO-2014/074706 A1 | 5/2014 |
| WO | WO-2014/186397 A1 | 11/2014 |
| WO | WO-2015/154001 A1 | 10/2015 |
| WO | WO-2016/012785 A1 | 1/2016 |
| WO | WO-2016/012786 A1 | 1/2016 |
| WO | WO-2016/064698 A1 | 4/2016 |
| WO | WO-2019/204553 A1 | 10/2019 |
| WO | WO-2020/068796 A9 | 7/2020 |

OTHER PUBLICATIONS

Chisholm, M.H. et al., Poly(propylene carbonate). 1. More about Poly(propylene carbonate) Formed from the Copolymerization of Propylene Oxide and Carbon Dioxide Employing a Zinc Glutarate Catalyst, Macromolecules, 35: 6494-6504 (2002).

Fu, S. et al., Propylene oxide end-capping route to primary hydroxyl group dominated CO2-polyol, Polymer, 153: 167-172 (2018).

Grasa, G. A. et al., Transesterification/Acylation Reactions Catalyzed by Molecular Catalysts, Synthesis, 7, 971-985 (2004).

Inoue, S., Immortal Polymerization: The Outset, Development, and Application, Journal of Polymer Science: Part A: Polymer Chemistry, 38: 2861-2871 (2000).

International Search Report for PCT/US2019/028035, 4 pages (dated Jul. 29, 2019).

Ionescu, M., Chemistry and Technology of Polyols for Polyurethanes, Rapra Technology Limited, 605 pages (2005).

Lu, X-B. and Wang, Y., Highly Active, Binary Catalyst Systems for the Alternating Copolymerization of CO2 and Epoxides under Mild Conditions, Angew. Chem. Int. Ed., 43: 3574-3577 (2004).

Nakano, K. et al., Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).

Nakano, K. et al., Supporting Information, 12 pages (2006). Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).

Noordover, B.A.J., Biobased step-growth polymers: chemistry, functionality and applicability, Eindhoven University of Technology, 219 pages (Published Jan. 1, 2008). [Download date Apr. 20, 2018].

Otera, J., Transesterification, Chem. Rev., 93(4): 1449-1470 (1993).

Smith, C. P. et al., Thermoplastic Polyurethane Elastomers Made from High Molecular Weight POLY-L® Polyols, Journal of Elastomers and Plastics, 24: 306-322 (1992).

Sujith et al., A Highly Active and Recyclable Catalytic System for CO2/Propylene Oxide Copolymerization, Angew. Chem. Int. Ed., 47: 7306-7309 (2008).

Sujith et al., A Highly Active and Recyclable Catalytic System for CO2/Propylene Oxide Copolymerization, Angew. Chem. Int. Ed., 47: 7306-7309 (2008). Supporting Information.

Taherimehr, M. and Pescarmona, P.P., Green Polycarbonates Prepared by the Copolymerization of CO2 with Epoxides, J. Appl. Polym. Sci., 41141: 1-7 (2014).

Van Meerendonk, W.J. et al, Unexpected Side Reactions and Chain Transfer for Zinc-Catalyzed Copolymerization of Cyclohexene Oxide and Carbon Dioxide, Macromolecules, 38: 7306-7313 (2005).

Wei, R-J. et al., Highly Regioselective and Alternating Copolymerization of Racemic Styrene Oxide and Carbon Dioxide via Heterogeneous Double Metal Cyanide Complex Catalyst, Macromolecules, 46: 3693-3697 (2013).

Written Opinion for PCT/US2019/028035, 8 pages (dated Jul. 29, 2019).

POLYCARBONATE BLOCK COPOLYMERS AND METHODS THEREOF

CROSS-REFERENCE TO RELATED APPLICATIONS

The present application claims priority to U.S. Provisional Patent Application Nos. 62/735,371, filed Sep. 24, 2018, and 62/875,232, filed Jul. 17, 2019, the entirety of each of which is incorporated by reference in its entirety.

BACKGROUND

Certain types of polycarbonate polyols have inherently high viscosity. One method for reducing viscosity is to initiate polymerization of such polyols with low viscosity polyether polyols. The resultant block copolymer polyols have a polyether core off of which polycarbonate is built. While this is an effective method for decreasing polycarbonate viscosity, it typically relies on the use of commercially available polyether polyol which becomes a large weight percentage of the final product. Furthermore, commercial polyether polyols typically contain anti-oxidants which can poison polycarbonate catalysts, therefore requiring the production of custom batches of polyether starters.

SUMMARY OF THE INVENTION

The present disclosure encompasses the recognition that a useful approach to the preparation of polycarbonate-polyether triblock copolymers is one which avoids the use of commercial polyether starters. The present disclosure solves the problems associated with traditional preparation of polycarbonate-polyether block copolymers that can result in polymer compositions having a high proportion of secondary hydroxyl end groups. The present disclosure provides, among other things, polycarbonate-polyether triblock copolymers using a low molecular weight starter (e.g. dipropylene glycol) in the copolymerization of epoxide and carbon dioxide, followed by addition of a second catalyst to facilitate polyether synthesis. In this case, a triblock copolymer is still formed, but with a polycarbonate core (block A) and polyether built off the ends (block B) (i.e., B-A-B). In some embodiments, i) copolymerization of epoxide and carbon dioxide, and ii) polyether synthesis are carried out in discrete reaction pots (i.e. the polycarbonate product of the copolymerization of epoxide and carbon dioxide is first isolated). In some embodiments, the copolymerization of epoxide and carbon dioxide and polyether synthesis are carried out in a single reactor. In some embodiments, the polycarbonate core (i.e., block A) of said triblock copolymers is polypropylene carbonate (PPC). In some embodiments, the PPC core is end-blocked (i.e., block B) with polypropylene glycol (PPG).

A one-pot approach has the advantage of consuming residual, unreacted epoxides that would typically be sent to waste or recycled. Furthermore, methods provided herein result in a block copolymer with protection of the chain-ends of a polycarbonate polyol core, increasing its thermal stability by preventing the polycarbonate polyol from unzipping and generating cyclic carbonate by-products (by virtue of the polyether end-blocking for polycarbonate back-biting reactions). Even further, with careful consideration of which catalysts are used to facilitate polymerization, methods provided herein can yield polycarbonate end-blocked with polyether having increased primary hydroxyl end-group content relative to either a i) polycarbonate homopolymer or a ii) polyether end-blocked with polycarbonate. Such increased primary hydroxyl end-group content is useful for the production of, for example polyurethane materials. Even further, polycarbonate end-blocked with polyether triblock copolymer products resulting from methods disclosed herein may exhibit reduced viscosity, especially relative to polyether end-blocked with polycarbonate.

In some embodiments, the present disclosure relates to a method of making a triblock copolymer of the formula B-A-B. In some embodiments, A is a polycarbonate chain. In some embodiments, B is a polyether chain.

In some embodiments, the present disclosure relates to a method of making triblock copolymer compositions of the formula B-A-B, comprising the steps of:
  i) copolymerizing epoxide and carbon dioxide in the presence of a chain transfer agent and a first catalyst to provide a first polymer A; and
  ii) homopolymerizing epoxide on the chain ends of the first polymer A by addition of a second catalyst to provide a second polymer, B-A-B.

In some embodiments, a triblock copolymer composition provided by such methods comprises a structure of formula P1:

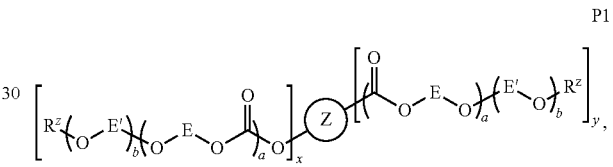

wherein:

Ⓩ is a multivalent moiety;

-E- is, independently at each position in the polymer chain,

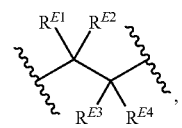

-E'- is, independently at each position in the polymer chain,

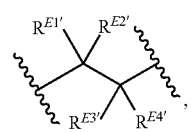

$R^{E1}$, $R^{E2}$, $R^{E3}$, and $R^{E4}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1}$, $R^{E2}$, $R^{E3}$, and $R^{E4}$ may optionally be taken together with intervening atoms to form one or more optionally substituted rings optionally containing one or more heteroatoms;

$R^{E1'}$, $R^{E2'}$, $R^{E3'}$ and $R^{E4'}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1'}$, $R^{E2'}$, $R^{E3'}$ and $R^{E4'}$ may optionally be taken together with intervening atoms to form one or more optionally substituted rings optionally containing one or more heteroatoms;

each $R^z$ is independently selected from the group consisting of —H, —$R^{z10}$, —C(O)$R^{z10}$, —$SO_2R^{z10}$, —Si($R^{z10}$)$_3$, —Si(O$R^{z10}$)$_3$, —Si$R^{z10}$(O$R^{z10}$)$_2$, and —C(O)NH($R^{z10}$);

each $R^{z10}$ is independently an optionally substituted moiety selected from the group consisting of $C_{1-20}$ aliphatic, $C_{1-12}$ heteroaliphatic, 6- to 14-membered aryl, and 5- to 14-membered heteroaryl;

a is, on average in the composition, about 2 to about 50;

b is, on average in the composition, about 2 to about 50; and x and y are each independently an integer from 0 to 6 inclusive, where the sum of x and y is between 2 and 6.

DETAILED DESCRIPTION OF CERTAIN EMBODIMENTS

Definitions

Figure 1A:
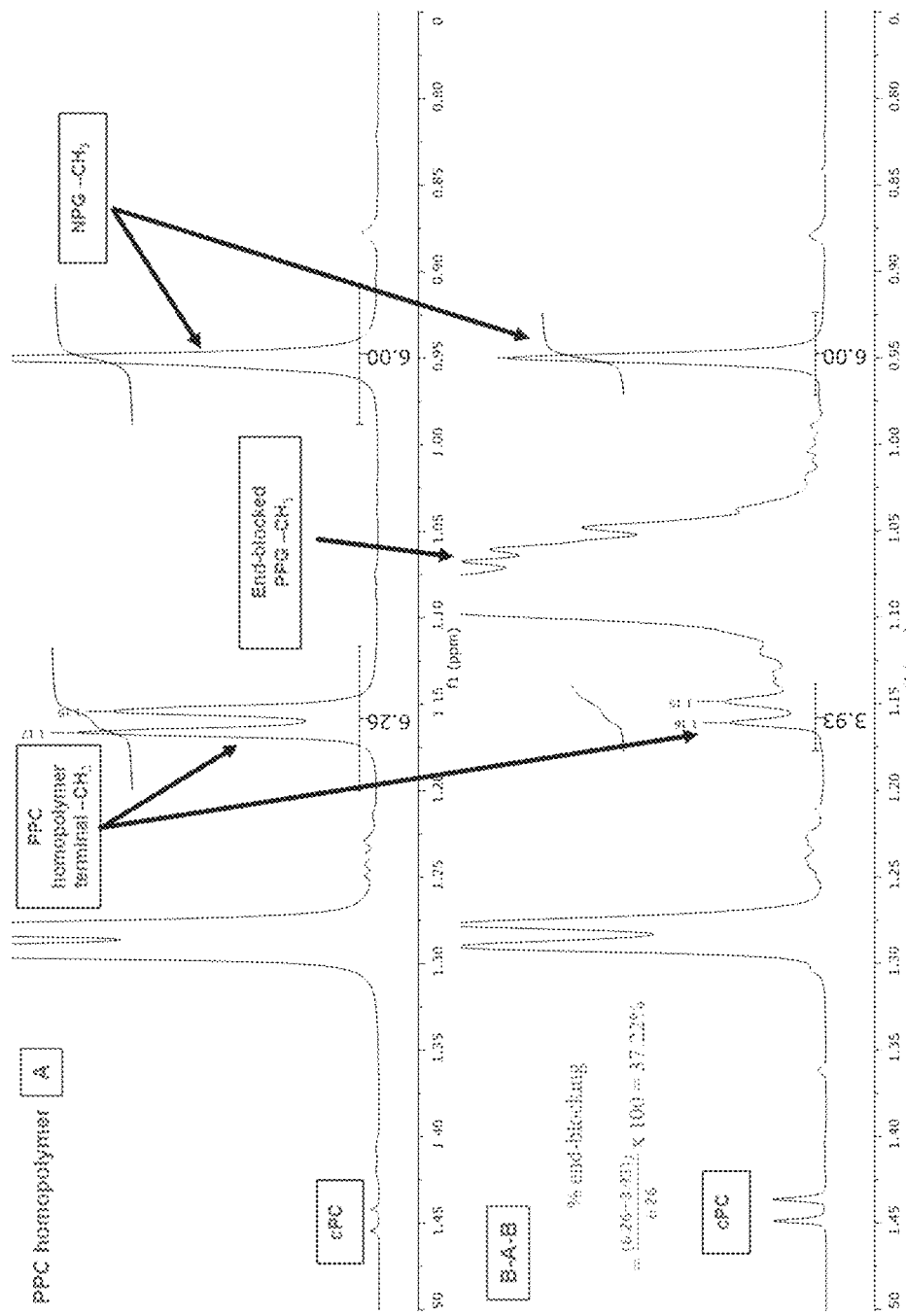
FIGS. 1A and 1B. Exemplary $^1$H NMR spectrum of a PPG end-blocked PPC triblock co-polymer. The efficiency of PPG end-blocking of PPC can be determined by $^1$H-NMR. In such spectra, terminal methyl protons of PPC appear as a doublet peak; upon end-blocking with PPG the area under that peak reduces proportionately. Therefore, end-blocking efficiency can be calculated from the peak area reduction. Methyl protons from the neopentyl glycol starter do not change during the process of end-blocking and can be used as an internal standard.

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain polymers of the present invention can comprise one or more asymmetric centers, and thus can exist in various stereoisomeric forms, e.g., enantiomers and/or diastereomers. Thus, inventive polymers and compositions thereof may be in the form of an individual enantiomer, diastereomer or geometric isomer, or may be in the form of a mixture of stereoisomers. In certain embodiments, the polymers of the invention are enantiopure compounds. In certain embodiments, mixtures of enantiomers or diastereomers are provided.

Furthermore, certain polymers, as described herein may have one or more double bonds that can exist as either the Z or E isomer, unless otherwise indicated. The invention additionally encompasses the polymers as individual isomers substantially free of other isomers and alternatively, as mixtures of various isomers, e.g., racemic mixtures of enantiomers. In addition to the above-mentioned polymers per se, this invention also encompasses compositions comprising one or more polymers.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units or polymer blocks separated by a slash may be used herein:

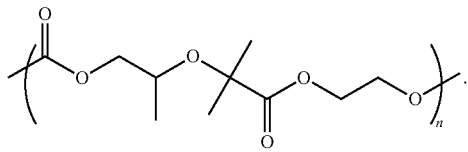

These structures are to be interpreted to encompass copolymers incorporating any ratio of the different monomer units depicted unless otherwise specified. This depiction is also meant to represent random, tapered, block copolymers, and combinations of any two or more of these and all of these are implied unless otherwise specified.

The term "multivalent", as used herein, refers to a moiety that is bound to two or more polymer blocks (e.g., a bivalent, trivalent, or tetravalent moiety. For example, a multivalent moiety can be bivalent, e.g.:

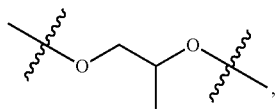 [SMILES: *OCC(C)O*]

trivalent, e.g.:

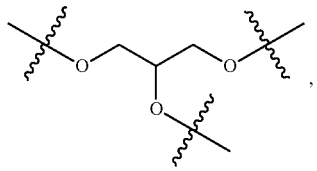 [SMILES: *OCC(CO*)O*]

or tetravalent, e.g.:

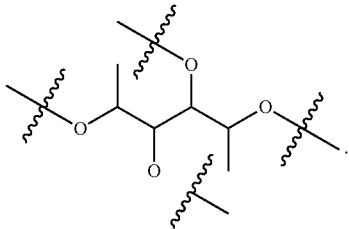

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 2-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated, or partially unsaturated groups.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring system, as described herein, having from 3 to 12 members, wherein the aliphatic ring system is optionally substituted as defined below and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, a cycloaliphatic group has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like, where the radical or point of attachment is on the aryl ring. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroaryl" may be used interchangeably with the terms "heteroaryl ring" and "heteroaryl group", any of which terms include rings that are optionally substituted. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaryl ring is fused to one or more aryl, cycloaliphatic, or heterocyclyl rings, where the radical or point of attachment is on the heteroaryl ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur.

As used herein, the terms "heterocycle", "heterocyclyl", "heterocyclic radical", "heterocyclyl", "heterocyclyl ring", ""heterocyclic moiety" and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. Heterocyclic rings also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; $-(CH_2)_{0-4}R^\circ$; $-(CH_2)_{0-4}OR^\circ$; $-O-(CH_2)_{0-4}C(O)OR^\circ$; $-(CH_2)_{0-4}CH(OR^\circ)_2$; $-(CH_2)_{0-4}SR^\circ$; $-(CH_2)_{0-4}Ph$, which may be substituted with $R^\circ$; $-(CH_2)_{0-4}O(CH_2)_{0-1}Ph$ which may be substituted with $R^\circ$; $-CH=CHPh$, which may be substituted with $R^\circ$; $-NO_2$; $-CN$; $-N_3$; $-(CH_2)_{0-4}N(R^\circ)_2$; $-(CH_2)_{0-4}N(R^\circ)C(O)R^\circ$; $-N(R^\circ)C(S)R^\circ$; $-(CH_2)_{0-4}N(R^\circ)C(O)NR^\circ_2$; $-N(R^\circ)C(S)NR^\circ_2$; $-(CH_2)_{0-4}N(R^\circ)C(O)OR^\circ$; $-N(R^\circ)N(R^\circ)C(O)R^\circ$; $-N(R^\circ)N(R^\circ)C(O)NR^\circ_2$; $-N(R^\circ)N(R^\circ)C(O)OR^\circ$; $-(CH_2)_{0-4}C(O)R^\circ$; $-C(S)R^\circ$; $-(CH_2)_{0-4}C(O)OR^\circ$; $-(CH_2)_{0-4}C(O)N(R^\circ)_2$; $-(CH_2)_{0-4}C(O)SR^\circ$; $-(CH_2)_{0-4}C(O)OSiR^\circ_3$; $-(CH_2)_{0-4}OC(O)R^\circ$; $-OC(O)(CH_2)_{0-4}SR^\circ$; $-SC(S)SR^\circ$; $-(CH_2)_{0-4}SC(O)R^\circ$; $-(CH_2)_{0-4}C(O)NR^\circ_2$; $-C(S)NR^\circ_2$; $-C(S)SR^\circ$; $-(CH_2)_{0-4}OC(O)NR^\circ_2$; $-C(O)N(OR^\circ)R^\circ$; $-C(O)C(O)R^\circ$; $-C(O)CH_2C(O)R^\circ$; $-C(NOR^\circ)R^\circ$; $-(CH_2)_{0-4}SSR^\circ$; $-(CH_2)_{0-4}S(O)_2R^\circ$; $-(CH_2)_{0-4}S(O)_2OR^\circ$; $-(CH_2)_{0-4}OS(O)_2R^\circ$; $-S(O)_2NR^\circ_2$; $-(CH_2)_{0-4}S(O)R^\circ$; $-N(R^\circ)S(O)_2NR^\circ_2$; $-N(R^\circ)S(O)_2R^\circ$; $-N(OR^\circ)R^\circ$; $-C(NH)NR^\circ$; $-P(O)_2R^\circ$; $-P(O)R^\circ$; $-OP(O)R^\circ_2$; $-OP(O)(OR^\circ)_2$; $SiR^\circ_3$; $-(C_{1-4}$ straight or branched alkylene)$O-N(R^\circ)_2$; or $-(C_{1-4}$ straight or branched alkylene)$C(O)O-N(R^\circ)_2$, wherein each $R^\circ$ may be substituted as defined below and is independently hydrogen, $C_{1-8}$ aliphatic, $-CH_2Ph$, $-O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of $R^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R^\circ$ (or the ring formed by taking two independent occurrences of $R^\circ$ together with their intervening atoms), are independently halogen, $-(CH_2)_{0-2}R^\bullet$, -(haloR$^\bullet$), $-(CH_2)_{0-2}OH$, $-(CH_2)_{0-2}OR^\bullet$, $-(CH_2)_{0-2}CH(OR^\bullet)_2$; $-O(haloR^\bullet)$, $-CN$, $-N_3$, $-(CH_2)_{0-2}C(O)R^\bullet$, $-(CH_2)_{0-2}C(O)OH$, $-(CH_2)_{0-2}C(O)OR^\bullet$, $-(CH_2)_{0-4}C(O)N(R^\circ)_2$; $-(CH_2)_{0-2}SR^\bullet$, $-(CH_2)_{0-2}SH$, $-(CH_2)_{0-2}NH_2$, $-(CH_2)_{0-2}NHR^\bullet$, $-(CH_2)_{0-2}NR^\bullet_2$, $-NO_2$, $-SiR^\bullet_3$, $-OSiR^\bullet_3$, $-C(O)SR^\bullet$, $-(C_{1-4}$ straight or branched alkylene)$C(O)OR^\bullet$, or $-SSR^\bullet$ wherein each $R^\bullet$ is unsubstituted or where preceded by "halo" is substituted only with one or more halogens, and is independently selected from $C_{1-4}$ aliphatic, $-CH_2Ph$, $-O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^\circ$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, $-O(C(R*_2))_{2-3}O-$, or $-S(C(R*_2))_{2-3}S-$, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: $-O(CR*_2)_{2-3}O-$, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, $-R^\bullet$, -(haloR$^\bullet$), $-OH$, $-OR^\bullet$, $-O(haloR^\bullet)$, $-CN$, $-C(O)OH$, $-C(O)OR^\bullet$, $-NH_2$, $-NHR^\bullet$, $-NR^\bullet_2$, or $-NO_2$, wherein each $R^\bullet$ is unsubstituted or where preceded by "halo" is substituted only with one or more halogens, and is independently $C_{1-4}$ aliphatic, $-CH_2Ph$, $-O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include $-R^\dagger$, $-NR^\dagger_2$, $-C(O)R^\dagger$, $-C(O)OR^\dagger$, $-C(O)C(O)R^\dagger$, $-C(O)CH_2C(O)R^\dagger$, $-S(O)_2R^\dagger$, $-S(O)_2NR^\dagger_2$, $-C(S)NR^\dagger_2$, $-C(NH)NR^\dagger_2$, or $-N(R^\dagger)S(O)_2R^\dagger$; wherein each $R^\dagger$ is independently hydrogen, $C_{1-6}$ aliphatic which may be substituted as defined below, unsubstituted $-OPh$, or an unsubstituted 5-6-membered saturated, partially unsaturated, or aryl ring having 0-4 heteroatoms independently selected from nitrogen, oxygen, or sulfur, or, notwithstanding the definition above, two independent occurrences of $R^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^†$ are independently halogen, —$R^•$, -(halo$R^•$), —OH, —O$R^•$, —O(halo$R^•$), —CN, —C(O)OH, —C(O)O$R^•$, —NH$_2$, —NHR$^•$, —NR$^•_2$, or —NO$_2$, wherein each $R^•$ is unsubstituted or where preceded by "halo" is substituted only with one or more halogens, and is independently $C_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain, wherein a repeating unit is an enchained diad of an epoxide and a carbon dioxide. For example, in the context of poly(propylene carbonate) (PPC), the term head-to-tail is based on the three regiochemical possibilities depicted below:

including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

Unless otherwise specified, "a," "an," "the," and "at least one" are used interchangeably and mean one or more than one.

Methods

Triblock Copolymers

In some embodiments, the present disclosure relates to a method of making a triblock copolymer of the formula B-A-B. In some embodiments, A is an oligomer selected from a polycarbonate or polyethercarbonate chain. In some embodiments, A is a polycarbonate chain. In some embodiments, A is a polyethercarbonate chain. In some embodiments, B is a hydrophilic oligomer. In some embodiments, B is a polyether chain.

It is understood that, while "triblock copolymers" are referred to generally herein, such "triblock" and other embodiments of the present disclosure are intended to encompass block copolymers generally, which are not limited to B-A-B (i.e., a copolymer having three "blocks"), but instead, depending upon the valency of an A "block", are intended to encompass tri-, tetra-, penta-, hexa-, and heptablock copolymers, for example:

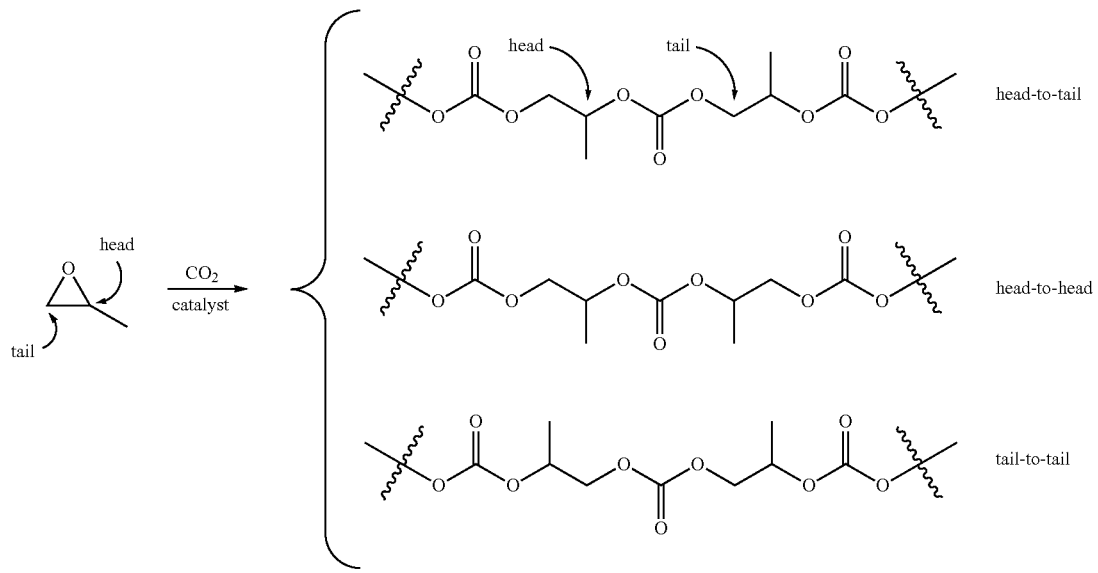

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements

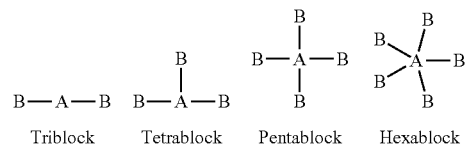

-continued

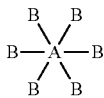

Heptablock

Moreover, the "triblock copolymers" referred to herein can also refer to block copolymers such as repeating block copolymers (e.g., a B-A-B-A) or block copolymers having multiple types of blocks (e.g., A-B-C, or A-B-A-B-C).

In some embodiments, the present disclosure relates to a method of making triblock copolymer compositions of the formula B-A-B, comprising the steps of:
i) copolymerizing epoxide and carbon dioxide in the presence of a chain transfer agent and a first catalyst to provide a first polymer A; and
ii) homopolymerizing epoxide on the chain ends of the first polymer A by addition of a second catalyst to provide a second polymer, B-A-B.

It is understood that the terms "copolymerizing epoxide" and "homopolymerizing epoxide" are intended to refer to "copolymerizing a first epoxide" and "homopolymerizing a second epoxide" in each instance referred to herein. In some embodiments, a first epoxide and a second epoxide are the same. In some embodiments, a first epoxide and a second epoxide are different. In some embodiments, a first epoxide is a composition comprising one or more epoxides. In some embodiments, a second epoxide is a composition comprising one or more epoxides.

In some embodiments, the step of copolymerizing epoxide and carbon dioxide in the presence of a chain transfer agent and a first catalyst to create a first polymer A, incorporates at least one type of epoxide into the first polymer. In some embodiments, the step of copolymerizing epoxide and carbon dioxide in the presence of a chain transfer agent and a first catalyst to create a first polymer A, incorporates at least two types of epoxide into the first polymer. In some embodiments, the step of copolymerizing epoxide and carbon dioxide in the presence of a chain transfer agent and a first catalyst to create a first polymer A, incorporates at least three types of epoxide into the first polymer.

In some embodiments, the step of copolymerizing epoxide and carbon dioxide in the presence of a chain transfer agent and a first catalyst to create a first polymer A, incorporates one type of epoxide into the first polymer. In some embodiments, the step of copolymerizing epoxide and carbon dioxide in the presence of a chain transfer agent and a first catalyst to create a first polymer A, incorporates two types of epoxide into the first polymer. In some embodiments, the step of copolymerizing epoxide and carbon dioxide in the presence of a chain transfer agent and a first catalyst to create a first polymer A, incorporates three types of epoxide into the first polymer.

In some embodiments, the step of copolymerizing epoxide and carbon dioxide in the presence of a chain transfer agent and a first catalyst to create a first polymer A, incorporates epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

In some embodiments, A is a polycarbonate chain. In some embodiments, a polycarbonate chain, A, is characterized in that A comprises greater than about 80%, greater than about 90%, greater than about 95%, greater than about 98%, or greater than about 99% carbonate linkages, relative to the total number of monomer linkages formed during copolymerization of A (i.e., exclusive of a chain transfer agent), as determined by an appropriate analytical technique, for example, $^1$H or $^{13}$C NMR spectroscopy. In some embodiments, A comprises essentially no ether linkages.

In some embodiments, A is an aliphatic polycarbonate chain. In some embodiments, an aliphatic polycarbonate is a copolymer of an optionally substituted epoxide and carbon dioxide. In some embodiments, the polycarbonate is selected from the group consisting of: poly(ethylene carbonate), poly(propylene carbonate), poly(butylene carbonate), poly(glycidylether carbonate), poly(chloromethylethylene carbonate), poly(cyclopentene carbonate), poly(cyclohexene carbonate), poly(3-vinyl cyclohexene carbonate), and random-, block-, or tapered-copolymers of any two or more of the above.

In some embodiments, polymer A is poly(propylene carbonate). In some embodiments, polymer A is poly(ethylene carbonate). In some embodiments, polymer A is poly(chloromethylethylene carbonate). In some embodiments, polymer A is poly(butylene carbonate). In some embodiments, polymer A is a poly(glycidyl ether carbonate). In some embodiments, polymer A is a poly(glycidyl ester carbonate). In some embodiments, polymer A is a random copolymer comprising poly(propylene carbonate) and poly(ethylene carbonate). In some embodiments, polymer A is a random copolymer comprising poly(propylene carbonate) and poly(n-butylene carbonate). In some embodiments, polymer A is a random copolymer comprising poly(propylene carbonate) and a polycarbonate derived from the epoxide of a $C_{6-30}$ alpha olefin.

In some embodiments, a polymer chain A comprises about 2 to about 500 repeating units, wherein a repeating unit is an enchained diad of an epoxide and a carbon dioxide. In some embodiments, a polymer chain comprises about 2 to about 50 repeating units. In some embodiments, a polymer chain comprises about 2 to about 20 repeating units. In some embodiments, a polymer chain comprises about 5 to about 15 repeating units. In some embodiments, a polymer chain comprises about 10 to about 15 repeating units. In some embodiments, a polymer chain comprises about 20 to about 50 repeating units.

In some embodiments, a polymer chain A is a polyether polycarbonate copolymer. In some embodiments, a polymer chain A is characterized in that the proportion of ether linkages in a polyether polycarbonate chain A ranges from about 0.1% to about 50%, as is determined by an appropriate analytical technique, for example, $^1$H or $^{13}$C NMR spectroscopy. In some embodiments, the proportion of ether linkages in a polyether polycarbonate chain A ranges from about 0.1% to about 45%. In some embodiments, the proportion of ether linkages in a polyether polycarbonate chain A ranges from about 0.1% to about 40%. In some embodiments, the proportion of ether linkages in a polyether polycarbonate chain A ranges from about 0.1% to about 35%. In some embodiments, the proportion of ether linkages in a polyether polycarbonate chain A ranges from about 0.1% to about 30%. In some embodiments, the proportion of ether linkages in a polyether polycarbonate chain A ranges from about 0.1% to about 25%. In some embodiments, the proportion of ether linkages in a polyether polycarbonate chain A ranges from about 0.1% to about 20%. In some embodiments, the proportion of ether linkages in a polyether polycarbonate chain A ranges from about 0.1% to about 15%. In some embodiments, the proportion of ether linkages in a polyether polycarbonate chain A ranges from about 0.1% to about 10%. In some embodiments, the proportion of ether linkages in a polyether polycarbonate chain A ranges from about 0.1% to about 5%. In some embodiments, the proportion of ether linkages in a polyether polycarbonate chain A ranges from about 0.1% to about 2%. In some embodiments, a polymer chain A comprises essentially no ether linkages.

In some embodiments, the step of homopolymerizing epoxide on the chain ends of the first polymer A by addition of a second catalyst to provide a second polymer, B-A-B, incorporates epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

In some embodiments, B is a polyether chain. In some embodiments, B is selected from the group consisting of polyoxymethylene, poly(ethylene oxide), poly(propylene oxide), poly(butylene oxide), poly(glycidylether oxide), poly(chloromethylethylene oxide), poly(cyclopentene oxide), poly(cyclohexene oxide), poly(3-vinyl cyclohexene oxide), and block, tapered, or random copolymers of any two or more of the above. In some embodiments, B is polyoxymethylene. In some embodiments, B is poly(ethylene oxide). In some embodiments, B is poly(propylene oxide).

In some embodiments, B comprises about 2 to about 500 repeating units, wherein a repeating unit is an enchained diad of an epoxide. In some embodiments, B comprises about 2 to about 50 repeating units. In some embodiments, B comprises about 2 to about 20 repeating units. In some embodiments, B comprises about 5 to about 15 repeating units. In some embodiments, B comprises about 10 to about 15 repeating units. In some embodiments, B comprises about 10 to about 20 repeating units. In some embodiments, B comprises about 10 to about 50 repeating units. In some embodiments, B comprises about 20 to about 50 repeating units. In some embodiments, B comprises less than 100 repeating units.

In some embodiments, a second polymer, B-A-B, comprises chain ends bearing hydroxyl groups. In some embodiments, a second polymer, B-A-B, can be modified at a chain end to yield different functional groups using methods, techniques, and/or reagents known to a person skilled in the art. In some embodiments, a second polymer, B-A-B, can be modified at a chain end to yield an ether functional group at a chain end. In some embodiments, a second polymer, B-A-B, can be modified at a chain end to yield an ester functional group at a chain end (e.g., via esterification). In some embodiments, a second polymer, B-A-B, can be modified at a chain end to yield a sulfonate functional group at a chain end. In some embodiments, a second polymer, B-A-B, can be modified at a chain end to yield a silyl ether functional group at a chain end (e.g., via protection of a hydroxyl group with a silyl-based group). In some embodiments, a second polymer, B-A-B, can be modified at a chain end to yield a carbamate functional group at a chain end (e.g., via reaction with an isocyanate).

In some embodiments, a triblock copolymer composition provided by such methods comprises a structure of formula P1:

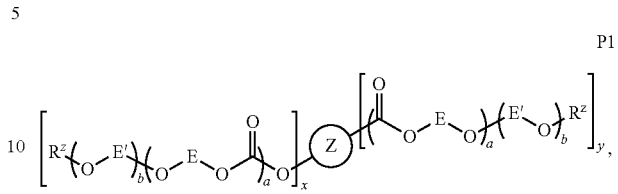

wherein each of $Z$, x, y, -E-, -E'-, a, b, and $R^z$ is as defined above and described in classes and subclasses herein, both singly and in combination. In further embodiments, a triblock copolymer composition provided by such methods comprises a structure of formula P2 to P8, which are described herein.

In some embodiments, the step of copolymerizing epoxide and carbon dioxide in the presence of a chain transfer agent and a first catalyst to create a first polymer A, is not quenched until addition of the second catalyst.

In some embodiments, the step of copolymerizing epoxide and carbon dioxide in the presence of a chain transfer agent and a first catalyst provide a first polymer A in a first reaction. In some embodiments, a first reaction is quenched prior to the step of homopolymerizing epoxide on the chain ends of the first polymer A with a second catalyst to provide a second polymer, B-A-B (i.e., the first reaction is quenched prior to homopolymerization step ii).

In some embodiments, an epoxide used in the step of homopolymerizing on the chain ends of the first polymer A is or comprises residual epoxide from the step of copolymerizing epoxide and carbon dioxide. That is, in some embodiments, a first epoxide used in the step of homopolymerizing a first epoxide, and a second epoxide in the step of copolymerizing a second epoxide is the same epoxide (i.e., the first epoxide and the second epoxide are the same), with no additional first or second epoxide added.

In some embodiments, the step of copolymerizing epoxide and carbon dioxide in the presence of a chain transfer agent and a first catalyst to create a first polymer A, and the step of homopolymerizing epoxide on the chain ends of the first polymer A by addition of a second catalyst are accomplished in the same reactor.

In some embodiments, the step of copolymerizing epoxide and carbon dioxide is performed at a temperature of between about 0° C. to about 80° C. In some embodiments, the step of copolymerizing epoxide and carbon dioxide is performed at a temperature of between about 10° C. to about 80° C. In some embodiments, the step of copolymerizing epoxide and carbon dioxide is performed at a temperature of between about 20° C. to about 80° C. In some embodiments, the step of copolymerizing epoxide and carbon dioxide is performed at a temperature of between about 20° C. to about 60° C. In some embodiments, the step of copolymerizing epoxide and carbon dioxide is performed at a temperature of between about 20° C. to about 50° C. In some embodiments, the step of copolymerizing epoxide and carbon dioxide is performed at a temperature of between about 20° C. to about 40° C. In some embodiments, the step of copolymerizing epoxide and carbon dioxide is performed at a temperature of between about 20° C. to about 30° C. In some embodiments, the step of copolymerizing epoxide and carbon dioxide is performed at a temperature of between about 25° C. to about 35° C. In some embodiments, the step of copolymerizing epoxide and carbon dioxide is performed at a temperature of between about 30° C. to about 40° C.

In some embodiments, the step of homopolymerizing epoxide is performed at a temperature of between about 0° C. to about 180° C. In some embodiments, the step of homopolymerizing epoxide is performed at a temperature of between about 10° C. to about 160° C. In some embodiments, the step of homopolymerizing epoxide is performed at a temperature of between about 20° C. to about 80° C. In some embodiments, the step of homopolymerizing epoxide is performed at a temperature of between about 20° C. to about 60° C. In some embodiments, the step of homopolymerizing epoxide is performed at a temperature of between about 20° C. to about 50° C. In some embodiments, the step of homopolymerizing epoxide is performed at a temperature of between about 20° C. to about 40° C. In some embodiments, the step of homopolymerizing epoxide is performed at a temperature of between about 20° C. to about 30° C. In some embodiments, the step of homopolymerizing epoxide is performed at a temperature of between about 25° C. to about 35° C. In some embodiments, the step of homopolymerizing epoxide is performed at a temperature of between about 30° C. to about 40° C.

In some embodiments, carbon dioxide ($CO_2$) in the copolymerizing step is present at a pressure of between about 30 pounds-force per square inch (psi) and about 800 psi. In some embodiments, $CO_2$ is present at a pressure of between about 30 psi and about 500 psi. In some embodiments, $CO_2$ is present at a pressure of between about 30 psi and about 400 psi. In some embodiments, $CO_2$ is present at a pressure of between about 30 psi and about 300 psi. In some embodiments, $CO_2$ is present at a pressure of between about 30 psi and about 200 psi. In some embodiments, $CO_2$ is present at a pressure of between about 30 psi and about 100 psi. In some embodiments, $CO_2$ is present at a pressure of between about 30 psi and about 80 psi. In some embodiments, $CO_2$ is present at a pressure of between about 30 psi and about 50 psi. In some embodiments, the $CO_2$ is supercritical.

In some embodiments, a triblock copolymer, B-A-B, is characterized in that it has a number average molecular weight ($M_n$) in the range of about 500 g/mol to about 250,000 g/mol, as is determined by an appropriate analytical technique, for example, gel permeation chromatography (GPC). In some embodiments, a triblock copolymer composition has a $M_n$ in the range of about 500 g/mol to about 200,000 g/mol. In some embodiments, a triblock copolymer composition has a $M_n$ in the range of about 500 g/mol to about 150,000 g/mol. In some embodiments, a triblock copolymer composition has a $M_n$ in the range of about 500 g/mol to about 100,000 g/mol. In some embodiments, a triblock copolymer composition has a $M_n$ in the range of about 500 g/mol to about 75,000 g/mol. In some embodiments, a triblock copolymer composition has a $M_n$ in the range of about 500 g/mol to about 50,000 g/mol. In some embodiments, a triblock copolymer composition has a $M_n$ in the range of about 500 g/mol to about 25,000 g/mol. In some embodiments, a triblock copolymer composition has a $M_n$ in the range of about 500 g/mol to about 10,000 g/mol. In some embodiments, a triblock copolymer composition has a $M_n$ in the range of about 500 g/mol to about 5,000 g/mol. In some embodiments, a triblock copolymer composition has a $M_n$ in the range of about 500 g/mol to about 4,000 g/mol. In some embodiments, a triblock copolymer composition has a $M_n$ in the range of about 500 g/mol to about 3,000 g/mol. In some embodiments, a triblock copolymer composition has a MA in the range of about 500 g/mol to about 2,000 g/mol.

In some embodiments, a triblock copolymer, B-A-B, is characterized in that it has a $M_n$ less than about 250,000 g/mol, as is determined by an appropriate analytical technique, for example, gel permeation chromatography (GPC). In some embodiments, a triblock copolymer composition has a $M_n$ less than about 200,000 g/mol. In some embodiments, a triblock copolymer composition has a $M_n$ less than about 150,000 g/mol. In some embodiments, a triblock copolymer composition has a $M_n$ less than about 100,000 g/mol. In some embodiments, a triblock copolymer composition has a $M_n$ less than about 75,000 g/mol. In some embodiments, a triblock copolymer composition has a $M_n$ less than about 50,000 g/mol. In some embodiments, a triblock copolymer composition has a $M_n$ less than about 25,000 g/mol. In some embodiments, a triblock copolymer composition has a $M_n$ less than about 10,000 g/mol. In some embodiments, a triblock copolymer composition has a $M_n$ less than about 5,000 g/mol. In some embodiments, a triblock copolymer composition has a $M_n$ less than about 4,000 g/mol. In some embodiments, a triblock copolymer composition has a $M_n$ less than about 3,000 g/mol. In some embodiments, a triblock copolymer composition has a $M_n$ less than about 2,000 g/mol.

In some embodiments, a triblock copolymer, B-A-B, is characterized in that it has a narrow molecular weight distribution. Molecular weight distribution can be indicated by the polydispersity indices (PDI) of the triblock copolymer composition. In some embodiments, a triblock copolymer composition has a PDI less than 2. In some embodiments, a triblock copolymer composition has a PDI less than 1.8. In some embodiments, a triblock copolymer composition has a PDI less than 1.5. In some embodiments, a triblock copolymer composition has a PDI less than 1.4. In some embodiments, a triblock copolymer composition has a PDI between about 1.0 and 1.2. In some embodiments, a triblock copolymer composition has a PDI between about 1.0 and 1.1.

In some embodiments, a triblock copolymer, B-A-B, is characterized in that it has a viscosity less than 600 centipoise at 75° C. In some embodiments, a triblock copolymer composition has a viscosity less than 550 centipoise at 75° C. In some embodiments, a triblock copolymer composition has a viscosity less than 500 centipoise at 75° C. In some embodiments, a triblock copolymer composition has a viscosity less than 450 centipoise at 75° C. In some embodiments, a triblock copolymer composition has a viscosity less than 400 centipoise at 75° C. In some embodiments, a triblock copolymer composition has a viscosity less than 350 centipoise at 75° C. In some embodiments, a triblock copolymer composition has a viscosity between 15,000-25,000 centipoise at 75° C. In some embodiments, a triblock copolymer composition has a viscosity between 17,500-27,500 centipoise at 75° C. In some embodiments, a triblock copolymer composition has a viscosity between 20,000-30,000 centipoise at 75° C.

In some embodiments, a triblock copolymer, B-A-B, is characterized in that it has a viscosity less than 20,000 centipoise at 50° C. In some embodiments, a triblock copolymer composition has a viscosity less than 10,000 centipoise at 50° C. In some embodiments, a triblock copolymer composition has a viscosity less than 7,500 centipoise at 50° C. In some embodiments, a triblock copolymer composition has a viscosity less than 5,000 centipoise at 50° C. In some embodiments, a triblock copolymer composition has a viscosity less than 4,000 centipoise at 50° C. In some embodiments, a triblock copolymer composition has a viscosity less than 3,000 centipoise at 50° C.

In some embodiments, a triblock copolymer, B-A-B, is characterized in that it has a viscosity less than 40,000 centipoise at 25° C. In some embodiments, a triblock copolymer composition has a viscosity less than 30,000 centipoise at 25° C. In some embodiments, a triblock copolymer composition has a viscosity less than 25,000 centipoise at 25° C. In some embodiments, a triblock copolymer composition has a viscosity less than 22,500 centipoise at 25° C. In some embodiments, a triblock copolymer composition has a viscosity less than 20,000 centipoise at 25° C. In some embodiments, a triblock copolymer composition has a viscosity less than 17,500 centipoise at 25° C.

In some embodiments, a provided triblock copolymer, B-A-B, is characterized in that it has an increased ratio of primary hydroxyl end-groups relative to secondary hydroxyl end-groups as compared to a starting or intermediate copolymer.

For example, in some embodiments, the molar percent of primary OH end groups in a triblock copolymer, B-A-B, (e.g. PPG-PPC-PPG triblock copolymer), relative to a starting polymer, A, (e.g. PPC homopolymer) is increased to at least 15% greater than the molar percent of primary OH end groups in the starting polymer. For example, a starting PPC homopolymer composition having 10% primary OH end groups that is modified to become a modified PPG-PPC-PPG triblock copolymer having 25% end groups; it is understood that the modified polymer composition is increased to 15% (i.e., 25%-10%=15%) greater than the molar percent of primary OH end groups in the starting polymer. Accordingly, in some embodiments, a molar percent of primary OH end groups in a triblock B-A-B polymer is at least 15%, at least 20%, at least 25%, at least 30%, at least 35%, at least 40%, at least 45%, at least 50%, at least 55%, at least 60%, at least 65%, at least 70%, or at least 71% greater than the molar percent of primary OH end groups in the starting polymer. In certain embodiments, the molar percent of primary OH end groups in a triblock B-A-B polymer composition is increased to 15-25%, 20-30%, 25-35%, 30-40%, 35-45%, 40-50%, 45-55%, 50-60%, 55-65%, 60-70%, 65-75%, 70-80%, 75-85%, 80-90%, 85-95%, 90-99%, or greater than 99%.

In some embodiments, the molar percent of primary OH end groups in a triblock B-A-B polymer is greater than about 5%, greater than about 7%, greater than about 10%, or greater than about 15%. In some embodiments, the molar percent of primary OH end groups is greater than about 100/%, greater than about 15%, greater than about 20%/a, greater than about 25%, greater than about 30%/a, greater than about 35%, greater than about 40%, greater than about 45%, or greater than about 50%, greater than about 55%, greater than about 60%, greater than about 65%, greater than about 70%/a, greater than about 75%, greater than about 80%, greater than about 85%, greater than about 90%/a, or greater than about 95%. In certain embodiments, the molar percent of primary OH end groups in a triblock B-A-B polymer is 15-25%, 20-30%/a, 25-35%, 30-40%, 35-45%, 40-50%/a, 45-55%, 50-60%, 55-65%, 60-70%, 65-75%, 70-80%, 75-85%, 80-90%, 85-95%, 90-99%, or greater than 99%.

In some embodiments, the molar percent of primary OH end groups in a triblock B-A-B polymer composition is about 35% greater than a molar percent of primary OH end groups in a starting polymer A, (e.g. PPC homopolymer). In some embodiments, the molar percent of primary OH end groups in a triblock B-A-B polymer composition is at least 45% greater than the molar percent of primary OH end groups in a starting polymer. In some embodiments, the molar percent of primary OH end groups in a triblock B-A-B polymer composition is at least 50%/a, at least 55%, at least 60%, at least 65%, at least 70%, at least 75%, at least 80%, at least 85%, at least 90%, or at least 95% greater than the molar percent of primary OH end groups in a starting polymer. In some embodiments, the molar percent of primary OH end groups in a starting polymer composition is less than 15%, less than 10%, less than 8%, less than 5%, or less than 3%, or less than 2%.

In some embodiments, the ratio of primary OH end groups to secondary OH end groups in a triblock B-A-B polymer composition is at least 50% greater than the ratio in a starting polymer A, (e.g. PPC homopolymer) composition. In some embodiments, the ratio of primary OH end groups to secondary OH end groups in a triblock B-A-B polymer composition is at least 75%, at least 100%, at least 150%/a, at least 200%, at least 300%, at least 400%, or at least 500% greater than the ratio in a starting polymer composition. In some embodiments, the ratio of primary OH end groups to secondary OH end groups in a triblock B-A-B polymer composition is 75-200%, 150-250%/a, 200-300%, 250-350%, 300-400%, 350-450%, 400-500%, or 500-1000% greater than the ratio in a starting polymer composition.

First Catalysts

Suitable first catalysts for the preparation of a first polymer A (e.g., poly(alkylene carbonate)), are known in the art and may be used in provided methods. By way of non-limiting example, in some embodiments, a first catalyst is selected from the group consisting of:

i) (salcy)MX (salcy=N,N'-bis(3,5-di-tertbutylsalicylidene)-1,2-diaminocyclohexane; M=Al, Co, Cr, Mn; X=halide or carboxylate);

ii) zinc glutarate;

iii) TPPM-X (TPP=tetraphenylphorphyrin; M=Al, Co, Cr; X=halide or alkoxide), (betadiiminate); and iv) zinc acetate.

In some embodiments, a first catalyst is a metallosalenate catalyst. In some embodiments, a first catalyst is a cobalt salen catalyst. In some embodiments, a first catalyst is a metal complex described in WO 2008/136591, WO 2010/013948, WO 2010/022388, WO 2010/147421, WO 2011/126195, WO 2012/037282, WO 2013/096602, WO 2013/012895, WO 2013/022932, or WO 2014/031811, the entire contents of each of which are hereby incorporated by reference.

In some embodiments, a first catalyst is a porphyrin catalyst. In some embodiments, a first catalyst comprises a porphyrin ligand coordinated with cobalt. In some embodiments, a first catalyst comprises a porphyrin ligand coordinated with nickel. In some embodiments, a first catalyst is a metal complex described in JP 2008081518, the entire contents of which are hereby incorporated by reference.

In some embodiments, a first catalyst is a bimetallic catalyst. In some embodiments, a first catalyst is a bimetallic catalyst comprising nickel. In some embodiments, a first catalyst is a bimetallic catalyst described in WO 2009/130470, WO 2016/012785, WO 2016/012786, or WO 2017/037441, the entire contents of each of which are hereby incorporated by reference.

In some embodiments, a metallosalenate catalyst has a structure:

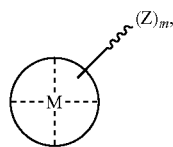

wherein:

⊕ comprises a multidentate ligand;
M is a metal atom; and
⁓⁓⁓(Z)$_m$ represents one or more activating moieties covalently tethered to the multidentate ligand, where ⁓⁓⁓ represents a linker moiety, each Z is an activating functional group, and m represents the number of Z groups present on a linker moiety and is an integer between 1 and 4 inclusive.

In some embodiments, at least one activating moiety is tethered to one or more carbon atoms of only one phenyl ring of a salicylaldehyde-derived portions of a salen ligand, as shown in formula I:

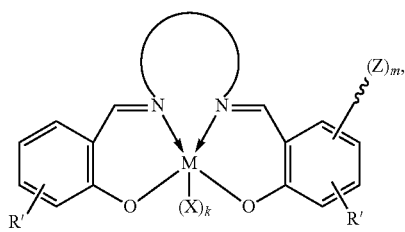

I wherein M and ⁓⁓⁓(Z)$_m$ are as defined above and described in classes and subclasses herein, both singly and in combination, and:

X is a nucleophile capable of ring opening an epoxide;
k is an integer from 0-2 inclusive;
R' represents one or more substituents optionally present on the phenyl rings and each R' is independently selected from the group consisting of: halogen, —NO$_2$, —CN, —SR$^y$, —S(O)R$^y$, —S(O)$_2$R$^y$, —NR$^y$C(O)R$^y$, —OC(O)R$^y$, —CO$_2$R$^y$, —NCO, —N$_3$, —OR$^y$, —OC(O)N(R$^y$)$_2$, —N(R$^y$)$_2$, —NR$^y$C(O)R$^y$, —NR$^y$C(O)OR$^y$, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, where two or more adjacent R' groups can be taken together to form an optionally substituted saturated, partially unsaturated, or aromatic 5- to 12-membered ring containing 0 to 4 heteroatoms;

R$^y$ is —H, or an optionally substituted radical selected from the group consisting of C$_{1-6}$ aliphatic, 3- to 7-membered heterocyclic, phenyl, and 8- to 10-membered aryl; and ⌒ represents is an optionally substituted moiety linking the two nitrogen atoms of the diamine portion of the salen ligand, where ⌒ is selected from the group consisting of phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, or an optionally substituted C$_{2-20}$ aliphatic group, wherein one or more methylene units are optionally and independently replaced by —NR$^y$—, —N(R$^y$)C(O)—, —C(O)N(R$^y$)—, —OC(O)N(R$^y$)—, —N(R$^y$)C(O)O—, —OC(O)O—, —O—, —C(O)—, —OC(O)—, —C(O)O—, —S—, —SO—, —SO$_2$—, —C(=S)—, —C(=NR$^y$)—, —C(=NOR$^y$)— or —N=N—.

In some embodiments, both salicylaldehyde-derived portions of a salen ligand bear one or more activating moieties:

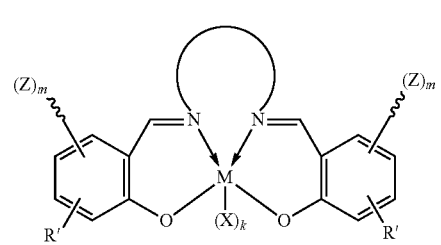

II wherein M, X, k, R', ⌒, and ⁓⁓⁓(Z)$_m$ are as defined above and described in classes and subclasses herein, both singly and in combination.

In some embodiments a metallosalenate catalyst has a structure:

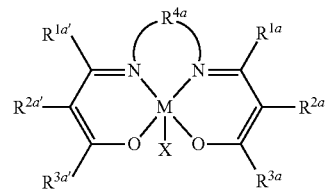

wherein:
M is a transition metal; ⁓⁓⁓
R$^{1a}$, R$^{1a'}$, R$^{2a}$, R$^{2a'}$, R$^{3a}$, and R$^{3a'}$ are independently a ⁓⁓⁓(Z)$_m$ group, hydrogen, halogen, —OR, —NR$_2$, —SR, —CN, —NO$_2$, —SO$_2$R, —SOR, —SO$_2$NR$_2$, —CNO, —NRSO$_2$R, —N CO, —N$_3$, —SiR$_3$, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur;

each R is independently hydrogen, an optionally substituted radical selected the group consisting of acyl, carbamoyl, arylalkyl, phenyl, 8- to 10-membered aryl, C$_{1-12}$ aliphatic, C$_{1-12}$ heteroaliphatic, 5- to 10-membered heteroaryl, 4- to 7-membered heterocyclyl, an oxygen protecting group, and a nitrogen protecting group, or:

two R on the same nitrogen atom are taken with the nitrogen to form a 3- to 7-membered heterocyclic ring; where any of [R$^{2a'}$ and R$^{3a'}$], [R$^{2a}$ and R$^{3a}$], [R$^{1a}$ and R$^{2a}$], and [R$^{1a'}$ and R$^{2a'}$] may optionally be taken together with the carbon atoms to which they are attached to form one or more rings which may in turn be substituted with one or more R groups; and R$^{4a}$ is selected from the group consisting of:

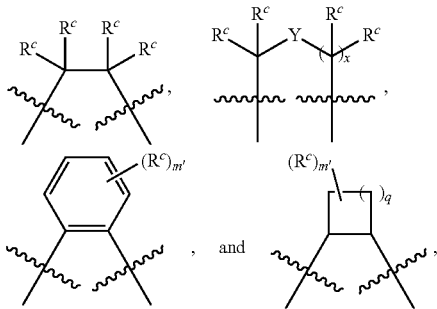

where
R$^c$ at each occurrence is independently a  group, hydrogen, halogen, —OR, —NR$_2$, —SR, —CN, —NO$_2$, —SO$_2$R, —SOR, —SO$_2$NR$_2$, —CNO, —NRSO$_2$R, —N CO, —N$_3$, —SiR$_3$, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur, where:

two or more R$^c$ groups may be taken together with the carbon atoms to which they are attached and any intervening atoms to form one or more rings, or where:

when two R$^c$ groups are attached to the same carbon atom, they may be taken together along with the carbon atom to which they are attached to form a moiety selected from the group consisting of: a 3- to 8-membered spirocyclic ring, a carbonyl, an oxime, a hydrazone, and an imine;

X is a nucleophile capable of ring opening an epoxide;
Y is a divalent linker selected from the group consisting of: —NR—, —N(R)C(O)—, —C(O)NR—, —O—, —C(O)—, —OC(O)—, —C(O)O—, —S—, —SO—, —SO$_2$—, —C(=S)—, —C(=NR)—, or —N=N—, a polyether, a C$_3$ to C$_8$ substituted or unsubstituted carbocycle; and a C$_1$ to C$_8$ substituted or unsubstituted heterocycle;

m' is 0 or an integer from 1 to 4, inclusive;
q is 0 or an integer from 1 to 4, inclusive; and
x is 0, 1, or 2.

In some embodiments, at least one of [R$^{2a}$ and R$^{3a}$] and [R$^{2a'}$ and R$^{3a'}$] are taken together to form a ring. In some embodiments, both [R$^{2a}$ and R$^{3a}$] and [R$^{2a'}$ and R$^{3a'}$] are taken together to form rings. In some embodiments, the rings formed by [R$^{2a}$ and R$^{3a}$] and [R$^{2a'}$ and R$^{3a'}$] are substituted phenyl rings.

In some embodiments, one or more of R$^{1a}$, R$^{1a'}$, R$^{2a}$, R$^{2a'}$, R$^{3a}$, and R$^{3a'}$ are independently a  (Z)$_m$ group.

In some embodiments of a metallosalenate metal complex, a ⊕ moiety has a structure selected from the group consisting of:

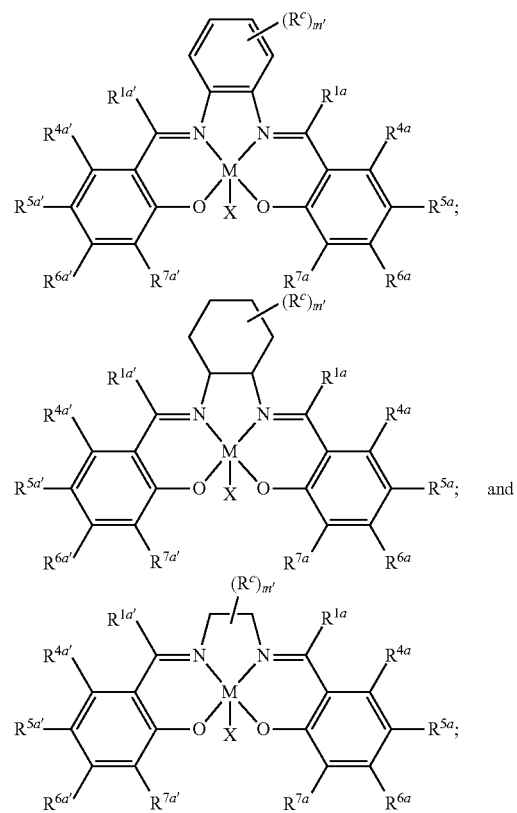

wherein:

M is a transition metal;

$R^{4a}$, $R^{4a'}$, $R^{5a}$, $R^{5a'}$, $R^{6a}$, $R^{6a'}$, $R^{7a}$, and $R^{7a'}$ are each independently a —⁓⁓ $(Z)_m$ group, hydrogen, halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$, or an optionally substituted radical selected from the group consisting of C$_{1-20}$ aliphatic, C$_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur;

wherein [$R^{1a}$ and $R^{4a}$], [$R^{1a}$ and $R^{4a'}$] and any two adjacent $R^{4a}$, $R^{4a'}$, $R^{5a}$, $R^{5a'}$, $R^{6a}$, $R^{6a'}$, $R^{7a}$, and $R^{7a'}$ groups can be taken together with intervening atoms to form one or more optionally substituted rings; and m' is 0 or an integer from 1 to 4, inclusive.

In some embodiments, $R^{1a}$, $R^{1a'}$, $R^{4a}$, $R^{4a'}$, $R^{6a}$, and $R^{6a'}$ are each —H. In some embodiments, $R^{5a}$, $R^{5a'}$, $R^{7a}$ and $R^{7a'}$ are each optionally substituted C$_1$-C$_{12}$ aliphatic. In some embodiments, $R^{4a}$, $R^{4a'}$, $R^{5a}$, $R^{5a'}$, $R^{6a}$, $R^{6a'}$, $R^{7a}$, and $R^{7a'}$ are each independently selected from the group consisting of: —H, —SiR$_3$, methyl, ethyl, n-propyl, i-propyl, n-butyl, sec-butyl, t-butyl, isoamyl, t-amyl, thexyl, and trityl. In some embodiments, $R^{1a}$, $R^{1a'}$, $R^{4a}$, $R^{4a'}$, $R^{6a}$, and $R^{6a'}$ are each —H. In some embodiments, $R^{7a}$ is selected from the group consisting of —H, methyl, ethyl, n-propyl, i-propyl, n-butyl, sec-butyl, t-butyl, isoamyl, t-amyl, thexyl, and trityl. In some embodiments, $R^{5a}$ and $R^{7a}$ are independently selected from the group consisting of —H, methyl, ethyl, n-propyl, i-propyl, n-butyl, sec-butyl, t-butyl, isoamyl, t-amyl, thexyl, and trityl. In some embodiments, one or more of $R^{5a}$, $R^{5a'}$, $R^{7a}$ and $R^{7a'}$ is a —⁓⁓ Z group. In some embodiments, $R^{5a}$ and $R^{5a'}$ are a —⁓⁓ $(Z)_m$ group.

In some embodiments of a metallosalenate metal complex, a  moiety has a structure selected from the group consisting of:

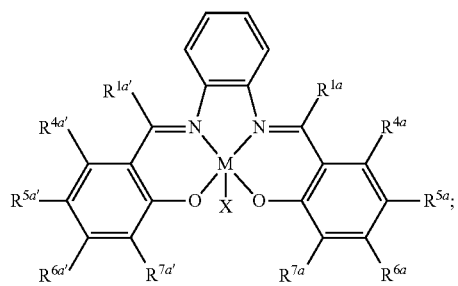

-continued

[structures shown]

wherein M, X, $R^{1a}$, $R^{4a}$, $R^{5a}$, $R^{6a}$, $R^{7a}$, $R^{1a'}$, $R^{4a'}$, $R^{5a'}$, $R^{6a'}$, $R^{7a'}$ are as defined above and described in classes and subclasses herein, both singly and in combination.

Metal Atoms in a First Catalyst

In some embodiments, a first catalyst is a metal complex comprising a zinc, cobalt, chromium, aluminum, titanium, ruthenium, or manganese atom. In some embodiments, a first catalyst is an aluminum complex. In some embodiments, a first catalyst is a chromium complex. In some embodiments, a first catalyst is a zinc complex. In certain some embodiments, a first catalyst is a titanium complex. In some embodiments, a first catalyst is a ruthenium complex. In some embodiments, a first catalyst is a manganese complex. In some embodiments, a first catalyst is cobalt complex. In some embodiments where a first catalyst is a cobalt complex, the cobalt metal has an oxidation state of 3+(i.e., Co(III)). In some embodiments, the cobalt metal has an oxidation state of 2+.

In some embodiments, a first catalyst is a metallosalenate described above where M is a metal atom selected from periodic table groups 3-13, inclusive. In some embodiments, M is a transition metal selected from periodic table groups 5-12, inclusive. In some embodiments, M is a transition metal selected from periodic table groups 4-11, inclusive. In some embodiments, M is a transition metal selected from periodic table groups 5-10, inclusive. In some embodiments, M is a transition metal selected from periodic table groups 7-9, inclusive. In some embodiments, M is selected from the group consisting of Cr, Mn, V, Fe, Co, Mo, W, Ru, Al, and Ni. In some embodiments, M is a metal atom selected from the group consisting of: cobalt, chromium, aluminum, titanium, ruthenium, and manganese. In some embodiments, M is cobalt. In some embodiments, M is chromium. In some embodiments, M is aluminum.

Linkers

In certain embodiments, each linker moiety —⁓⁓ comprises 1-30 atoms including at least one carbon atom, and optionally one or more atoms selected from the group consisting of N, O, S, Si, B, and P.

In certain embodiments, a linker moiety ⎯⁓⁓⁓ is an optionally substituted $C_{2-30}$ aliphatic group wherein one or more methylene units are optionally and independently replaced by —NR$^y$—, —N(R$^y$)C(O)—, —C(O)N(R$^y$)—, —O—, —C(O)—, —OC(O)—, —C(O)O—, —S—, —SO—, —SO$_2$—, —C(=S)—, —C(=NR$^y$)—, or —N=N—, where each occurrence of R$^y$ is independently —H, or an optionally substituted radical selected from the group consisting of $C_{1-6}$ aliphatic, 3- to 7-membered heterocyclic, phenyl, and 8- to 10-membered aryl. In certain embodiments, a linker moiety is a $C_4$-$C_{12}$ aliphatic group substituted with one or more moieties selected from halogen, —NO$_2$, —CN, —SR$^y$, —S(O)R$^y$, —S(O)$_2$R$^y$, —NR$^y$C(O)R$^y$, —OC(O)R$^y$, —CO$_2$R$^y$, —NCO, —CNO, —SiR$_3$, —N$_3$, —OR$^y$, —OC(O)N(R$^y$)$_2$, —N(R$^y$)$_2$, —NR$^y$C(O)R$^y$, —NR$^y$C(O)OR$^y$, —C(O)R$^y$, C(O)N(R$^y$)$_2$, —SO$_2$N(R$^y$)$_2$, —N(R$^y$)C(O)N(R$^y$)$_2$, or —N(R)SO$_2$R, where R$^y$ is —H, or an optionally substituted radical selected from the group consisting of $C_{1-6}$ aliphatic 3- to 7-membered heterocyclic, phenyl, and 8- to 10-membered aryl.

In certain embodiments, ⎯⁓⁓⁓ is an optionally substituted $C_3$-$C_{30}$ aliphatic group. In certain embodiments, ⎯⁓⁓⁓ is an optionally substituted $C_{4-24}$ aliphatic group. In certain embodiments, ⎯⁓⁓⁓ is an optionally substituted $C_4$-$C_{20}$ aliphatic group. In certain embodiments, ⎯⁓⁓⁓ is an optionally substituted $C_4$-$C_{12}$ aliphatic group. In certain embodiments, ⎯⁓⁓⁓ is an optionally substituted $C_{4-10}$ aliphatic group. In certain embodiments, ⎯⁓⁓⁓ is an optionally substituted $C_{4-8}$ aliphatic group. In certain embodiments, ⎯⁓⁓⁓ is an optionally substituted $C_4$-$C_6$ aliphatic group. In certain embodiments, ⎯⁓⁓⁓ is an optionally substituted $C_6$-$C_{12}$ aliphatic group. In certain embodiments, ⎯⁓⁓⁓ is an optionally substituted $C_8$ aliphatic group. In certain embodiments, ⎯⁓⁓⁓ is an optionally substituted $C_7$ aliphatic group. In certain embodiments, ⎯⁓⁓⁓ is an optionally substituted $C_6$ aliphatic group. In certain embodiments, ⎯⁓⁓⁓ is an optionally substituted $C_8$ aliphatic group. In certain embodiments, ⎯⁓⁓⁓ is an optionally substituted $C_4$ aliphatic group. In certain embodiments, ⎯⁓⁓⁓ is an optionally substituted $C_3$ aliphatic group. In certain embodiments, a aliphatic group in the linker moiety is an optionally substituted straight alkyl chain. In certain embodiments, the aliphatic group is an optionally substituted branched alkyl chain. In some embodiments, a ⎯⁓⁓⁓ is a $C_4$ to $C_{20}$ alkyl group having one or more methylene groups replaced by —C(R$^a$R$^b$)— where R$^a$ and R$^b$ are each independently $C_1$-$C_4$ alkyl groups. In certain embodiments, a ⎯⁓⁓⁓ consists of an aliphatic group having 4 to 30 carbons including one or more gem-dimethyl substituted carbon atoms.

In certain embodiments, ⎯⁓⁓⁓ includes one or more optionally substituted cyclic elements selected from the group consisting of saturated or partially unsaturated carbocyclic, aryl, heterocyclic, or heteroaryl. In certain embodiments, ⎯⁓⁓⁓ consists of the substituted cyclic element. In some embodiments the cyclic element is part of a linker with one or more non-ring heteroatoms or optionally substituted aliphatic groups comprising other parts of the linker moiety.

In some embodiments, ⎯⁓⁓⁓ is of sufficient length to allow one or more activating functional groups to be positioned near a metal atom of a metal complex. In certain embodiments, structural constraints are built into ⎯⁓⁓⁓ to control the disposition and orientation of one or more activating functional groups near a metal center of a metal complex. In certain embodiments such structural constraints are selected from the group consisting of cyclic moieties, bicyclic moieties, bridged cyclic moieties and tricyclic moieties. In some embodiments, such structural constraints are the result of acyclic steric interactions. In certain embodiments such structural constraints are selected from the group consisting of cis double bonds, trans double bonds, cis allenes, trans allenes, and triple bonds. In some embodiments, such structural constraints are selected from the group consisting of substituted carbons including geminally disubstituted groups such as sprirocyclic rings, gem dimethyl groups, gem diethyl groups and gem diphenyl groups. In certain embodiments such structural constraints are selected from the group consisting of heteratom-containing functional groups such as sulfoxides, amides, and oximes.

In certain embodiments, ⎯⁓⁓⁓ is selected from the group consisting of:

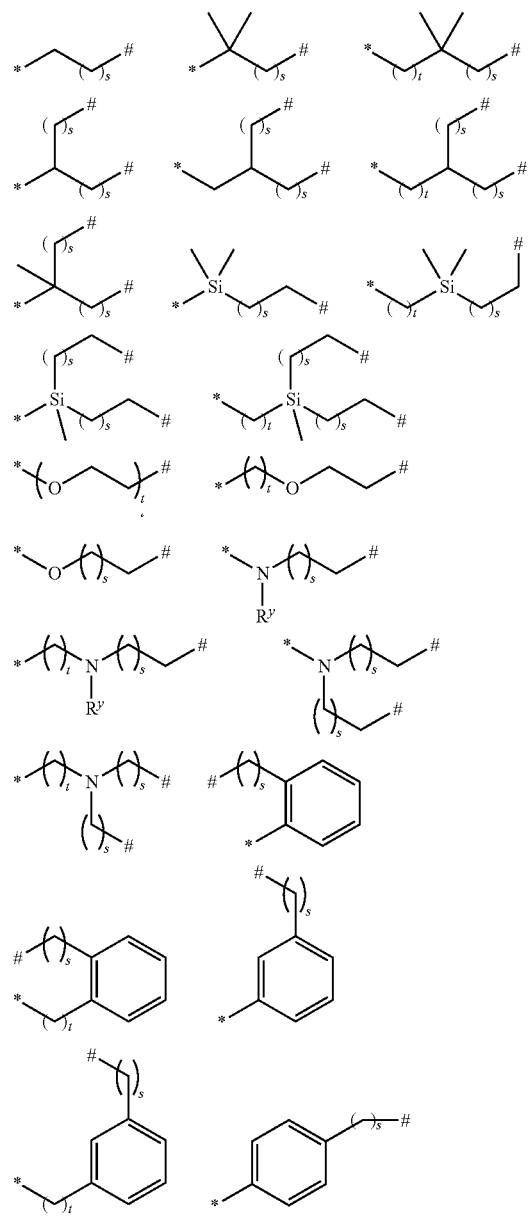

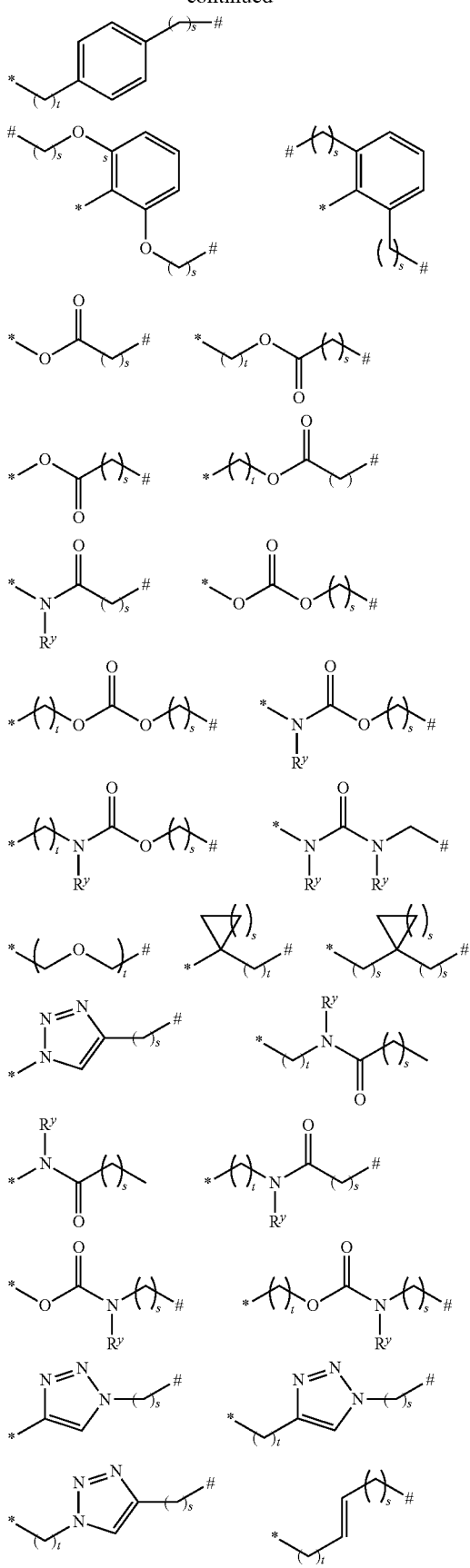

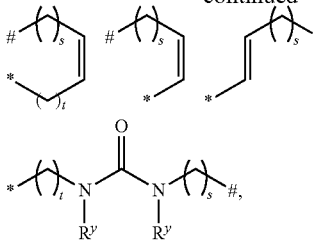

where s = 0 - 6 and t = 1 - 4

\* represents the site of attachment to a ligand, and each # represents a site of attachment of an activating functional group.

In some embodiments, s is 0. In some embodiments, s is 1. In some embodiments, s is 2. In some embodiments, s is 3. In some embodiments, s is 4. In some embodiments, s is 5. In some embodiments, s is 6.

In some embodiments, t is 1. In some embodiments, t is 2. In some embodiments, t is 3. In some embodiments, t is 4.

In some embodiments of provided metal complexes, each $R^y$ of a ⁓ group is —H, or an optionally substituted radical selected from the group consisting of $C_{1-6}$ aliphatic, 3- to 7-membered heterocyclic, phenyl, and 8- to 10-membered aryl. In some embodiments, an $R^y$ group of a ⁓ group attached to a nitrogen, oxygen, or sulfur atom on a provided metal complex is other than hydrogen.

In some embodiments of provided metal complexes, each R of a ⁓ group is —H, or an optionally substituted radical selected from the group consisting of $C_{1-6}$ aliphatic, 3- to 7-membered heterocyclic, phenyl, and 8- to 10-membered aryl. In some embodiments, an R group of a ⁓ group attached to a nitrogen, oxygen, or sulfur atom on a provided metal complex is other than hydrogen.

In some embodiments, an activating moiety ⁓$(Z)_m$ has a formula,

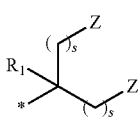

where $R^1$, \*, s, and Z are as defined above and described in classes and subclasses herein. In certain embodiments, an activating moiety ⁓$(Z)_m$ has a formula

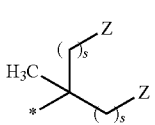

where \*, s, and Z are as defined above and described in classes and subclasses herein. In certain embodiments, an activating moiety ⁓$(Z)_m$ has a formula

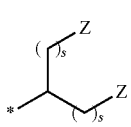

where *, s, and Z are as defined above and described in classes and subclasses herein. In certain embodiments, an activating moiety —ɯɯ(Z)$_m$ has a formula selected from the group consisting of:

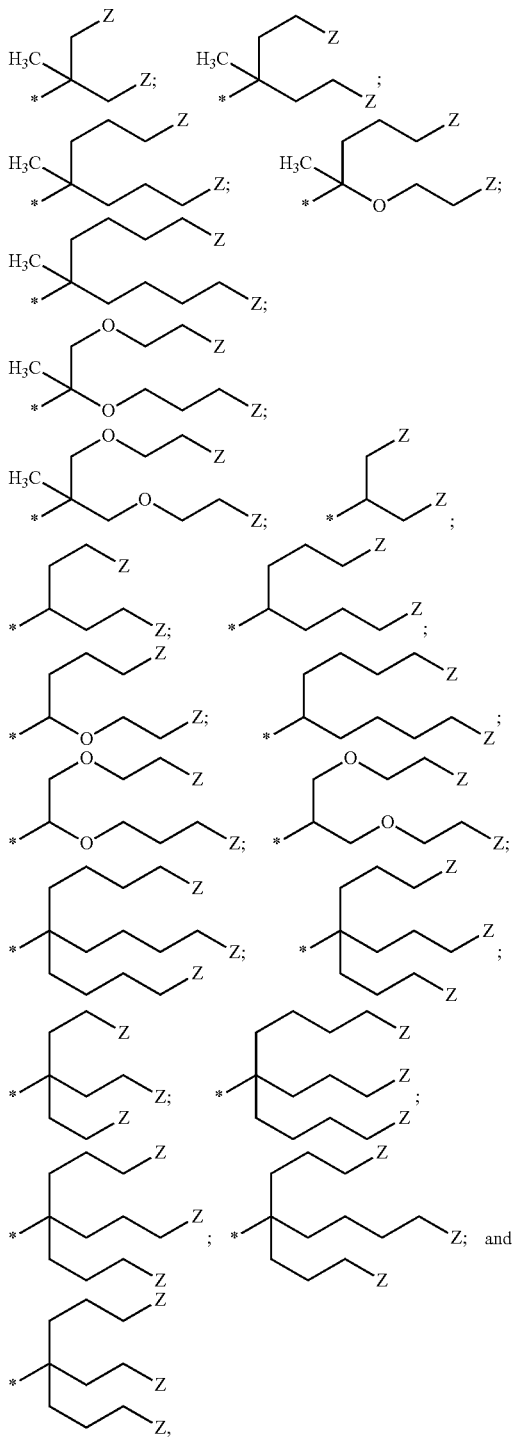
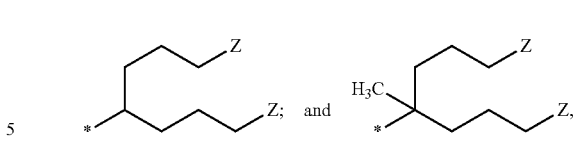

where Z and * are as defined above and described in classes and subclasses herein.

In certain embodiments, an activating moiety —ɯɯ(Z)$_m$ has a formula selected from the group consisting of:

where Z, and * are as defined above and described in classes and subclasses herein.

Activating Groups

In some embodiments, each activating functional group is independently selected from the group consisting of neutral nitrogen-containing moieties, cationic moieties, phosphorous-containing moieties, and combinations of two or more of these. In some embodiments, an activating group has no free amines. The term "no free amines", as used herein, refers to a nitrogen-containing group having no nitrogen atoms bearing a hydrogen in any tautomeric or resonance form.

In some embodiments of (Z)$_m$, m is 1. In some embodiments m is 2.

Neutral Nitrogen-Containing Activating Groups

In some embodiments, one or more Z groups on provided metal complexes are neutral nitrogen-containing moieties.

In some embodiments, an activating functional group is an N-linked amino group. In some embodiments, an activating functional group is an N-linked hydroxyl amine.

In some embodiments, an activating functional group is an amidine. In some embodiments, an activating functional group is an N-linked amidine. In some embodiments, an activating functional group is an amidine moiety linked through the imine nitrogen. In some embodiments, an activating functional group is an amidine moiety linked through a carbon atom.

In some embodiments, an activating functional group is a carbamate. In some embodiments, an activating functional group is a N-linked carbamate. In some embodiments, an activating functional group is a O-linked carbamate.

In some embodiments, an activating functional group is a guanidine or bis-guanidine group. In some embodiments, an activating functional group is a urea.

In some embodiments, an activating functional group is an oxime or hydrazone group.

In some embodiments, an activating functional group is a N-oxide derivative.

Cationic Activating Groups

In some embodiments, one or more tethered activating functional groups on provided metal complexes comprise a cationic moiety.

In some embodiments, an activating functional group is a protonated amine.

In some embodiments, an activating functional group is a quaternary amine.

In some embodiments, an activating functional group is a guanidinium group.

In some embodiments, an activating functional group is a cationic bicyclic guanidinium group, wherein the cationic bicyclic guanidinium group has no free amines. In some embodiments, a guanidinium group having no free amines has two nitrogen atoms each bearing three nonhydrogen substituents and a third nitrogen atom with bonds to four nonhydrogen substituents. In some embodiments, such nonhydrogen substituents are aliphatic substituents. In some embodiments, a guanidinium group having no free amines is cationic, as compared to a neutral guanidinium group having a free amine.

In some embodiments, an activating function group is an amidinium group.

In some embodiments, an activating functional group is a cationic bicyclic amidinium group, wherein the cationic bicyclic amidinium group has no free amines. In some embodiments, an amidinium group having no free amines has one nitrogen atom bearing three nonhydrogen substituents and a second nitrogen atom with bonds to four nonhydrogen substituents. In some embodiments, such nonhydrogen substituents are aliphatic substituents. In some embodiments, such nonhydrogen substituents comprise the rings of the bicyclic amidinium group. In some embodiments, an amidinium group having no free amines is cationic, as compared to a neutral amidinium group having a free amine.

In some embodiments, an activating functional group is or comprises an optionally substituted nitrogen-containing heterocycle or heteroaryl.

In some embodiments, an activating functional group is a sulfonium group or an arsonium group.

Phosphorous-Containing Activating Groups

In some embodiments, activating functional groups Z are phosphorous containing groups.

In some embodiments, phosphorous-containing functional groups include those disclosed in *The Chemistry of Organophosphorus Compounds. Volume 4. Ter-and Ouinquevalent Phosphorus Acids and their Derivatives*. The Chemistry of Functional Group Series Edited by Frank R. Hartley (Cranfield University, Cranfield, U.K.). Wiley: New York. 1996. ISBN 0-471-95706-2, the entirety of which is hereby incorporated herein by reference.

In certain embodiments, an activating functional group is a phosphonate group.

In some embodiments, an activating functional group is a phosphonic diamide group.

In some embodiments, an activating functional group is a phosphine group.

Second Catalysts
Boron-Based Catalysts

In some embodiments, a second catalyst is a boron compound. In some embodiments, a second catalyst is selected from the group consisting of:

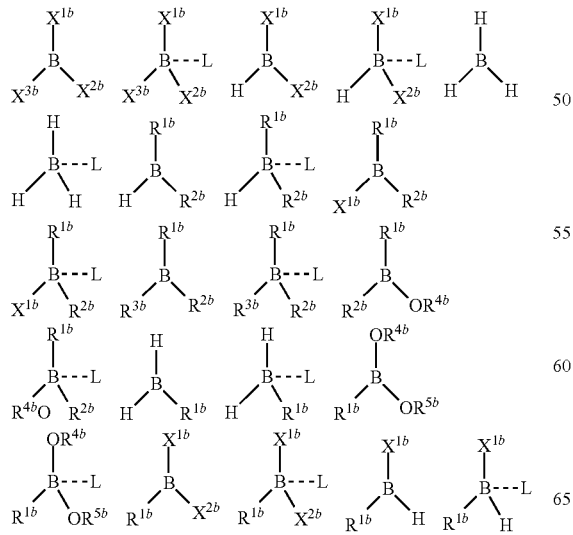
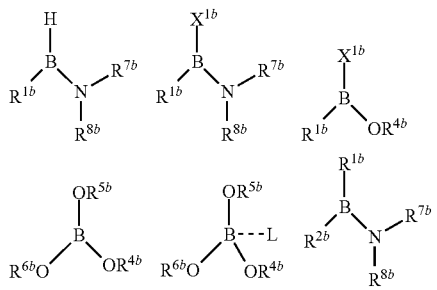
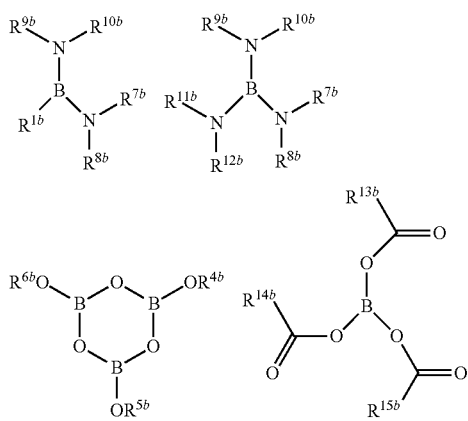
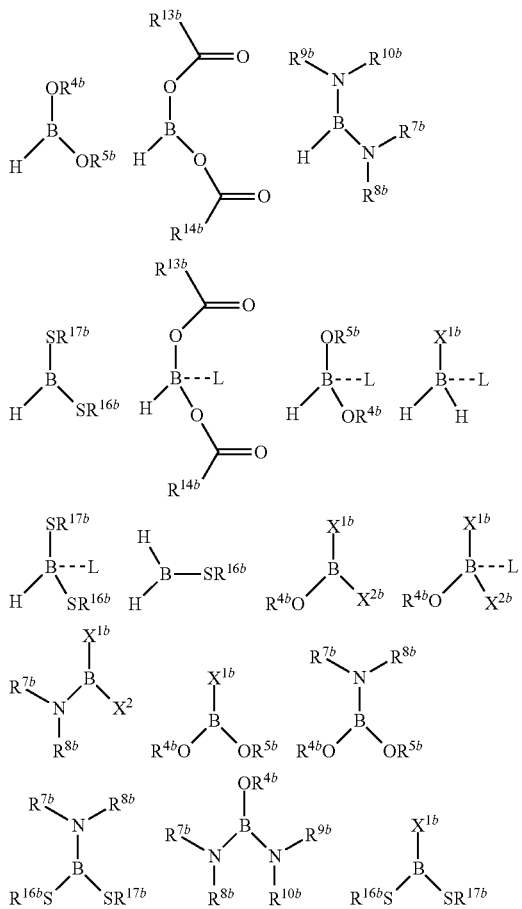

-continued

-continued

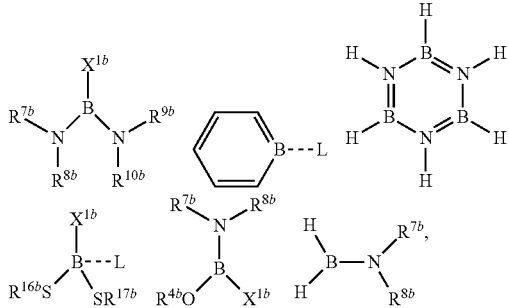

wherein:
each occurrence of $X^{1b}$, $X^{2b}$, and $X^{3b}$ is independently Cl, Br, I, or F;
each occurrence of $R^{1b}$, $R^{2b}$, and $R^{3b}$ is independently an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein any of $R^{1b}$ and $R^{2b}$ can be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;
each occurrence of $R^{4b}$, $R^{5b}$, $R^{6b}$, $R^{7b}$, $R^{8b}$, $R^{9b}$, $R^{10b}$, $R^{11b}$, $R^{12b}$, $R^{13b}$, $R^{14b}$, $R^{15b}$, $R^{16b}$, and $R^{17b}$ is independently hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein ($R^{4b}$ and $R^{5b}$), ($R^{7b}$ and $R^{8b}$), ($R^{9b}$ and $R^{10b}$), ($R^{11b}$ and $R^{12b}$), ($R^{7b}$ and $R^{9b}$), and ($R^{16b}$ and $R^{17b}$) can independently be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;
and L is a ligand.

In certain embodiments, the boron compound is

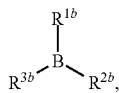

and each occurrence of $R^{1b}$, $R^{2b}$, and $R^{3b}$ is independently an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein any of $R^{1b}$ and $R^{2b}$ can be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl.

In certain embodiments, the boron compound is

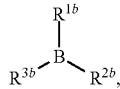

and each occurrence of $R^{1b}$, $R^{2b}$, and $R^{3b}$ is independently optionally substituted 6-membered aryl.

Anionic Catalysts

In some embodiments, a second catalyst is an anionic reagent. In some embodiments, a second catalyst is an anionic reagent selected of the formula:

$$M^{n+}\text{-(OH)}_n,$$

wherein:
n is an integer between 1 and 2 inclusive;
when n is 1, M is selected from the group consisting of: Li, Na, K, and Rb, Cs; and
when n is 2, M is selected from: Ba and Sr.

Cationic Catalysts

In some embodiments, a second catalyst is a cationic reagent. In some embodiments, a second catalyst is a cationic reagent selected from the group consisting of $BF_3$, $PF_5$, $HPF_6$, $HSbF_6$, $CF_3SO_3H$, $Al(CF_3SO_3)_3$, $Cu(CF_3SO_3)_2$, $(R^{cat})_3O^+.^-BF_4$, $Zn(OTf)_2$, $Ga(OTf)_3$, $La(OTf)_3$, $Yb(OTf)_3$, $Ce(OTf)_3$, $Sc(OTf)_3$, $Lu(OTf)_3$, $Fe(OTf)_3$, $Zr(OTf)_4$, $Hf(OTf)_4$, and $Y(OTf)_3$, or a combination thereof wherein:
$R^{cat}$ is independently hydrogen, an optionally substituted radical selected the group consisting of acyl; carbamoyl; arylalkyl; phenyl, 8- to 10-membered aryl; $C_{1-12}$ aliphatic; $C_{1-12}$ heteroaliphatic; 5- to 10-membered heteroaryl; or 4- to 7-membered heterocyclyl.

In some embodiments, the second catalyst is $BF_3$. In some embodiments, the second catalyst is $PF_5$. In some embodiments, the second catalyst is $HPF_6$, In some embodiments, the second catalyst is $HSbF_6$. In some embodiments, the second catalyst is $CF_3SO_3H$. In some embodiments, the second catalyst is $Al(CF_3SO_3)_3$. In some embodiments, the second catalyst is $Cu(CF_3SO_3)_2$. In some embodiments, the second catalyst is $(R^{cat})_3O^+.^-BF_4$. In some embodiments, the second catalyst is $Zn(OTf)_2$. In some embodiments, the second catalyst is $Ga(OTf)_3$. In some embodiments, the second catalyst is $La(OTf)_3$. In some embodiments, the second catalyst is $Yb(OTf)_3$. In some embodiments, the second catalyst is $Ce(OTf)_3$. In some embodiments, the second catalyst is $Sc(OTf)_3$. In some embodiments, the second catalyst is $Lu(OTf)_3$. In some embodiments, the second catalyst is $Fe(OTf)_3$. In some embodiments, the second catalyst is $Zr(OTf)_4$. In some embodiments, the second catalyst is $Hf(OTf)_4$. In some embodiments, the second catalyst is $Y(OTf)_3$.

In some embodiments, the second catalyst is a combination of any two or more catalysts selected from $BF_3$, $PF_5$, $HPF_6$, $HSbF_6$, $CF_3SO_3H$, $Al(CF_3SO_3)_3$, $Cu(CF_3SO_3)_2$, ($R^{cat}$)$_3$O$^+$. $^-$BF$_4$, Zn(OTf)$_2$, Ga(OTf)$_3$, La(OTf)$_3$, Yb(OTf)$_3$, Ce(OTf)$_3$, Sc(OTf)$_3$, Lu(OTf)$_3$, Fe(OTf)$_3$, Zr(OTf)$_4$, Hf(OTf)$_4$, and Y(OTf)$_3$.

Activated Monomer Catalysts

In some embodiments, a second catalyst is an activated monomer reagent. In some embodiments, a second catalyst is an activated monomer reagent having the formula:

A(Q($R^{act}$)$_3$)·B(X$^+$·Y$^-$), wherein:
Q is an atom selected from aluminum and boron;
A is less than B, and A and B are integers between 1 and 10 inclusive;
$R^{act}$ is selected from $C_{1-6}$ alkyl and optionally substituted aryl;
X is selected from the group consisting of: Na, N($R^{act}$)$_4$, N((CH$_2$)$_3$CH$_3$)$_4$, N((CH$_2$)$_7$CH$_3$)$_4$, P((CH$_2$)$_3$CH$_3$)$_4$; and
Y is selected from the group consisting of: OCH$_2$(CH$_3$)$_2$, Cl, Br, and N$_3$.

Organic Catalysts

In some embodiments, a second catalyst is an imidazole or a phosphazene reagent. In some embodiments, an imidazole or phosphazene reagent is selected from the group consisting of:

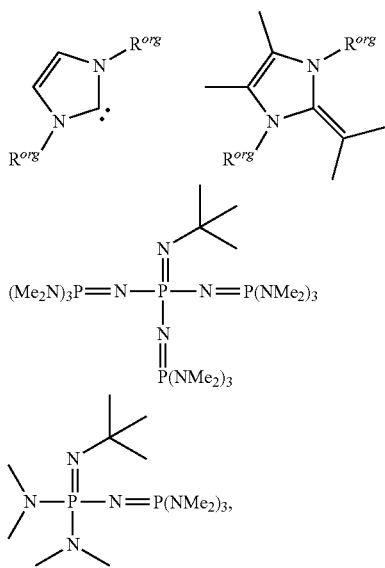

wherein:
$R^{org}$ is independently hydrogen, an optionally substituted radical selected the group consisting of acyl; carbamoyl; arylalkyl; phenyl; 8- to 10-membered aryl; $C_{1-12}$ aliphatic; $C_{1-12}$ heteroaliphatic; 5- to 10-membered heteroaryl; or 4- to 7-membered heterocyclyl.

Coordinative Catalyst

In some embodiments, a second catalyst is a double metal cyanide. In some embodiments, a second catalysts is a double metal cyanide of the formula:

M$^1$[M$^2$(CN)$_6$]L$_\alpha$, wherein:
M$^1$ is Zn;
M$^2$ is selected from Fe and Co;
L is an alcohol;
$\alpha$ is an integer between 1 and 10 inclusive; and
$R^{coo}$ is independently hydrogen, an optionally substituted radical selected the group consisting of acyl, carbamoyl, arylalkyl, phenyl, 8- to 10-membered aryl, $C_{1-12}$ aliphatic, $C_{1-12}$ heteroaliphatic, 5- to 10-membered heteroaryl, or 4- to 7-membered heterocyclyl.

In some embodiments, a second catalyst is a metal alkoxide. In some embodiments, a second catalyst is a metal alkoxide of the formula:

M$^3$(OR$^{coo}$)$_\beta$ wherein:
M$^3$ is Zn, Al, or Ti;
$\beta$ is 2 when M$^1$ is Zn;
$\beta$ is 3 when M$^1$ is Al;
$\beta$ is 4 when M$^1$ is Ti; and
$R^{coo}$ is independently hydrogen, an optionally substituted radical selected the group consisting of acyl, carbamoyl, arylalkyl, phenyl, 8- to 10-membered aryl, $C_{1-12}$ aliphatic, $C_{1-12}$ heteroaliphatic, 5- to 10-membered heteroaryl, or 4- to 7-membered heterocyclyl.

In some embodiments, a second catalyst is a metallosalenate that catalyzes homopolymerization of epoxides. In some embodiments, a second catalyst is a metallosalenate of the structure:

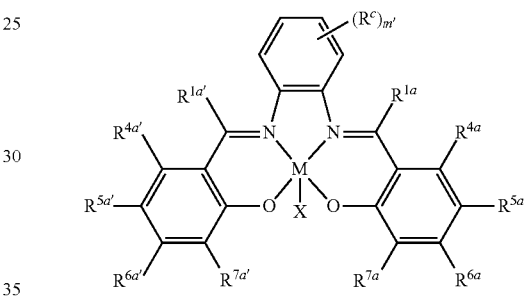

wherein
M is a transition metal;
$R^{1a}$, $R^{1a'}$, $R^{4a}$, $R^{4a'}$, $R^{5a}$, $R^{5a'}$, $R^{6a}$, $R^{6a'}$, $R^{7a}$, and $R^{7a'}$ are each independently a —⁀(Z)$_m$ group, hydrogen, halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur;
wherein [$R^{1a}$ and $R^{4a}$], [$R^{1a}$ and $R^{4a'}$] and any two adjacent $R^{4a}$, $R^{4a'}$, $R^{5a}$, $R^{5a'}$, $R^{6a}$, $R^{6a'}$, $R^{7a}$, and $R^{7a'}$ groups can be taken together with intervening atoms to form one or more optionally substituted rings; —⁀
$R^c$ at each occurrence is independently a —⁀(Z)$_m$ group, hydrogen, halogen, —OR, —NR$_2$, —SR, —CN, —NO$_2$, —SO$_2$R, —SOR, —SO$_2$NR$_2$, —CNO, —NRSO$_2$R, —N CO, —N$_3$, —SiR$_3$, or an optionally substituted radical selected from the group consisting of $C_{1-20}$ aliphatic, $C_{1-20}$ heteroaliphatic, phenyl, a 3- to 8-membered saturated or partially unsaturated monocyclic carbocycle, a 7-14 carbon saturated, partially unsaturated or aromatic polycyclic carbocycle, a 5- to 6-membered monocyclic heteroaryl ring having 1-4 heteroatoms independently selected from nitrogen, oxygen, or sulfur, a 3- to 8-membered saturated or partially unsaturated heterocyclic ring having 1-3 heteroatoms independently selected from nitrogen, oxygen, or sulfur, a 6- to 12-membered polycyclic saturated or partially unsaturated heterocycle having 1-5 heteroatoms independently selected from nitrogen, oxygen, or sulfur, or an 8- to 10-membered bicyclic heteroaryl ring having 1-5 heteroatoms independently selected from nitrogen, oxygen, or sulfur and m' is 0 or an integer from 1 to 4, inclusive.

In some embodiments, M is cobalt.

In some embodiments, $R^{1a}$, $R^{1a'}$, $R^{4a}$, $R^{4a'}$, $R^{5a}$, $R^{5a'}$, $R^{6a}$, $R^{6a'}$, $R^{7a}$, and $R^{7a'}$ are each independently selected from hydrogen and optionally substituted $C_{1-20}$ aliphatic.

In some embodiments, $R^{1a}$, $R^{1a'}$, $R^{4a}$, $R^{4a'}$, $R^{6a}$, and $R^{6a'}$ are each hydrogen.

In some embodiments, $R^{5a}$, $R^{5a'}$, $R^{7a}$, and $R^{7a'}$ are each optionally substituted $C_{1-20}$ aliphatic. In some embodiments, $R^{5a}$, $R^{5a'}$, $R^{7a}$, and $R^{7a'}$ are each methyl, ethyl, propyl, or butyl. In some embodiments, $R^{5a}$, $R^{5a'}$, $R^{7a}$, and $R^{7a'}$ are each t-butyl.

In some embodiments, a second catalyst is:

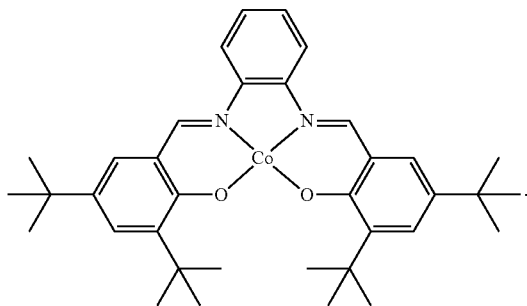

Compositions

The present invention also provides, among other things, polymer compositions comprising triblock copolymers having a central polycarbonate core block (e.g., an epoxide-$CO_2$ copolymer made with a polyfunctional chain transfer agent) flanked by polyether blocks (e.g., homopolymerized epoxides).

In some embodiments, triblock copolymers of formula P1 are made with provided methods. In some embodiments, provided triblock copolymer compositions described herein are derived from a process comprising at least two steps, wherein:

i) at least one epoxide and carbon dioxide are copolymerized in the presence of a chain transfer agent and a first catalyst to create a first polymer of formula P0a as shown in Scheme 1:

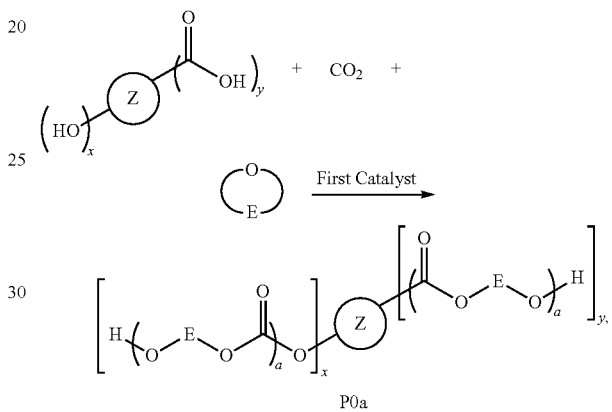

wherein each of Ⓩ, x, y, and, -E-, and a are as defined and described in classes and subclasses herein, both singly and in combination; and ii) an epoxide is homopolymerized on the chain ends of a first polymer by addition of a second catalyst to create a second polymer of formula P0b as shown in scheme 2:

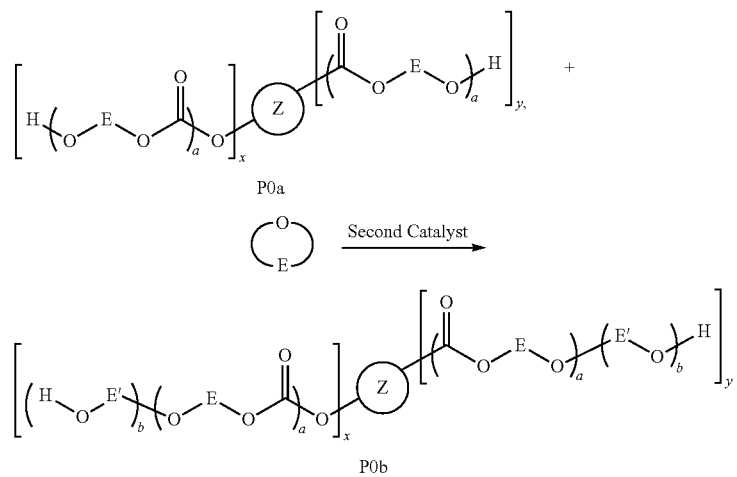

wherein ⓩ, x, y, -E-, -E'-, a, and b are as defined and described in classes and subclasses herein, both singly and in combination.

It will be appreciated that a first polymer of formula P0a corresponds to a first polymer A described above, while a second polymer of formula P0b corresponds to a second polymer B-A-B described above.

In some embodiments, a triblock copolymer composition comprises a structure of formula P1:

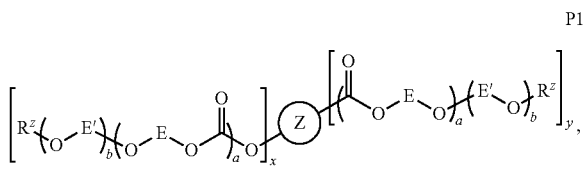

P1 wherein:

ⓩ is a multivalent moiety;

-E- is, independently at each position in the polymer chain,

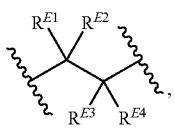

-E'- is, independently at each position in the polymer chain,

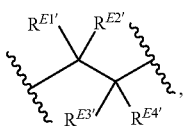

$R^{E1}$, $R^{E2}$, $R^{E3}$, and $R^{E4}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1}$, $R^{E2}$, $R^{E3}$, and $R^{E4}$ may optionally be taken together with intervening atoms to form one or more optionally substituted rings optionally containing one or more heteroatoms;

$R^{E1'}$, $R^{E2'}$, $R^{E3'}$ and $R^{E4'}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1'}$, $R^{E2'}$, $R^{E3'}$ and $R^{E4'}$ may optionally be taken together with intervening atoms to form one or more optionally substituted rings optionally containing one or more heteroatoms;

each $R^z$ is independently selected from the group consisting of —H, —$R^{z10}$, —C(O)$R^{z10}$, —SO$_2R^{z10}$, —Si($R^{z10}$)$_3$, —Si(OR$^{z10}$)$_3$, —SiR$^{z10}$(OR$^{z11}$)$_2$, and —C(O)NH($R^{z10}$);

each $R^{z10}$ is independently an optionally substituted moiety selected from the group consisting of $C_{1-20}$ aliphatic, $C_{1-12}$ heteroaliphatic, 6- to 14-membered aryl, and 5- to 14-membered heteroaryl;

a is, on average in the composition, about 2 to about 50;

b is, on average in the composition, about 2 to about 50; and x and y are each independently an integer from 0 to 6 inclusive, where the sum of x and y is between 2 and 6.

It will be appreciated that when a multivalent moiety is depicted by a chemical formula, the chemical bonds, atoms, and functional groups directly adjacent to ⓩ are also understood to be part of the multivalent moiety. Take the following polymer structure as an example:

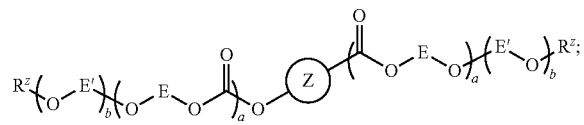

the multivalent moiety depicted immediately above comprises ⓩ, the two chemical bonds drawn from ⓩ, the oxygen atom immediately left of ⓩ, and the carboxyl functionality immediately right of ⓩ. Furthermore, such a multivalent moiety could be derived, for example, from a chain transfer agent of a structure,

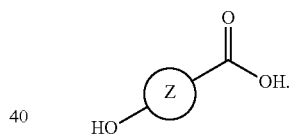

As used herein, a chain transfer agent includes any compound having two or more sites capable of initiating chain growth in the copolymerization of an epoxide and carbon dioxide. In some embodiments, such compounds do not have other functional groups that interfere with the polymerization. In general, the only requirement is that each molecule of the chain transfer agent be capable of initiating two or more polycarbonate chains. This can occur by several mechanisms including: by ring-opening an epoxide monomer, by reacting with carbon dioxide molecules to yield a moiety capable of sustaining polymer chain growth, or by a combination of these.

In some embodiments, a chain transfer agent may have two or more functional groups independently capable of reacting with carbon dioxide or an epoxide; examples of chain transfer agents include but are not limited to molecules such as diacids, glycols, diols, triols, hydroxyacids, amino acids, amino alcohols, dithiols, mercapto alcohols, saccharides, catechols, polyethers, etc. In some embodiments, a chain transfer agent may include a multiply active functional group that is itself able to react multiple times to initiate more than one polymer chain; examples of such chain transfer agents include but are not limited to functional groups having a single atom capable of reacting multiple times such as ammonia, primary amines and water, as well as functional groups having more than one nucleophilic atom such as amindines, guanidines, urea, boronic acids, phosphoric acids, etc.

In some embodiments, a chain transfer agent of the present disclosure has a structure:

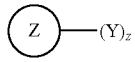

wherein:

ⓩ is a covalent bond or a central moiety;

—Y is each independently a functional group capable of reacting with carbon dioxide or an epoxide;

z is an integer between 2 and 6 inclusive.

In some embodiments, each —Y group is independently selected from the group consisting of: —OH, —C(O)OH, —CH(OR$^{cta}$)OH, —OC(R$^{cta}$)OH, —NHR$^{cta}$, —NHC(O)R$^{cta}$, —NHC=NR$^{cta}$, —NR$^{cta}$C=NH, —NR$^{cta}$C(NR$^{cta}_2$)=NH, —NHC(NR$^{cta}_2$)=NR$^{cta}$, —NHC(O)OR$^{cta}$, —NHC(O)NR$^{cta}_2$, —C(O)NHR$^{cta}$, —C(S)NHR$^{cta}$, —OC(O)NHR$^{cta}$, —OC(S)NHR$^{cta}$, —SH, —C(O)SH, —B(OR$^{cta}$)OH, —P(O)$_a$(R$^{cta}$)$_b$(OR$^{cta}$)$_c$(O)$_d$H, —OP(O)$_a$(R$^{cta}$)$_b$(OR$^{cta}$)$_c$(O)$_d$H, —N(R$^{cta}$)OH, —ON(R$^{cta}$)H; =NOH, =NN(R$^{cta}$)H, wherein:

each occurrence of R$^{cta}$ is independently —H, or an optionally substituted radical selected from the group consisting of C$_{1-20}$ aliphatic, C$_{1-20}$ heteroaliphatic, 3- to 12-membered heterocyclic, and 6- to 12-membered aryl;

a and b are each independently 0 or 1, c is 0, 1 or 2, d is 0 or 1, and the sum of a, b, and c is 1 or 2.

In some embodiments, an acidic hydrogen atom bound in any of the above functional groups may be replaced by a metal atom or an organic cation without departing from the present invention (e.g. —C(O)OH may instead be —C(O)O$^-$ Na$^+$, —C(O)O$^-$ N$^+$(R)$_4$, —C(O)O$^-$ (Ca$^{2+}$)$_{0.5}$, —C(O)O$^-$ PPN$^+$, or —SH, may be —S$^-$Na$^+$, etc.). Such alternatives are included herein and alternate embodiments employing such salts are implicitly encompassed by the disclosure herein.

In some embodiments, ⓩ is derived from any of the chain transfer agents described or exemplified in International Patent Application No. WO 2010/028362, the entirety of which is incorporated herein by reference.

In some embodiments, a multivalent moiety, ⓩ, may be derived from a chain transfer agent. In some embodiments, ⓩ embedded within polycarbonate chains described herein is derived from a chain transfer agent having two or more sites from which epoxide-CO$_2$ copolymerization can occur. In some embodiments, ⓩ comprises one or more atoms selected from the group consisting of carbon, oxygen, nitrogen, phosphorous, sulfur, and boron. In some embodiments, ⓩ comprises one or more carbon atoms. In some embodiments, ⓩ comprises a nitrogen atom. In some embodiments, ⓩ comprises a phosphorous atom. In some embodiments, ⓩ comprises a boron atom. In some embodiments, ⓩ comprises a phosphorous atom. In some embodiments, ⓩ comprises a polymer chain.

In some embodiments, a chain transfer agent has a formula:

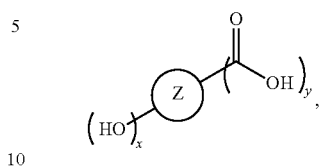

wherein ⓩ, x, and y are as defined above and described in classes and subclasses herein, both singly and in combination.

In some embodiments, x is 2 and y is 0. In some embodiments, ⓩ is derived from a polyhydric alcohol with two hydroxy groups. In some embodiments, a triblock copolymer composition comprises a structure of formula P2:

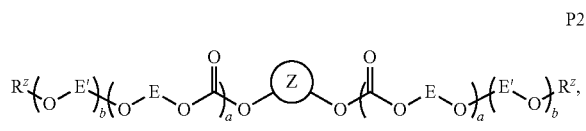

wherein ⓩ, -E-, -E'-, R$^z$, a, and b are as defined above and described in classes and subclasses herein, both singly and in combination.

In some embodiments, ⓩ is derived from a dihydric alcohol. In some embodiments, a dihydric alcohol comprises a C$_{2-20}$ diol. In some embodiments, a dihydric alcohol is selected from the group consisting of: 1,2-ethanediol, 3-Oxa-1,5-pentanediol (i.e., diethylene glycol), 1,2-propanediol, 4-Oxa-2,6-hexandiol (i.e., dipropylene glycol), 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, and alkoxylated derivatives of any of these.

In some embodiments, a dihydric alcohol comprises an alkoxylated derivative of a compound selected from the group consisting of: a diol, a diacid, or a hydroxy acid. In some embodiments, the alkoxylated derivatives comprise ethoxylated or propoxylated compounds.

In some embodiments, x is 3 and y is 0. In some embodiments, ⓩ is derived from a polyhydric alcohol with three hydroxy groups. In some embodiments, a triblock copolymer composition comprises a structure of formula P3:

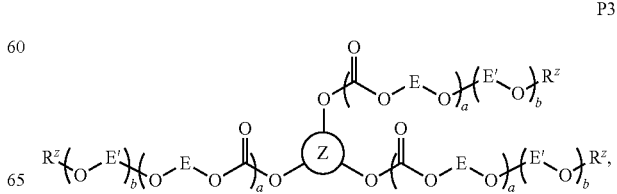

wherein ⓩ, -E-, -E'-, $R^z$, a, and b are as defined above and described in classes and subclasses herein, both singly and in combination.

In some embodiments, ⓩ is derived from a triol. In some embodiments, a triol is selected from the group consisting of: aliphatic triols having a molecular weight less than 500, trimethylolethane, trimethylolpropane, glycerol, 1,2,4-butanetriol, 1,2,6-hexanetriol, tris(2-hydroxyethyl)isocyanurate, hexahydro-1,3,5-tris(hydroxyethyl)-s-triazine, 6-methylheptane-1,3,5-triol, and alkoxylated analogs of any of these.

In some embodiments, ⓩ is derived from an alkoxylated derivative of a trifunctional carboxylic acid or trifunctional hydroxy acid. In some embodiments, alkoxylated polymeric derivatives comprise ethoxylated or propoxylated compounds.

In some embodiments, x is 4 and y is 0. In some embodiments, ⓩ is derived from a polyhydric alcohol with four hydroxy groups. In some embodiments, a triblock copolymer composition comprises a structure of formula P4:

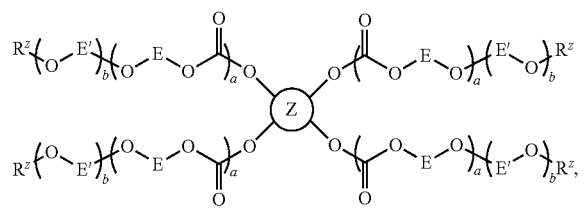

P4 wherein ⓩ, -E-, -E'-, $R^z$, a, and b are as defined above and described in classes and subclasses herein, both singly and in combination.

In some embodiments, x is 5 and y is 0. In some embodiments, ⓩ is derived from a polyhydric alcohol with five hydroxy groups. In some embodiments, a triblock copolymer composition comprises a structure of formula P5:

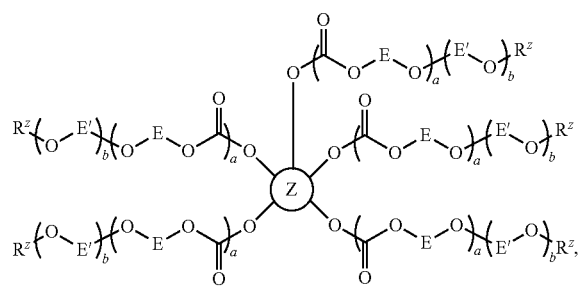

P5 wherein ⓩ, -E-, -E'-, $R^z$, a, and b are as defined above and described in classes and subclasses herein, both singly and in combination.

In some embodiments, x is 6 and y is 0. In some embodiments, ⓩ is derived from a polyhydric alcohol with six hydroxy groups. In some embodiments, a triblock copolymer composition comprises a structure of formula P6:

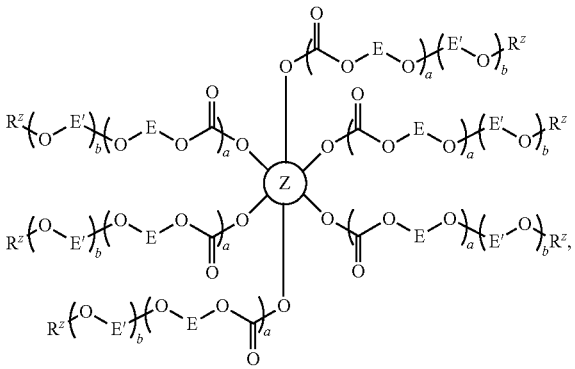

P6 wherein ⓩ, -E-, -E'-, $R^z$, a, and b are as defined above and described in classes and subclasses herein, both singly and in combination.

In some embodiments, x is 1 and y is 1. In some embodiments, ⓩ is derived from hydroxyacid In some embodiments, a triblock copolymer composition comprises a structure of formula P7:

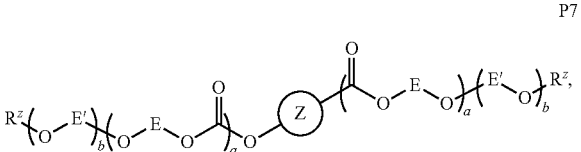

P7 wherein ⓩ, -E-, -E'-, $R^z$, a, and b are as defined above and described in classes and subclasses herein, both singly and in combination.

In some embodiments, x is 0 and y is 2. In some embodiments, ⓩ is derived from a dicarboxylic acid. In some embodiments, a triblock copolymer composition comprises a structure of formula P8:

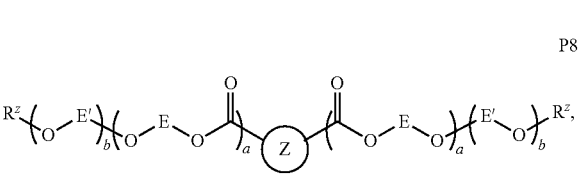

P8 wherein ⓩ, -E-, -E'-, $R^z$, a, and b are as defined above and described in classes and subclasses herein, both singly and in combination.

In some embodiments, ⓩ is derived from a molecule comprising phosphorous. In some embodiments, ⓩ has a formula $-P(O)(OR)_k-$, wherein k is 0, 1, or 2; and each R is independently hydrogen, an optionally substituted $C_{1-20}$ aliphatic group, or an optionally substituted aryl group. In some embodiments, ⓩ is derived from a molecule comprising phosphorous and selected from the group consisting of:

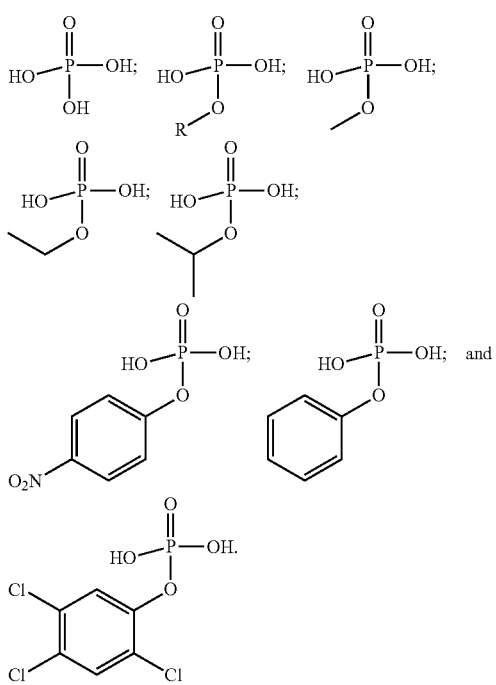

In some embodiments, (z) has a formula —P(O)(OR)$_j$(R)$_k$—, wherein j is 1 or 2; k is 0; the sum of j and k is not more than 2; and each R is independently hydrogen, an optionally substituted C$_{1-20}$ aliphatic group, or an optionally substituted aryl group. In some embodiments, (z) is derived from a molecule comprising phosphorous and selected from the group consisting of:

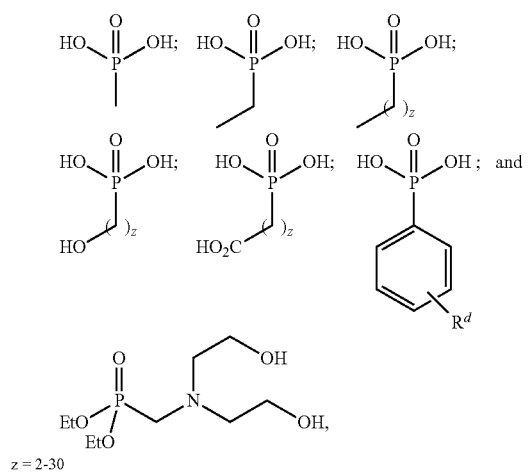

z = 2-30 wherein:
R$^d$ is selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$, or an optionally substituted group selected from the group consisting of C$_{1-20}$ aliphatic, C$_{1-20}$ heteroaliphatic comprising 1-4 heteroatoms independently selected from the group consisting of nitrogen, oxygen, and sulfur, 6-10 membered aryl; 5-10 membered heteroaryl comprising 1-4 heteroatoms independently selected from nitrogen, oxygen, or sulfur; and 4-7 membered heterocyclic comprising 1-2 heteroatoms independently selected from the group consisting of nitrogen, oxygen, and sulfur.

In some embodiments, (z) is derived from a molecule comprising boron. In some embodiments, (z) has a formula —B(R)—, and each R is independently hydrogen, an optionally substituted C$_{1-20}$ aliphatic group, or an optionally substituted aryl group. In some embodiments, (z) is derived from a molecule comprising boron and selected from the group consisting of:

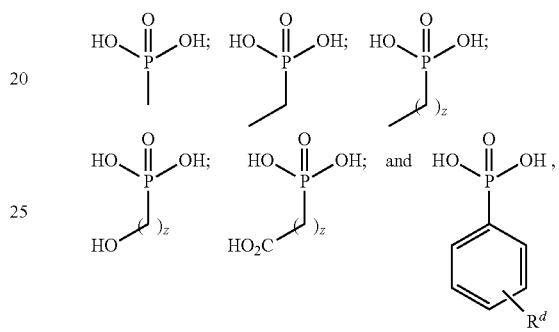

z = 2-30 wherein R$^d$ is as defined above and described in classes and subclasses herein.

In some embodiments, -E- is, independently at each position in the polymer chain, selected from the group consisting of:

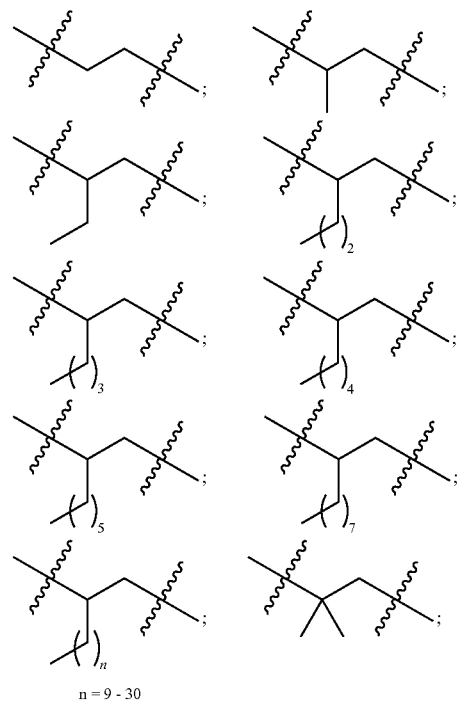

n = 9 - 30

-continued

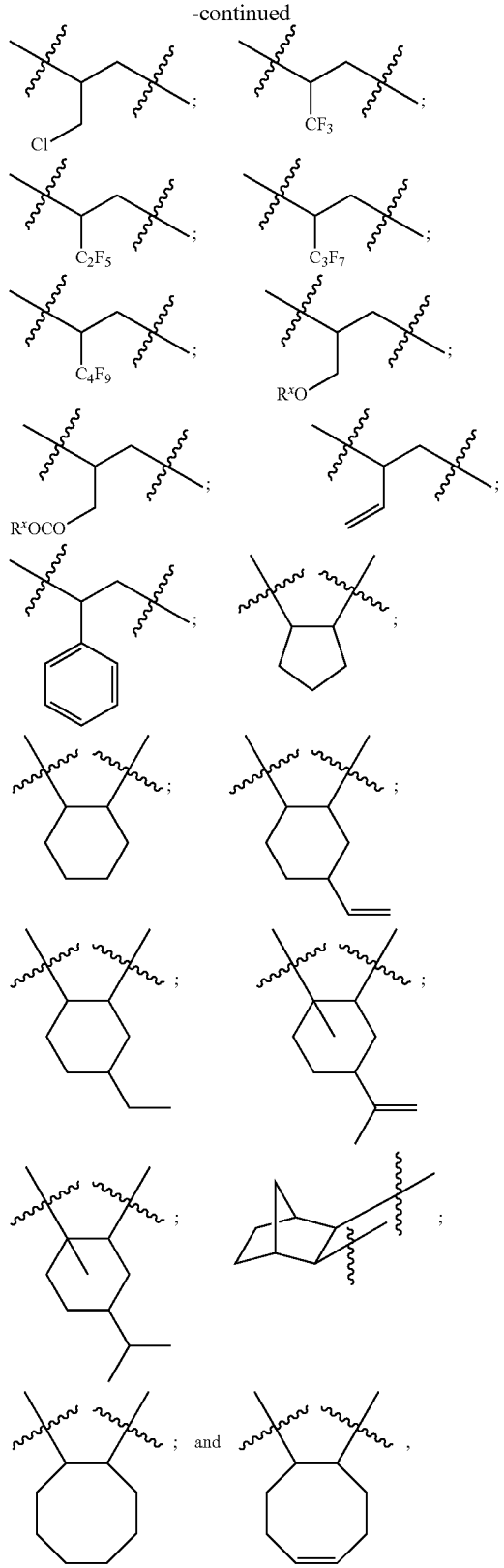

wherein each $R^x$ is independently selected from the group consisting of: optionally substituted aliphatic, optionally substituted heteroaliphatic, optionally substituted aryl, and optionally substituted heteroaryl.

In some embodiments, -E- is, independently at each position in the polymer chain, selected from the group consisting of:

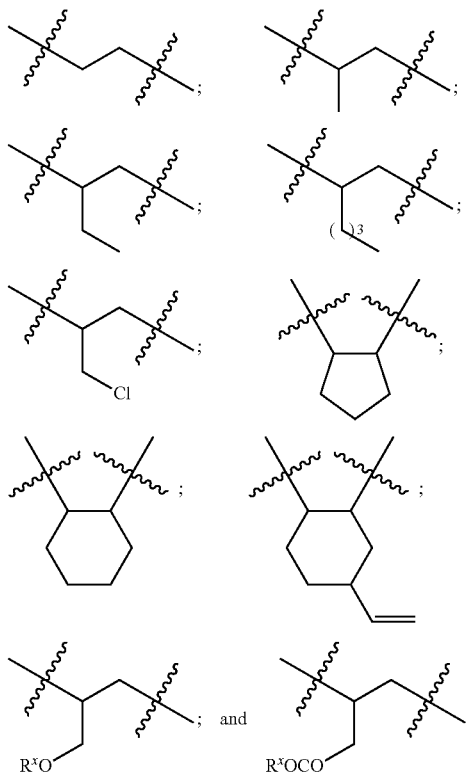

wherein each $R^x$ is as defined above and described in classes and subclasses herein.

In some embodiments, -E'- is, independently at each position in the polymer chain, selected from the group consisting of:

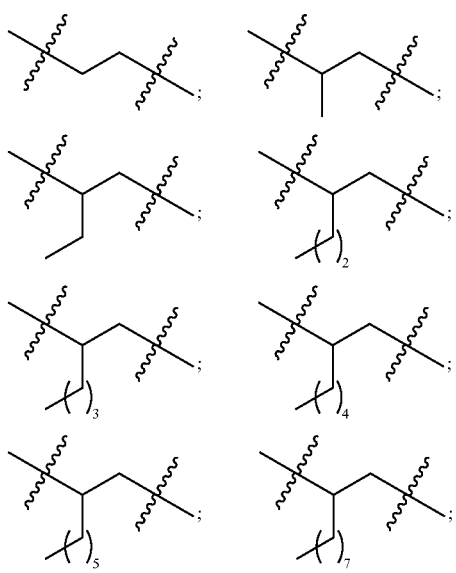

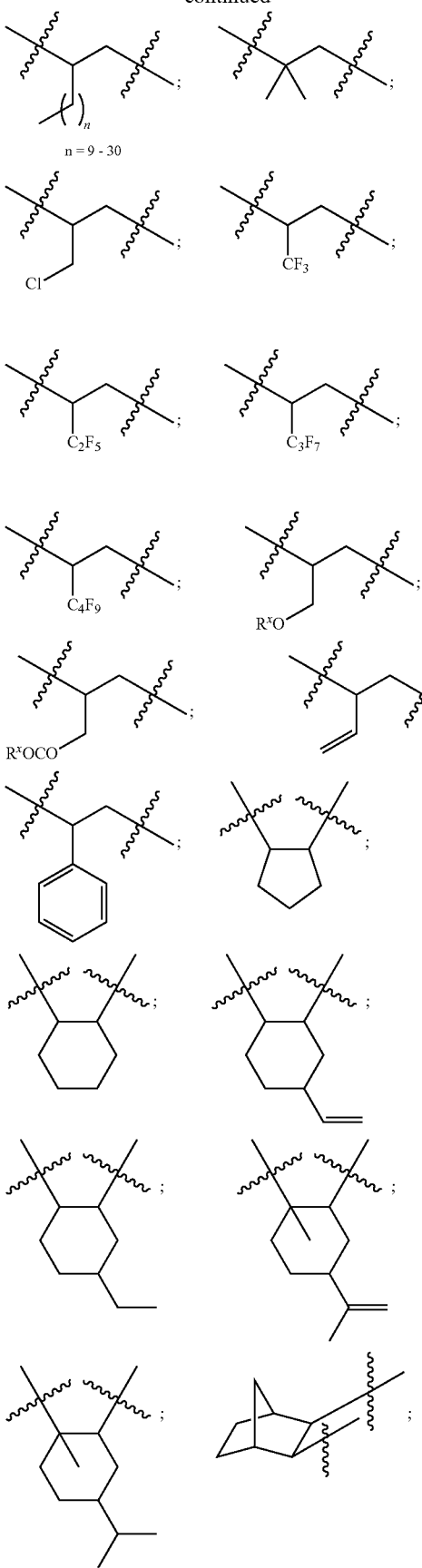

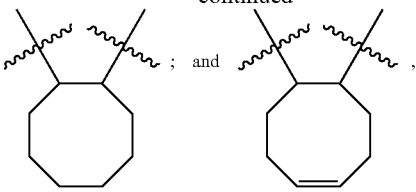

wherein each $R^x$ is independently selected from the group consisting of: optionally substituted aliphatic, optionally substituted heteroaliphatic, optionally substituted aryl, and optionally substituted heteroaryl.

In some embodiments, -E'- is, independently at each position in the polymer chain, selected from the group consisting of:

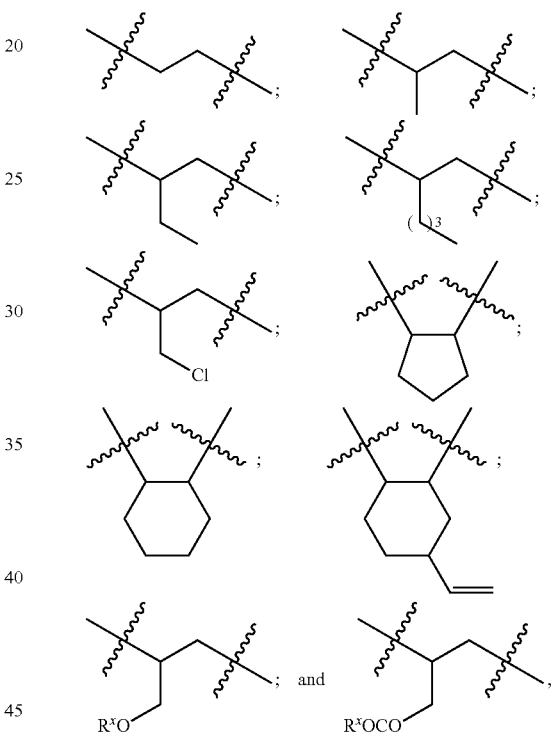

wherein each $R^x$ is as defined above and described in classes and subclasses herein.

In some embodiments, -E- is, independently at each position in the polymer chain, derived from an epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

In some embodiments, -E'- is, independently at each position in the polymer chain, derived from an epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

In some embodiments, -E- is, independently at each position in the polymer chain, derived from ethylene oxide or propylene oxide. In some embodiments, -E- is derived predominantly from ethylene oxide (e.g., at each occurrence of -E-, $R^{E1}$, $R^{E2}$, $R^{E3}$, and $R^{E4}$ are hydrogen). In some embodiments, -E- is derived predominantly from propylene oxide (e.g., at each occurrence of -E-, one of $R^{E1}$, $R^{E2}$, $R^{E3}$, and $R^{E4}$ is methyl and the others are hydrogen).

In some embodiments, -E'- is, independently at each position in the polymer chain, derived from ethylene oxide or propylene oxide. In some embodiments, -E'- is derived predominantly from ethylene oxide (e.g., at each occurrence of -E'-, $R^{E1'}$, $R^{E2'}$, $R^{E3'}$, and $R^{E4'}$ are hydrogen). In some embodiments, -E'- is derived predominantly from propylene oxide (e.g., at each occurrence of -E'-, one of $R^{E1'}$, $R^{E2'}$, $R^{E3'}$, and $R^{E4'}$ is methyl and the others are hydrogen). In some embodiments, at least a portion of the -E'- moieties are derived from ethylene oxide. In some embodiments, at least a portion of the -E'- moieties are derived from propylene oxide.

In some embodiments, both -E- and -E'- are derived from substituted epoxides (i.e., other than ethylene oxide), such that a head-to-tail ratio of enchained epoxide monomers results in each block of the polymer. In some embodiments, a polymer composition is characterized in that on average in the composition, the head-to-tail ratio within the moieties,

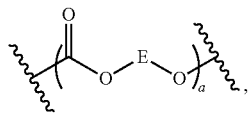

is higher than the head-to-tail ratio within the moieties,

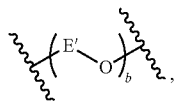

wherein the head-to-tail ratio is measured as viewed from the Ⓩ moiety toward the direction of the chain end.

In some embodiments, a polymer composition is characterized in that within the moiety,

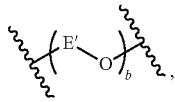

the regiochemistry is predominantly tail-to-head.

In some embodiments, a polymer composition is characterized in that more than 20%, more than 30%, more than 40%, more than 50%, more than 55%, more than 60%, more than 65%, more than 70%, more than 75%, more than 80%, more than 85%, more than 90%, or more than 95% of the chain ends have the structure

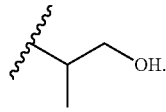

In some embodiments, where polymer compositions are derived from monosubstituted epoxides (e.g. such as propylene oxide, 1,2-butylene oxide, epichlorohydrin, or a glycidol derivative), the aliphatic polycarbonates are characterized in that they are regioregular. Regioregularity may be expressed as the percentage of adjacent monomer units that are oriented in a head-to-tail arrangement within the polymer chain.

In some embodiments, a provided polymer composition is characterized in that polycarbonate chains of the polymer composition have a head-to-tail content greater than about 80%, as determined by an appropriate analytical technique, for example, $^1H$ or $^{13}C$ NMR spectroscopy. In some embodiments, a head-to-tail content is greater than about 85%. In some embodiments, a head-to-tail content is greater than about 90%. In some embodiments, a head-to-tail content is greater than about 91%. In some embodiments, a head-to-tail content is greater than about 92%. In some embodiments, a head-to-tail content is greater than about 93%. In some embodiments, a head-to-tail content is greater than about 94%. In some embodiments, a head-to-tail content is greater than about 95%. In some embodiments, a head-to-tail content is greater than about 97%. In some embodiments, a head-to-tail content is greater than about 99%.

In some embodiments, a provided polymer composition is characterized in that polyether chains of the polymer composition have a head-to-tail content greater than about 50%. In some embodiments, a head-to-tail content is greater than about 60%. In some embodiments, a head-to-tail content is greater than about 70%. In some embodiments, a head-to-tail content is greater than about 85%. In some embodiments, a head-to-tail content is greater than about 90%. In some embodiments, a head-to-tail content is greater than about 91%. In some embodiments, a head-to-tail content is greater than about 92%. In some embodiments, a head-to-tail content is greater than about 93%. In some embodiments, a head-to-tail content is greater than about 94%. In some embodiments, a head-to-tail content is greater than about 95%. In some embodiments, a head-to-tail content is greater than about 97%. In some embodiments, a head-to-tail content is greater than about 99%.

In some embodiments, a provided polymer composition is characterized in that polyether chains of the polymer composition have a head-to-tail content less than about 50%/a. In some embodiments, a head-to-tail content is less than about 40%/a. In some embodiments, a head-to-tail content is less than about 30%/a. In some embodiments, a head-to-tail content is less than about 15%. In some embodiments, a head-to-tail content is less than about 10%. In some embodiments, a head-to-tail content is less than about 9%/a. In some embodiments, a head-to-tail content is less than about 8%. In some embodiments, a head-to-tail content is less than about 7%. In some embodiments, a head-to-tail content is less than about 6%. In some embodiments, a head-to-tail content is less than about 5%. In some embodiments, a head-to-tail content is less than about 3%. In some embodiments, a head-to-tail content is less than about 1%.

In some embodiments, a provided polymer composition is characterized in that polyether chains of the polymer composition have a tail-to-head content greater than about 50/a %. In some embodiments, a tail-to-head content is greater than about 60%. In some embodiments, a tail-to-head content is greater than about 70%/a. In some embodiments, a tail-to-head content is greater than about 85%. In some embodiments, a tail-to-head content is greater than about 90%. In some embodiments, a tail-to-head content is greater than about 91%. In some embodiments, a tail-to-head content is greater than about 92%. In some embodiments, a tail-to-head content is greater than about 93%. In some embodiments, a tail-to-head content is greater than about 94%. In some embodiments, a tail-to-head content is greater than about 95%. In some embodiments, a tail-to-head content is greater than about 97%. In some embodiments, a tail-to-head content is greater than about 99%.

In some embodiments, a triblock copolymer composition is characterized in that it has an average molecular weight ($M_n$) in the range of about 500 g/mol to about 250,000 g/mol, as is determined by an appropriate analytical technique, for example, gel permeation chromatography (GPC). In some embodiments, a triblock copolymer composition has a $M_n$ in the range of about 500 g/mol to about 200,000 g/mol. In some embodiments, a triblock copolymer composition has a $M_n$ in the range of about 500 g/mol to about 150,000 g/mol. In some embodiments, a triblock copolymer composition has a $M_n$ in the range of about 500 g/mol to about 100,000 g/mol. In some embodiments, a triblock copolymer composition has a $M_n$ in the range of about 500 g/mol to about 75,000 g/mol. In some embodiments, a triblock copolymer composition has a $M_n$ in the range of about 500 g/mol to about 50,000 g/mol. In some embodiments, a triblock copolymer composition has a $M_n$ in the range of about 500 g/mol to about 25,000 g/mol. In some embodiments, a triblock copolymer composition has a $M_n$ in the range of about 500 g/mol to about 10,000 g/mol. In some embodiments, a triblock copolymer composition has a $M_n$ in the range of about 500 g/mol to about 5,000 g/mol. In some embodiments, a triblock copolymer composition has a $M_n$ in the range of about 500 g/mol to about 4,000 g/mol. In some embodiments, a triblock copolymer composition has a $M_n$ in the range of about 500 g/mol to about 3,000 g/mol. In some embodiments, a triblock copolymer composition has a $M_n$ in the range of about 500 g/mol to about 2,000 g/mol.

In some embodiments, a triblock copolymer composition is characterized in that it has a $M_n$ less than about 250,000 g/mol, as is determined by an appropriate analytical technique, for example, gel permeation chromatography (GPC). In some embodiments, a triblock copolymer composition has a $M_n$ less than about 200,000 g/mol. In some embodiments, a triblock copolymer composition has a $M_n$ less than about 150,000 g/mol. In some embodiments, a triblock copolymer composition has a $M_n$ less than about 100,000 g/mol. In some embodiments, a triblock copolymer composition has a $M_n$ less than about 75,000 g/mol. In some embodiments, a triblock copolymer composition has a $M_n$ less than about 50,000 g/mol. In some embodiments, a triblock copolymer composition has a $M_n$ less than about 25,000 g/mol. In some embodiments, a triblock copolymer composition has a $M_n$ less than about 10,000 g/mol. In some embodiments, a triblock copolymer composition has a $M_n$ less than about 5,000 g/mol. In some embodiments, a triblock copolymer composition has a $M_n$ less than about 4,000 g/mol. In some embodiments, a triblock copolymer composition has a $M_n$ less than about 3,000 g/mol. In some embodiments, a triblock copolymer composition has a $M_n$ less than about 2,000 g/mol.

In some embodiments, a triblock copolymer composition is characterized in that it has a narrow molecular weight distribution. This can be indicated by the polydispersity index (PDI) of the triblock copolymer composition. In some embodiments, a triblock copolymer composition has a PDI less than 2. In some embodiments, a triblock copolymer composition has a PDI less than 1.8. In some embodiments, a triblock copolymer composition has a PDI less than 1.5. In some embodiments, a triblock copolymer composition has a PDI less than 1.4. In some embodiments, a triblock copolymer composition has a PDI between about 1.0 and 1.2. In some embodiments, a triblock copolymer composition has a PDI between about 1.0 and 1.1.

In some embodiments, a triblock copolymer composition is characterized in that it has a viscosity less than 20,000 centipoise at 50° C. In some embodiments, a triblock copolymer composition has a viscosity less than 10,000 centipoise at 50° C. In some embodiments, a triblock copolymer composition has a viscosity less than 7,500 centipoise at 50° C. In some embodiments, a triblock copolymer composition has a viscosity less than 5,000 centipoise at 50° C. In some embodiments, a triblock copolymer composition has a viscosity less than 4,000 centipoise at 50° C. In some embodiments, a triblock copolymer composition has a viscosity less than 3,000 centipoise at 50° C.

Higher Polymers

The present disclosure further encompasses higher polymers derived from the triblock copolymers described herein. In certain embodiments, such higher polymers are formed by reacting the polyols with suitable cross-linking agents. Examples of higher polymers that may be made using the polyols of the present invention as well as suitable reagents, conditions, processing methods and formulations are disclosed in WO 2011/163250.

In certain embodiments, cross-linkers including functional groups reactive toward hydroxyl groups are selected, for example, from epoxy, melamine, and isocyanate groups. In certain embodiments, such cross-linking agents are polyisocyanates.

In some embodiments, a difunctional or higher-functionality isocyanate is selected from di-isocyanates, the biurets and cyanurates of diisocyanates, and the adducts of diisocyanates to polyols. Suitable diisocyanates have generally from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)methane, isophorone diisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane diisocyanatohexane and isophorone diisocyanate, and mixtures thereof.

In certain embodiments, crosslinking compounds comprise the cyanurates and biurets of aliphatic diisocyanates. In certain embodiments, crosslinking compounds are the di-isocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

In some embodiments, a polyisocyanate used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

In some embodiments, a modified product of a polyisocyanate is a prepolymer modified product which is a reaction product of a low molecular weight diol with a low molecular weight triol, a buret product which is a reaction product with water, or a trimer having an isocyanurate skeleton.

The isocyanate group-terminated prepolymer can be produced by reacting a stoichiometrically excess amount of a polyisocyanate to the polyol composition. It can be produced by thermally reacting the polyol composition with the polyisocyanate at a temperature of from 60 to 100° C. for from 1 to 30 hours in a dry nitrogen stream in the presence or absence of a solvent and optionally in the presence of a urethane-forming catalyst. In some embodiments, a urethane-forming catalyst is an organometallic compound of tin, lead or titanium. In some embodiments a urethane-forming catalyst is an organic tin compound, such as dibutyltin dilaurate, dibutyltin dioctoate or stannous octoate.

An isocyanate group-terminated prepolymer of the present invention can be used for uses known in the art and familiar to the skilled artisan. In some embodiments, it can be used for a humidity curable composition which is cured by a reaction with moisture in air, a two-part curable composition to be reacted with a curing agent such as a polyamine, a polyol or a low molecular weight polyol, a casting polyurethane elastomer, or other applications.

EXEMPLARY EMBODIMENTS

The embodiments presented below are examples of compositions, methods, and uses described in the present application.

Embodiment 1

A triblock copolymer composition comprising a structure of formula P1:

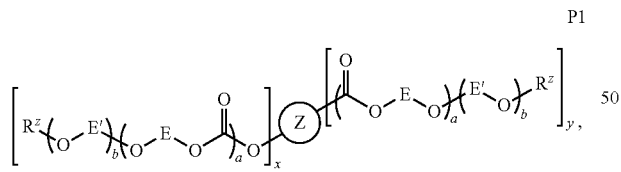

P1 wherein:

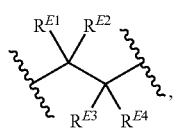 is a multivalent moiety;

-E- is, independently at each position in the polymer chain,

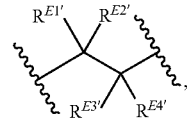

-E'- is, independently at each position in the polymer chain,

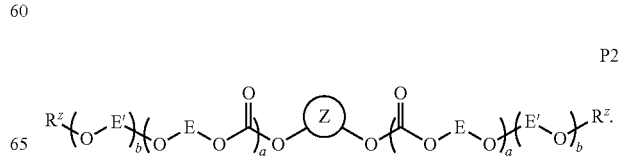

$R^{E1}$, $R^{E2}$, $R^{E3}$, and $R^{E4}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1}$, $R^{E2}$, $R^{E3}$, and $R^{E4}$ may optionally be taken together with intervening atoms to form one or more optionally substituted rings optionally containing one or more heteroatoms;

$R^{E1'}$, $R^{E2'}$, $R^{E3'}$ and $R^{E4'}$ are at each occurrence in the polymer chain independently selected from the group consisting of hydrogen, fluorine, an optionally substituted $C_{1-40}$ aliphatic group, an optionally substituted $C_{1-20}$ heteroaliphatic group, and an optionally substituted aryl group, where any two or more of $R^{E1'}$, $R^{E2'}$, $R^{E3'}$ and $R^{E4'}$ may optionally be taken together with intervening atoms to form one or more optionally substituted rings optionally containing one or more heteroatoms;

each $R^z$ is independently selected from the group consisting of —H, —$R^{z10}$, —C(O)$R^{z10}$, —$SO_2R^{z10}$, —Si($R^{z10}$)$_3$, —Si(O$R^{z10}$)$_3$, —Si$R^{z10}$(O$R^{z11}$)$_2$, and —C(O)NH($R^{z10}$);

each $R^{z10}$ is independently an optionally substituted moiety selected from the group consisting of $C_{1-20}$ aliphatic, $C_{1-12}$ heteroaliphatic, 6- to 14-membered aryl, and 5- to 14-membered heteroaryl;

a is, on average in the composition, about 2 to about 50;

b is, on average in the composition, about 2 to about 50; and x and y are each independently an integer from 0 to 6 inclusive, where the sum of x and y is between 2 and 6.

Embodiment 2

The polymer composition of Embodiment 1, wherein x is 2 and y is 0.

Embodiment 3

The polymer composition of any one of Embodiments 1-2, wherein the polymer composition comprises polymer chains of formula P2:

P2

Embodiment 4

The polymer composition of any one of Embodiments 1-3, wherein ⓩ is derived from a dihydric alcohol.

Embodiment 5

The polymer composition of Embodiment 4, wherein ⓩ is derived from a dihydric alcohol comprising a $C_{2-20}$ diol.

Embodiment 6

The polymer composition of Embodiment 4, wherein ⓩ is derived from a dihydric alcohol selected from the group consisting of 1,2-ethanediol, 3-Oxa-1,5-pentanediol (i.e., diethylene glycol), 1,2-propanediol, 4-Oxa-2,6-hexanediol (i.e., dipropylene glycol), 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, and alkoxylated derivatives of any of these.

Embodiment 7

The polymer composition of Embodiment 1, wherein x is 3 and y is 0.

Embodiment 8

The polymer composition of any one of Embodiments 1 and 7, wherein the polymer composition comprises polymer chains of formula P3:

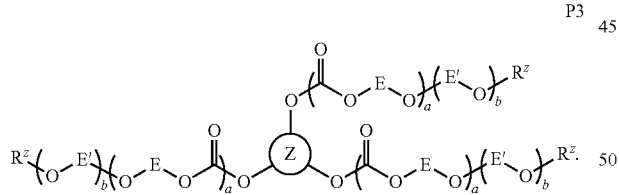

P3

Embodiment 9

The polymer composition of Embodiment 8, wherein ⓩ is derived from a triol.

Embodiment 10

The polymer composition of Embodiment 8, wherein ⓩ is derived from a triol is selected from the group consisting of: aliphatic triols having a molecular weight less than 500, trimethylolethane, trimethylolpropane, glycerol, 1,2,4-butanetriol, 1,2,6-hexanetriol, tris(2-hydroxyethyl)isocyanurate, hexahydro-1,3,5-tris(hydroxyethyl)-s-triazine, 6-methylheptane-1,3,5-triol, and alkoxylated analogs of any of these.

Embodiment 11

The polymer composition of any one of Embodiments 1-10, wherein -E- is, independently at each position in the polymer chain, selected from the group consisting of:

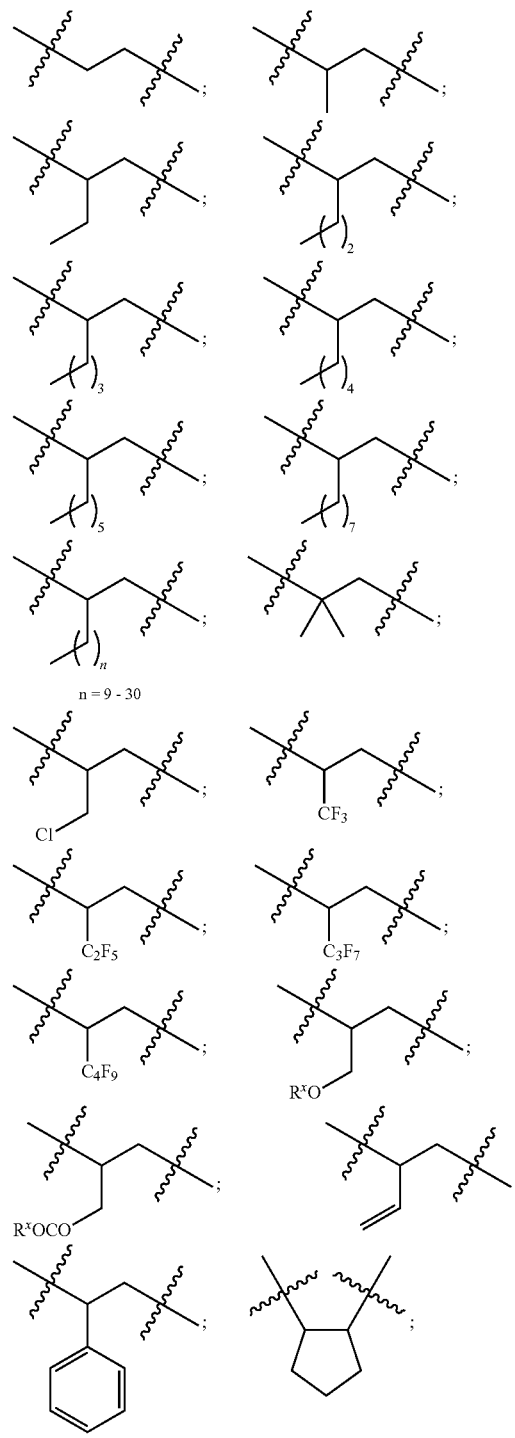

-continued

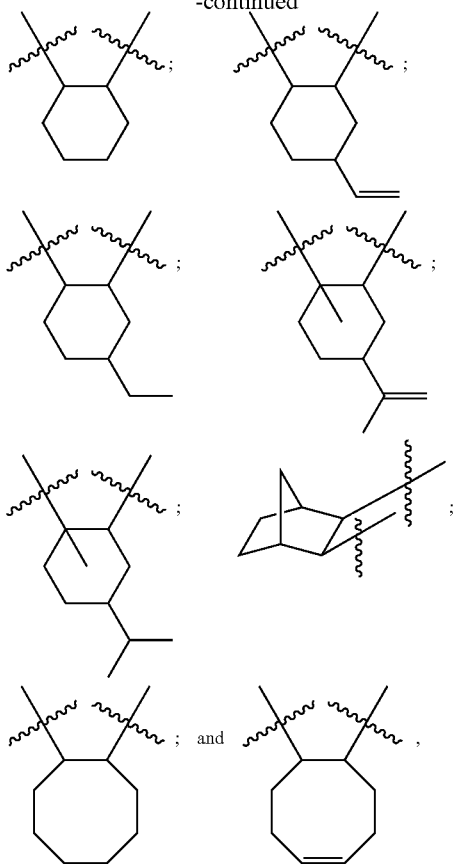

wherein each $R^x$ is independently selected from the group consisting of: optionally substituted aliphatic, optionally substituted heteroaliphatic, optionally substituted aryl, and optionally substituted heteroaryl.

Embodiment 12

The polymer composition of any one of Embodiments 1-11, wherein each -E- is, independently at each position in the polymer chain, derived from an epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

Embodiment 13

The polymer composition of any one of Embodiments 1-12, wherein -E- moieties are derived predominantly from propylene oxide (e.g., at each occurrence of -E-, one of $R^{E1}$, $R^{E2}$, $R^{E3}$, and $R^{E4}$ is methyl and the others are hydrogen).

Embodiment 14

The polymer composition of any one of Embodiments 1-12, wherein -E- moieties are derived predominantly from ethylene oxide (e.g., at each occurrence of -E-, $R^{E1}$, $R^{E2}$, $R^{E3}$, and $R^{E4}$ are hydrogen).

Embodiment 15

The polymer composition of any one of Embodiments 1-14, wherein -E'- is, independently at each position in the polymer chain, selected from the group consisting of:

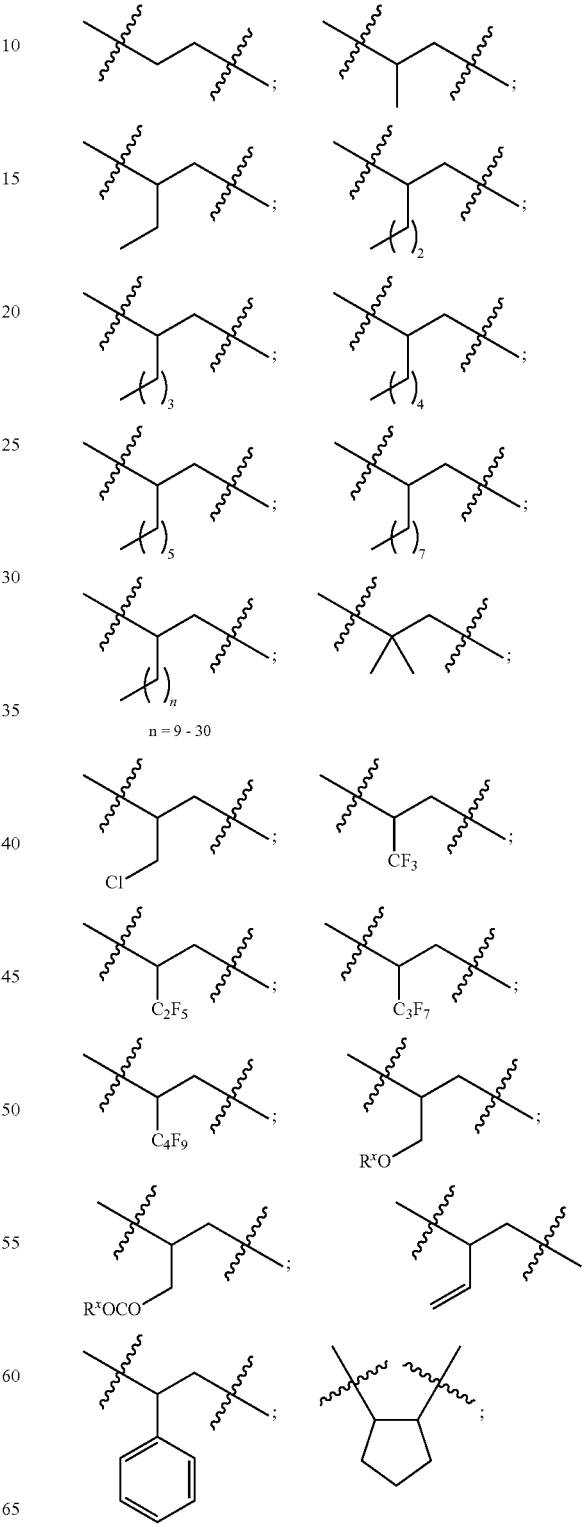

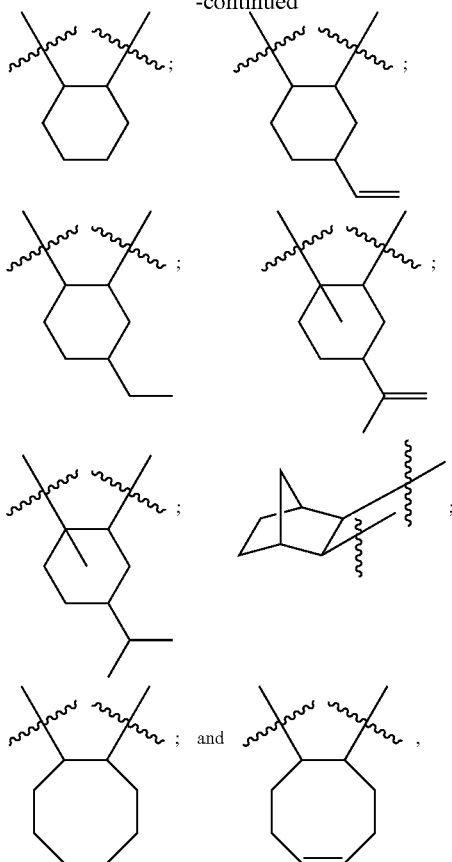

wherein each $R^x$ is independently selected from the group consisting of: optionally substituted aliphatic, optionally substituted heteroaliphatic, optionally substituted aryl, and optionally substituted heteroaryl.

Embodiment 16

The polymer composition of any one of Embodiments 1-15, wherein each -E- is, independently at each position in the polymer chain, derived from an epoxide selected from the group consisting of: ethylene oxide, propylene oxide, 1,2-butylene oxide, 1,2-hexylene oxide, oxides of higher alpha olefins (e.g. $C_{6-40}$ alpha olefins), butadiene monoepoxide, styrene oxide, epichlorohydrin, ethers or esters of glycidol, cyclopentene oxide, cyclohexene oxide, 3-vinyl cyclohexene oxide, 3-ethyl cyclohexene oxide, and combinations of any two or more of these.

Embodiment 17

The polymer composition of any one of Embodiments 1-16, wherein at least a portion of -E'- moieties are derived from ethylene oxide.

Embodiment 18

The polymer composition of any one of Embodiments 1-16, wherein -E'- moieties are derived predominantly from ethylene oxide (e.g., at each occurrence of -E'-, $R^{E1'}$, $R^{E2'}$, $R^{E3'}$ and $R^{E4'}$ are hydrogen).

Embodiment 19

The polymer composition of any one of Embodiments 1-16, wherein at least a portion of -E'- moieties are derived from propylene oxide.

Embodiment 20

The polymer composition of any one of Embodiments 1-16, wherein -E'- moieties are derived predominantly from propylene oxide (e.g., at each occurrence of -E'-, one of $R^{E1'}$, $R^{E2'}$, $R^{E3'}$ and $R^{E4'}$ is methyl and the others are hydrogen).

Embodiment 21

The polymer composition of any one of Embodiments 1-16, wherein -E- and -E'- are derived from ethylene oxide or propylene oxide.

Embodiment 22

The polymer composition of any one of Embodiments 1-16, wherein -E- and -E'- are derived predominantly from ethylene oxide.

Embodiment 23

The polymer composition of any one of Embodiments 1-16, wherein -E- and -E'- are derived predominantly from propylene oxide.

Embodiment 24

The polymer composition of any one of Embodiments 1-23, characterized in that on average in the composition, the head-to-tail ratio within the moieties,

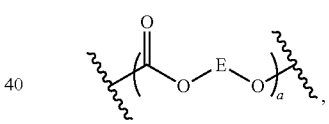

is higher than the head-to-tail ratio within the moieties,

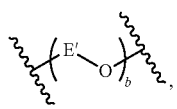

wherein the head-to-tail ratio is measured as viewed from the Ⓩ moiety toward the direction of the chain end.

Embodiment 25

The polymer composition of any one of Embodiments 1-24, characterized in that within the moiety,

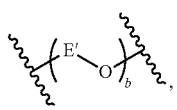

the regiochemistry is predominantly tail-to-head.

Embodiment 26

The polymer composition of any one of Embodiments 1-25, wherein $R^z$ is —H.

Embodiment 27

The polymer composition of any one of Embodiments 1-26, characterized in that more than 50%, more than 55%, more than 60%, more than 65%, more than 70%, or more than 75% of the chain ends have the structure

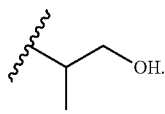 [SMILES: *C(C)CO]

Embodiment 28

The polymer composition of any one of Embodiments 1-25, wherein $R^z$ is selected from the group consisting of —$R^{z10}$, —$C(O)R^{z10}$, —$SO_2R^{z10}$, —$Si(R^{z10})_3$, —$Si(OR^{z10})_3$, —$SiR^{z10}(OR^{z10})_2$, and —$C(O)NH(R^{z10})$.

Embodiment 29

The polymer composition of any one of Embodiments 1-28, wherein the composition is characterized in that it has a viscosity less than 20,000, 10,000, 7,500, 5,000, 4,000, or 3,000 centipoise at 50° C.

Embodiment 30

The polymer composition of any one of Embodiments 1-28, wherein the composition is characterized in that it has a viscosity less than 600, 550, 500, 450, 400, or 350 centipoise at 75° C.

Embodiment 31

The polymer composition of any one of Embodiments 1-28, wherein the composition is characterized in that it has a viscosity less than 40,000, 30,000, 25,000, 22,500, 20,000, or 17,500 centipoise at 25° C.

Embodiment 32

The polymer composition of any one of Embodiments 1-31, wherein the molar percent of primary OH end groups in a triblock B-A-B polymer is greater than about 30%, greater than about 35%, greater than about 40%, greater than about 45%, or greater than about 50%, greater than about 55%, greater than about 60%, greater than about 65%, or greater than about 70%.

Embodiment 33

The polymer composition, of any one of Embodiments 1-32, wherein the composition is characterized in that it has a polydispersity index (PDI) less than 2, 1.8, 1.5, 1.4, or between 1.0 and 1.2, or between 1.0 and 1.1.

Embodiment 34

A method of making a triblock polymer composition of the formula B-A-B, comprising the steps of:
i) copolymerizing epoxide and carbon dioxide in the presence of a chain transfer agent and a first catalyst to provide a first polymer A; and
ii) homopolymerizing epoxide on the chain ends of the first polymer A by addition of a second catalyst to provide a second polymer, B-A-B.

Embodiment 35

The method of Embodiment 34, wherein A is an oligomer selected from a polycarbonate and polyethercarbonate chain.

Embodiment 36

The method of any one of Embodiments 34-35, wherein the epoxide homopolymerized in step ii) is residual epoxide from step i).

Embodiment 37

The method of any one of Embodiments 34-36, wherein step i) is not quenched until the addition of the second catalyst.

Embodiment 38

The method of any one of Embodiments 34-37, wherein steps i) and ii) are accomplished in the same reactor.

Embodiment 39

The method of any one of Embodiments 34-38, wherein the first catalyst is a transition metal complex.

Embodiment 40

The method of any one of Embodiments 34-39, wherein the first catalyst is a metal salen complex.

Embodiment 41

The method of any one of Embodiments 34-40, wherein a first catalyst has a structure:

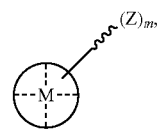

wherein:

⊕ comprises a multidentate ligand;
M is a metal atom; and
—$\sim\sim(Z)_m$ represents one or more activating moieties covalently tethered to the multidentate ligand, where —$\sim\sim$ represents a linker moiety, each Z is an activating functional group, and m represents the number of Z groups present on a linker moiety and is an integer between 1 and 4 inclusive.

Embodiment 42

The method of any one of Embodiments 34-41, wherein the first catalyst is a metal complex having a structure:

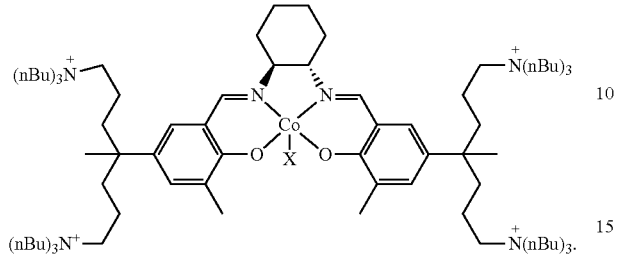

Embodiment 43

The method of any one of Embodiments 34-42, wherein a second catalyst is an anionic reagent of the formula:

$$M^{n+}\text{-}(OH)_n,$$

wherein:
n is an integer between 1 and 2 inclusive;
when n is 1, M is selected from the group consisting of: Li, Na, K, and Rb, Cs; and
when n is 2, M is selected from: Ba and Sr.

Embodiment 44

The method of any one of Embodiments 34-42, wherein a second catalyst is a cationic reagent cationic reagent selected from the group consisting of $BF_3$, $PF_5$, $HPF_6$, $HSbF_6$, $CF_3SO_3H$, $Al(CF_3SO_3)_3$, $Cu(CF_3SO_3)_2$, and $(R^{cat})_3O^+\cdot{}^-BF_4$, wherein:
$R^{cat}$ is independently hydrogen, an optionally substituted radical selected the group consisting of: acyl; carbamoyl; arylalkyl; phenyl, 8- to 10-membered aryl; $C_{1-12}$ aliphatic; $C_{1-12}$ heteroaliphatic; 5- to 10-membered heteroaryl; or 4- to 7-membered heterocyclyl.

Embodiment 45

The method of any one of Embodiments 34-42, wherein the second catalyst is an activated monomer reagent of the formula:

$$A(Q(R^{act})_3)\cdot B(X^+\cdot Y^-),$$

where:
Q is an atom selected from aluminum and boron;
A is less than B, and A and B are integers between 1 and 10 inclusive;
$R^{act}$ is selected from $C_{1-6}$ alkyl and optionally substituted aryl
X is selected from the group consisting of: Na, $N((CH_2)_3CH_3)_4$, $N((CH_2)_7CH_3)_4$, $P((CH_2)_3CH_3)_4$; and
Y is selected from the group consisting of: $O-CH_2(CH_3)_2$, Cl, Br, and $N_3$.

Embodiment 46

The method of any one of Embodiments 34-43, wherein a second catalyst is an imidazole or a phosphazene reagent selected from the group consisting of:

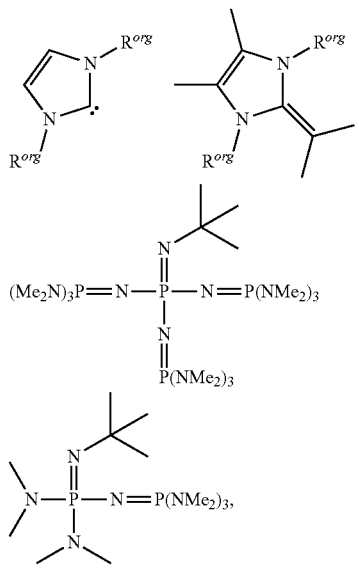

wherein:
$R^{org}$ is independently hydrogen, an optionally substituted radical selected the group consisting of acyl; carbamoyl; arylalkyl; phenyl, 8- to 10-membered aryl; $C_{1-12}$ aliphatic; $C_{1-12}$ heteroaliphatic; 5- to 10-membered heteroaryl; or 4- to 7-membered heterocyclyl.

Embodiment 47

The method of any one of Embodiments 34-42, wherein a second catalyst is a double metal cyanide of the formula:

$$M^1[M^2(CN)_6]L_\alpha,$$

wherein:
$M^1$ is Zn;
$M^2$ is selected from Fe and Co;
L is an alcohol;
α is an integer between 1 and 10 inclusive; and
$R^{coo}$ is independently hydrogen, an optionally substituted radical selected the group consisting of acyl, carbamoyl, arylalkyl, phenyl, 8- to 10-membered aryl, $C_{1-12}$ aliphatic, $C_{1-12}$ heteroaliphatic, 5- to 10-membered heteroaryl, or 4- to 7-membered heterocyclyl.

Embodiment 48

The method of any one of Embodiments 34-42, wherein a second catalyst is a metal alkoxide of the formula:

$$M^3(OR^{coo})_\beta$$

wherein:
$M^3$ is Zn, Al, or Ti;
β is 2 when $M^1$ is Zn;
β is 3 when $M^1$ is Al;
β is 4 when $M^1$ is Ti; and
$R^{coo}$ is independently hydrogen, an optionally substituted radical selected the group consisting of acyl, carbamoyl, arylalkyl, phenyl, 8- to 10-membered aryl, $C_{1-12}$ aliphatic, $C_{1-12}$ heteroaliphatic, 5- to 10-membered heteroaryl, or 4- to 7-membered heterocyclyl.

Embodiment 49

The method of any one of Embodiments 34-42, wherein a second catalyst is selected from the group consisting of:

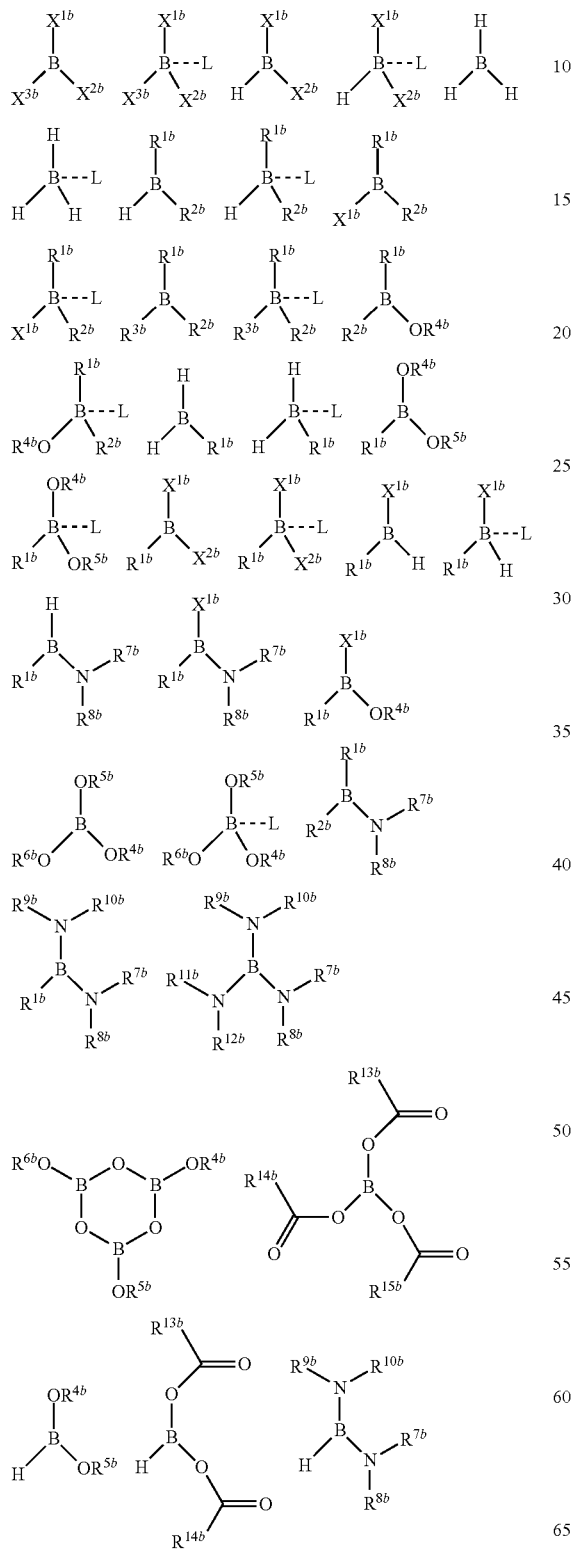
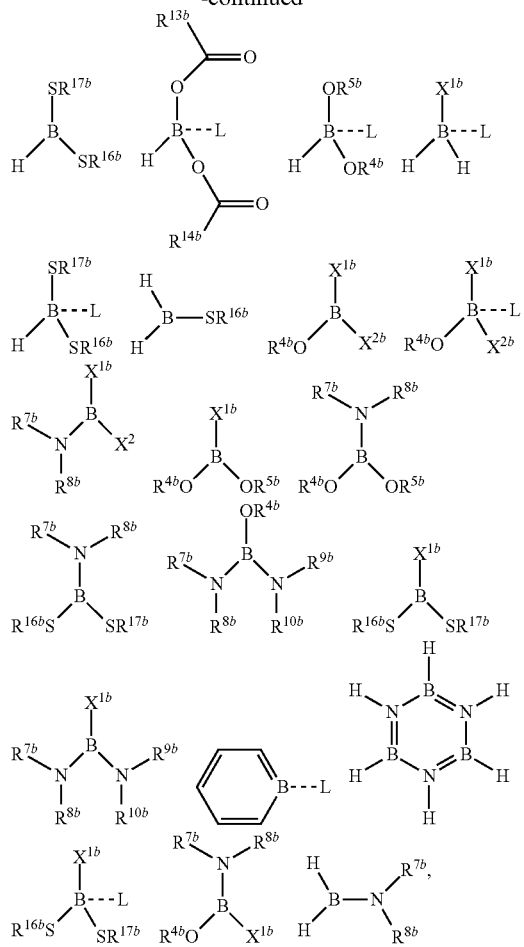

wherein:
each occurrence of $X^{1b}$, $X^{2b}$, and $X^{3b}$ is independently Cl, Br, I, or F;
each occurrence of $R^{1b}$, $R^{2b}$, and $R^{3b}$ is independently an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein any of $R^{1b}$ and $R^{2b}$ can be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;
each occurrence of $R^{4b}$, $R^{5b}$, $R^{6b}$, $R^{7b}$, $R^{8b}$, $R^{9b}$, $R^{10b}$, $R^{11b}$, $R^{12b}$, $R^{13b}$, $R^{14b}$, $R^{15b}$, $R^{16b}$, and $R^{17b}$ is independently hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein ($R^{4b}$ and $R^{5b}$), ($R^{7b}$ and $R^{8b}$), ($R^{9b}$ and $R^{10b}$), ($R^{11b}$ and $R^{12b}$), ($R^{7b}$ and $R^{9b}$), and ($R^{16b}$ and $R^{17b}$) can independently be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;

and L is a ligand.

Embodiment 50

The method of any one of Embodiments 34-42, wherein a second catalyst is selected from the group consisting of: $Y(OTf)_3$, $Zn(OTf)_2$, $Ga(OTf)_3$, $Al(OTf)_3$, $(nBu)_2B(OTf)$, $BF_3 \cdot OEt_2$, $BCl_3$, $P(C_6F_5)_3$, $Cu(BF_4)_2$, $[2,4,6-(CH_3)_3C_6H_2]_2BF$, $(CF_3SO_2)_2NH$, $Ph_3B+P_1$-$^tBu$, $Et_3B+P_1$-$^tBu$, and $B(C_6F_5)_3$.

Embodiment 51

The method of any one of Embodiments 34-42, wherein a second catalyst is selected from the group consisting of: $BF_3 \cdot OEt_2$, $Cu(BF_4)_2$, and $B(C_6F_5)_3$.

Embodiment 52

The method of any one of Embodiments 34-42, wherein a second catalyst is $B(C_6F_5)_3$.

Embodiment 53

The method of any one of Embodiments 34-42, wherein a second catalyst is a metallosalenate that catalyzes homopolymerization of epoxides and comprises the structure:

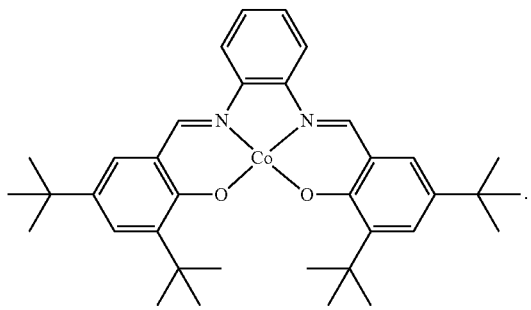

Embodiment 54

The method of any one of Embodiments 34-53, wherein step i) is performed at a temperature of between about 20° C. to about 50° C.

Embodiment 55

The method of any one of Embodiments 34-54, wherein step i) is performed a pressure of 30 psi and about 400 psi.

Embodiment 56

The method of any one of Embodiments 34-55, wherein step ii) is performed at a temperature of between about 20° C. to about 50° C.

Embodiment 57

The method of any one of Embodiments 34-56, wherein A is characterized in that it comprises greater than 80%, 90%, 95%, 98%, or 99% carbonate linkages relative to the total number of monomer linkages formed during copolymerization of A (i.e., exclusive of a chain transfer agent).

Embodiment 58

The method of any one of Embodiments 34-57, wherein A is characterized in that it comprises essentially no ether linkages.

EXAMPLES

The following Examples are useful to confirm aspects of the disclosure described above and to exemplify certain embodiments of the disclosure.

Example 1: Effects of Catalysts on Triblock Copolymer Polymerization and Polypropylene Glycol End-Blocking of a Polycarbonate Homopolymer Starter Preparation of Polypropylene Carbonate (PPC) Polyol PPC polyol was first prepared using neopentyl glycol (NPG) as a starter and a cobalt salen catalyst (see, e.g., catalysts and methods disclosed in WO 2010/022388 and WO 2010/028362) and the product was isolated as a highly viscous liquid. The number average molecular weight, $M_n$, calculated from $^1$H-NMR spectra was 710 Da. The measured American Public Health Association (APHA) color value, a measurement of liquid color, was 84.2. A stock solution of the PPC homopolymer was prepared in dry toluene (0.53 g polyol/g solution).

Preparation of B-A-B Polyol: PPG End-Blocking of PPC Core 4.1 g of the above-described PPC homopolymer stock solution was added to a dry 3-neck 250 mL round bottom flask, containing 12 mL dry toluene, equipped with stir bar and thermocouple probe, and immersed in an ice-cooled water bath (about 5-7° C.). 1.5 mL of propylene oxide (PO) was added using an Eldex pump at a flow rate of 1.5 mL/min. The resulting solution was stirred for 15 min to achieve homogeneity. Separately, a desired catalyst was weighed in a glovebox and dissolved in suitable solvent (or mixture of solvents). The catalyst solution was transferred to the reaction flask via cannula. The polymerization of PO was observed by a rise in reaction temperature. After the solution cooled down, the remaining PO was added at a desired rate. After about 20 h, the reaction was terminated by adding 100 µL hypophosphorous acid solution (50% w/v in $H_2O$) dissolved in 2 mL of acetone. The solution was passed through basic alumina and the solvent was removed under rotatory evaporation followed by high-vacuum Schlenk line at 70° C. and at 100 mTorr pressure for 30 min to 1 h to provide a colorless viscous oil.

Calculating PPG End-Blocking Efficiency of PPC

Figure 1B:
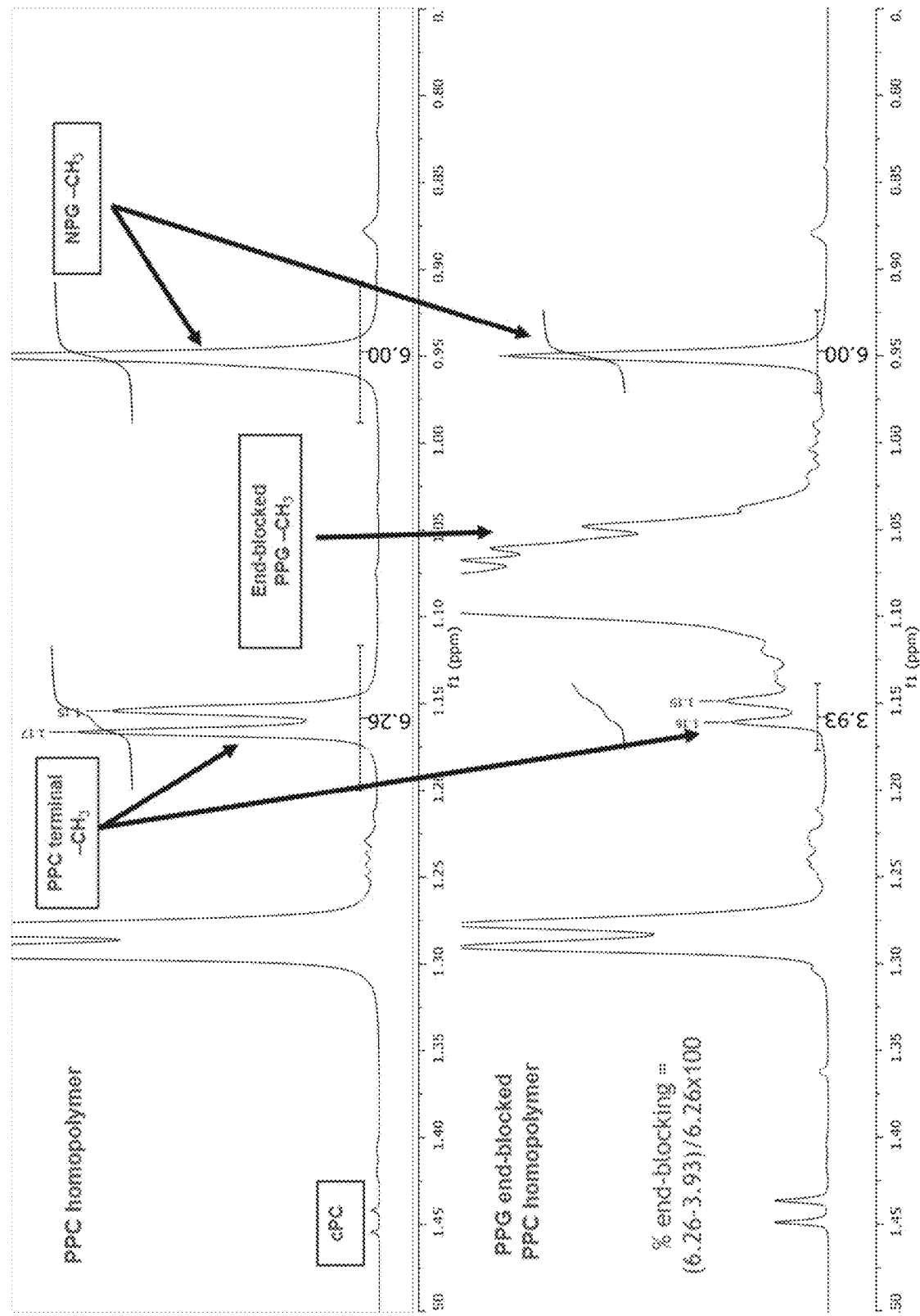

In $^1$H-NMR spectra, terminal methyl protons of PPC appeared at 1.18 ppm as a doublet. Upon end-blocking with PPG the area under that peak was reduced proportionately. Therefore, end-blocking efficiency was calculated from the peak area reduction. Since NPG methyl protons appearing at 0.97 ppm did not change during the process of end-blocking, it was used as an internal standard (FIGS. 1A and 1B).

End-Blocking Efficiency for Different PPG Polymerization Catalysts

Figure 2:
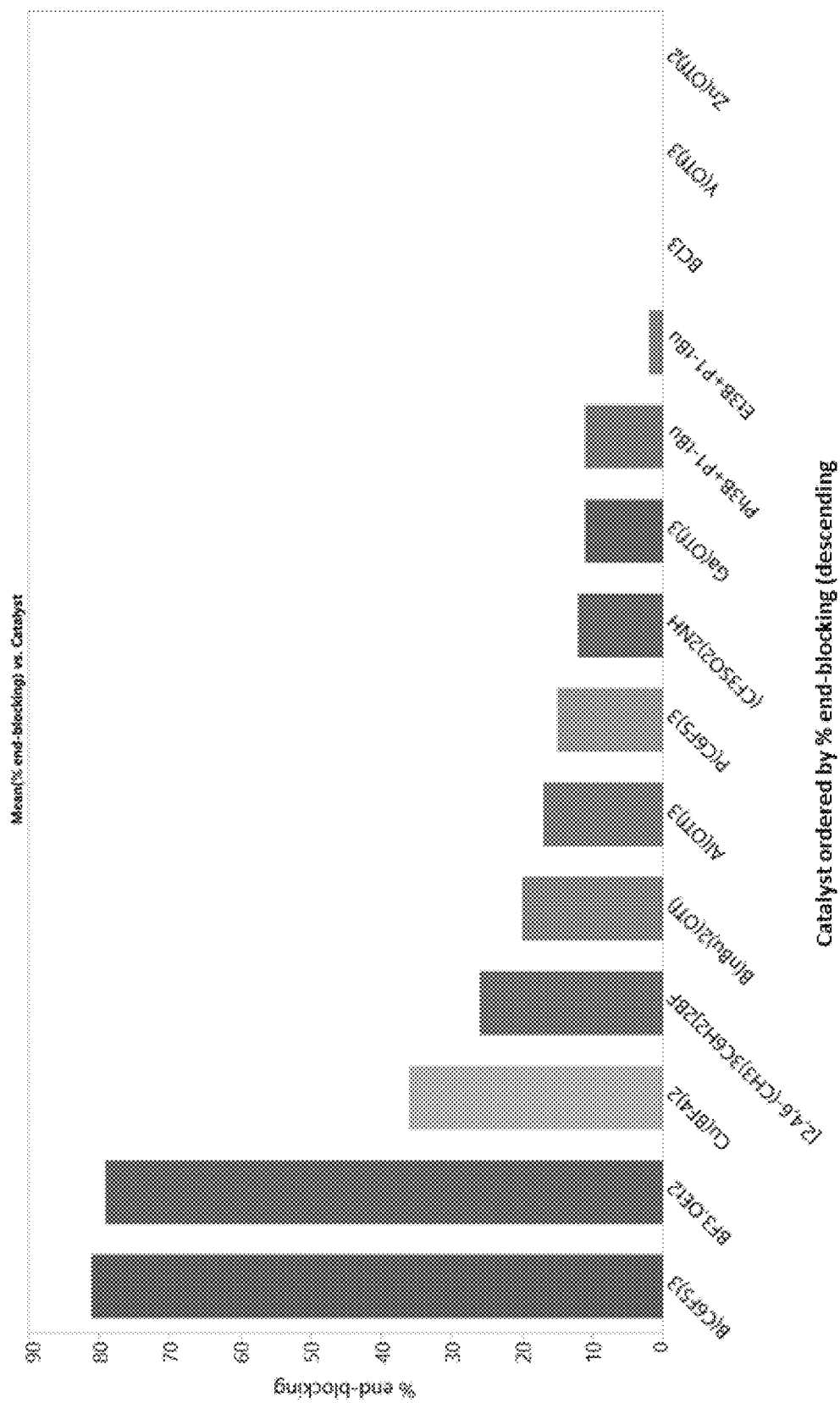
FIG. 2. PPG end-blocking efficiency of PPC using different catalysts. Highly Lewis acidic catalysts such as $BF_3 \cdot OEt_2$ and $B(C_6F_5)_3$ demonstrated effective PPG end-blocking of PPC.

Below, Table 1 summarizes the use of different catalysts to obtain PPG end-blocked PPC under similar reaction conditions (see also FIG. 2). Catalysts included in Table 1 were handled in a nitrogen filled glovebox or with air-free techniques. Borane catalysts $BF_3.OEt_2$ and $B(C_6F_5)_3$ demonstrated the ability to function as catalysts for PPG end-blocking of PPC. However, $BF_3.OEt_2$ exhibited a lower exotherm than $B(C_6F_5)_3$— about 5° C. versus 15° C., respectively. Additionally, for $BF_3.OEt_2$ the exotherm was observed immediately after catalyst addition. However, $B(C_6F_5)_3$ demonstrated about a 25 min induction period to initiate propylene oxide homopolymerization with higher catalytic activity (higher [PPC]:[Cat] ratio).

Example 1b: Preparation of A-B-A Block Copolymer Polyol

PPC block copolymer A-B-A was prepared as described in Example 1, but a 1,000 Da PPG diol was used as the starter instead of neopentyl glycol. See, for example, WO 2010/028362 and WO 2010/062703, each of which is incorporated herein by reference.

Example 2: Preparation of Polypropylene Glycol End-Blocked Polypropylene Carbonate (Example B-A-B Block Copolymer) Using $B(C_6F_5)_3$ and Characterization of the Same PPG End-Blocking of PPC Core Using $B(C_6F_5)_3$.

PPC homopolymer was first prepared using neopentylglycol (NPG) as a starter and a cobalt salen catalyst (see, e.g., catalysts and methods disclosed in WO2010/022388 and WO2010/028362). The titrated OH # was calculated to be 117.5. The average molecular weight, $M_n$, was calculated from the OH # and determined to be 955 Da. A stock solution of PPC homopolymer was prepared in dry toluene (1.013 g/g of toluene).

PPC stock solution (40 g) was added to a dry 3-neck 250 mL round bottom flask containing 18 mL dry toluene, equipped with a stir bar and thermocouple probe, and immersed in ice-cooled water bath (10° C.). Propylene oxide (PO, 9 mL), corresponding to about 25-30% of the total amount eventually added, was added using an Eldex pump at a flow rate of 1.5 mL/min. The solution was stirred for 15 min to achieve homogeneity. Separately, $B(C_6F_5)_3$ was weighed in a glovebox and dissolved in 2.5-3.0 mL dry

TABLE 1

| Catalyst | Solvent for Catalyst | [PO]:[PPC]:[Cat.] | PPG produced? | End-blocking Efficiency (%) |
|---|---|---|---|---|
| $Y(OTf)_3$ | PhMe, MeCN | 757:53:1 | No | 0 |
| $Zn(OTf)_2$ | PhMe (dispersion) | 120:0:1 | No | 0 |
| $Ga(OTf)_3$ | PhMe (dispersion) | 258:10.1:1 | Yes | 11 |
| $Al(OTf)_3$ | $Et_2O$, MeCN | 299:10:1 | Yes | 17 |
| $(nBu)_2B(OTf)$ | $Et_2O$ | 68:5:1 | Yes | 20 |
| $BF_3OEt_2$ | $Et_2O$ | 110:8:1 | Yes | 79 |
| $BCl_3$ | PhMe | 83:5.7:1 | No | 0 |
| $P(C_6F_5)_3$ | PhMe | 149:10:1 | Yes | 15 |
| $Cu(BF_4)_2$ | $Et_2O$, MeCN | 151:7.6:1 | Yes | 36 |
| $[2,4,6-(CH_3)_3C_6H_2]_2BF$ | PhMe | 149:10:1 | Yes | 26 |
| $(CF_3SO_2)_2NH$ | PhMe | 112:9.4:1 | Yes | 12 |
| $Ph_3B + P_1\text{-}^tBu$ | PhMe | 95:6.8:1 | Yes | 11 |
| $Et_3B + P_1\text{-}^tBu$ | $Et_2O$ | 95:6.8:1 | Yes | 2 |
| $B(C_6F_5)_3$ | PhMe | 290:21:1 | Yes | 81 |

Figure 3A:
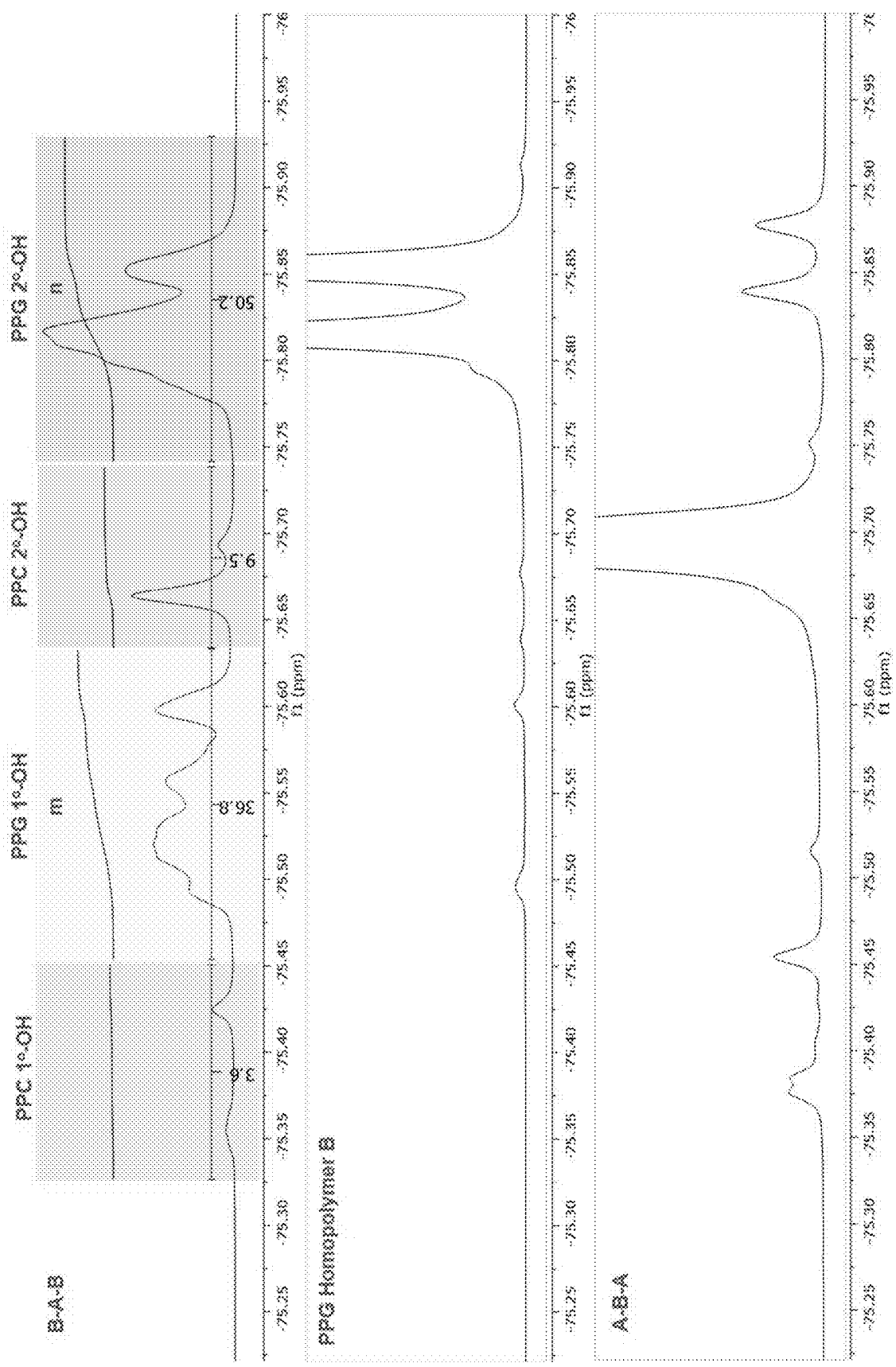
FIGS. 3A and 3B. Exemplary $^{19}$F NMR spectrum of a PPG end-capped PPC triblock co-polymer further derivitized with $(CF_3CO)_2O$. Primary versus secondary hydroxyl end-group content (1°-vs. 2°-OH) can be calculated by derivitizing PPG end-blocked PPCs with $(CF_3CO)_2O$. $(CF_3CO)_2O$ derivatized 1°-OH exhibits downfield $^{19}$F-NMR peaks relative to $(CF_3CO)_2O$ derivatized 2°-OH. Further, because of the electron withdrawing carbonate linkage, PPC 1°-OH exhibits downfield $^{19}$F-NMR peaks relative to PPG 1°-OH.
Figure 3B:
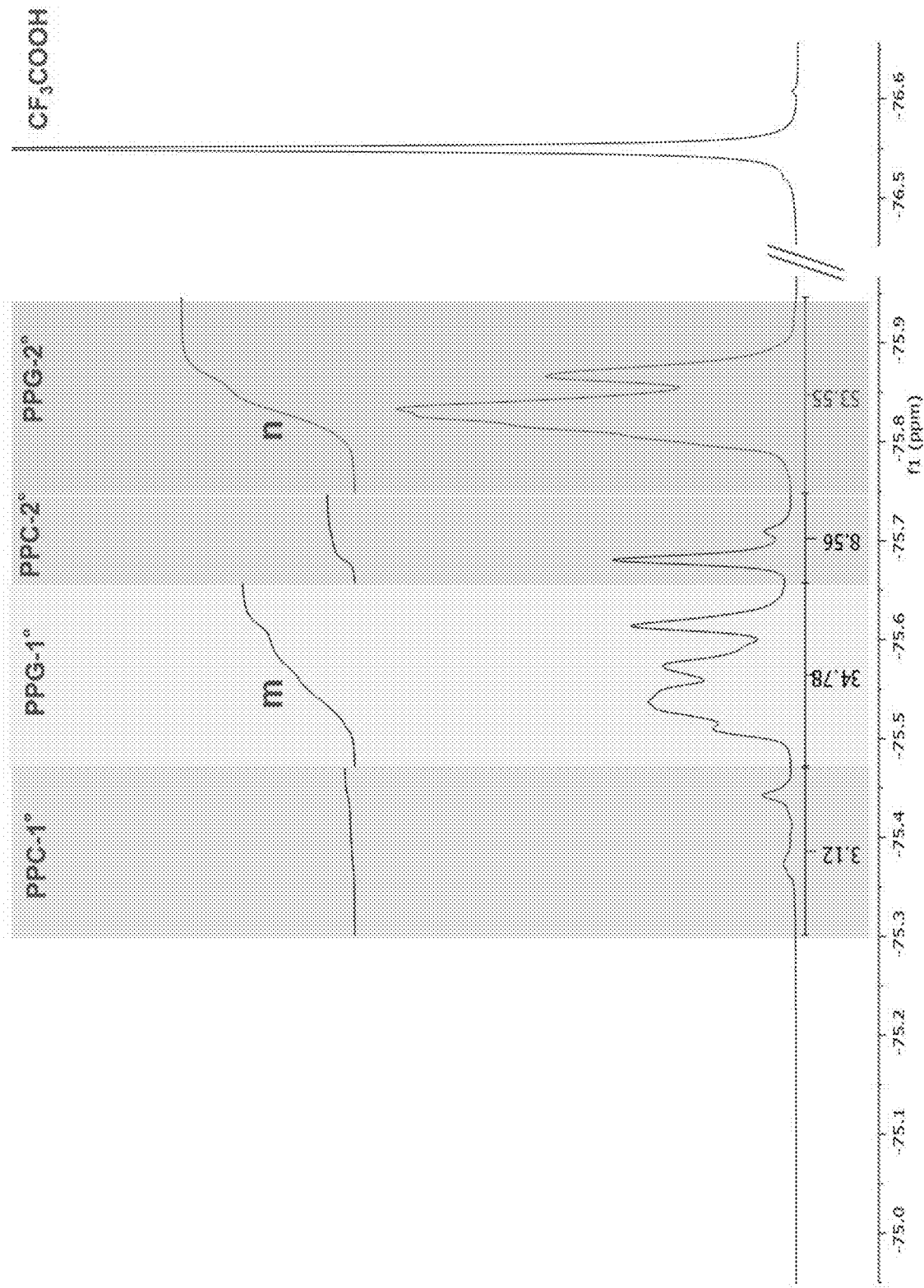
Figure 4:
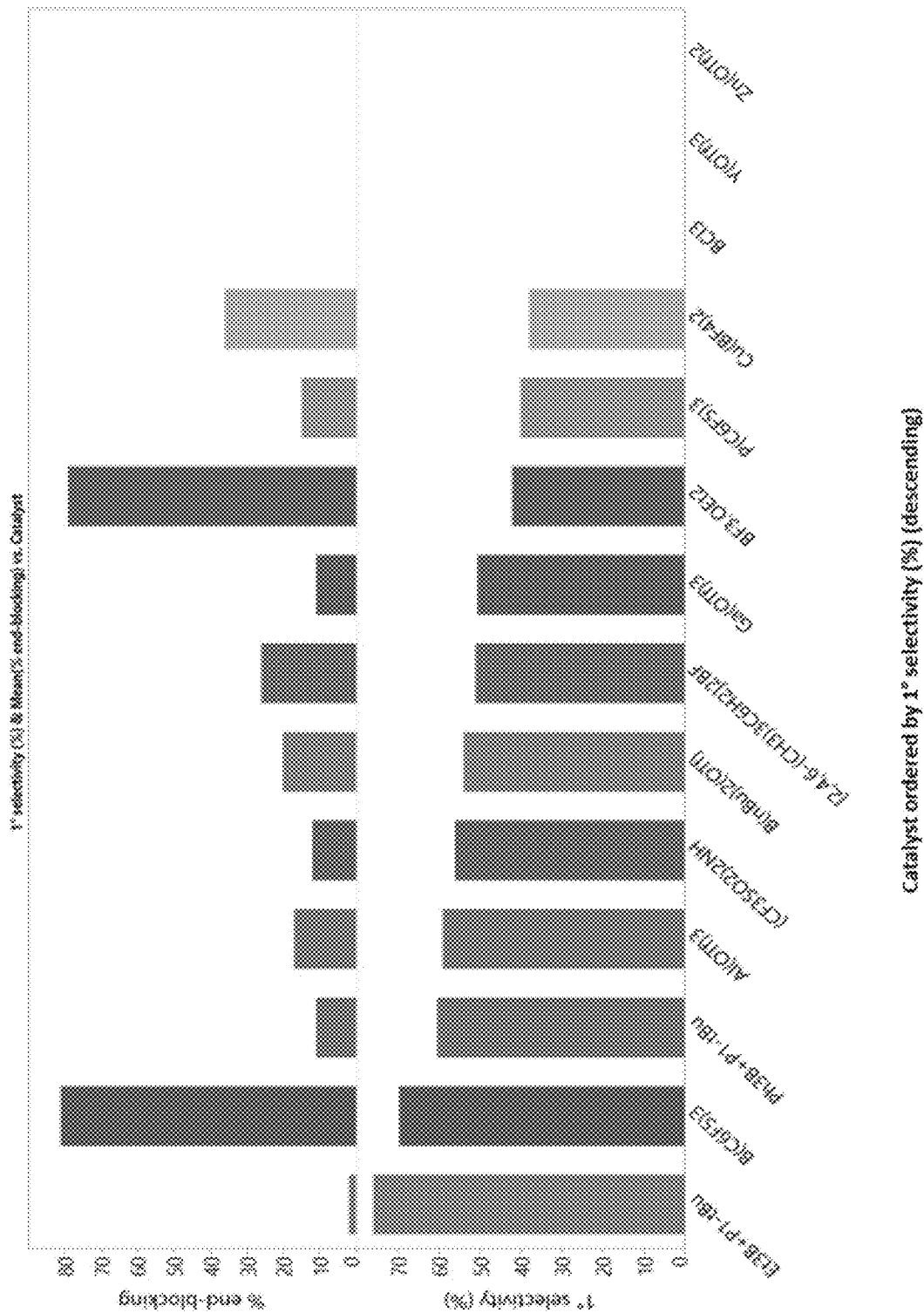
FIG. 4. End-blocking efficiency and primary hydroxyl end-group content selectivity for different catalysts.

Primary Versus Secondary Hydroxyl End-Group Selectivity for Different PPG Polymerization Catalysts Primary versus secondary hydroxyl end-group (1°-vs. 2°-OH) selectivity was determined by reacting PPG end-blocked PPC with $(CF_3CO)_2O$ and determining the 1° vs. 2°-OH amounts from $^{19}$F-NMR (FIGS. 3A and 3B). $(CF_3CO)_2O$ derivatized 1°-OH exhibited $^{19}$F-NMR peaks downfield relative to $(CF_3CO)_2O$ derivatized 2°-OH. Further, because of the electron withdrawing carbonate linkage, PPC 1°-OH exhibited downfield $^{19}$F-NMR peaks relative to PPG 1°-OH. Below, Table 2 summarizes the selectivity of different catalysts toward 1° versus 2°-OH (see also FIG. 4).

TABLE 2

| Catalyst | 1°-OH (m) (%) | 2°-OH (n) (%) | Total 1°-OH (%) | Total 2°-OH (%) | 1° selectivity m/(m + n) × 100 |
|---|---|---|---|---|---|
| $Ga(OTf)_3$ | 29.71 | 29.01 | 35.73 | 64.27 | 50.60 |
| $Al(OTf)_3$ | 22.72 | 15.72 | 31.28 | 68.72 | 59.10 |
| $BF_3OEt_2$ | 36.76 | 50.38 | 40.65 | 59.35 | 42.18 |
| $(nBu)_2B(OTf)$ | 25.91 | 22.06 | 35.25 | 64.75 | 54.01 |
| $P(C_6F_5)_3$ | 5.44 | 8.16 | 18.75 | 81.25 | 40.0 |
| $Cu(BF_4)_2$ | 28.99 | 47.39 | 42.63 | 57.37 | 37.95 |
| $[2,4,6-(CH_3)_3C_6H_2]_2BF$ | 27.52 | 26.37 | 37.82 | 62.18 | 51.07 |
| $(CF_3SO_2)_2NH$ | 8.5 | 6.67 | 23.72 | 76.28 | 56.03 |
| $Ph_3B + P_1\text{-}^tBu$ | 7.97 | 5.21 | 24.07 | 75.93 | 60.47 |
| $Et_3B + P_1\text{-}^tBu$ | 13.14 | 4.13 | 31.7 | 68.3 | 76.08 |
| $B(C_6F_5)_3$ | 55.78 | 24.29 | 59.31 | 40.69 | 69.66 | toluene in a dry 1-neck 15 mL round-bottomed flask. The catalyst solution was then transferred to the reaction flask via cannula. The reaction mixture was stirred until a rise in reaction temperature was observed, indicating that the PO polymerization had started.

After the solution cooled back down to 10° C., the remaining PO was added (at a rate of 0.4 mL/min). The reaction was stirred for 30 min then quenched by adding 75 µL hypophosphorous acid solution (50% w/v in $H_2O$) dissolved in 2 mL of acetone. Kyowaad 600 (360 mg) was added to the reaction mixture and stirred at 65° C. for 1 hr. The solution was filtered through 1 µm nylon filter. The solvent was evaporated under reduced pressure followed by high-vacuum Schlenk line at 90° C. and at 100 mTorr pressure for 4 h. The final polyol was obtained as a colorless oil.

Figure 5:
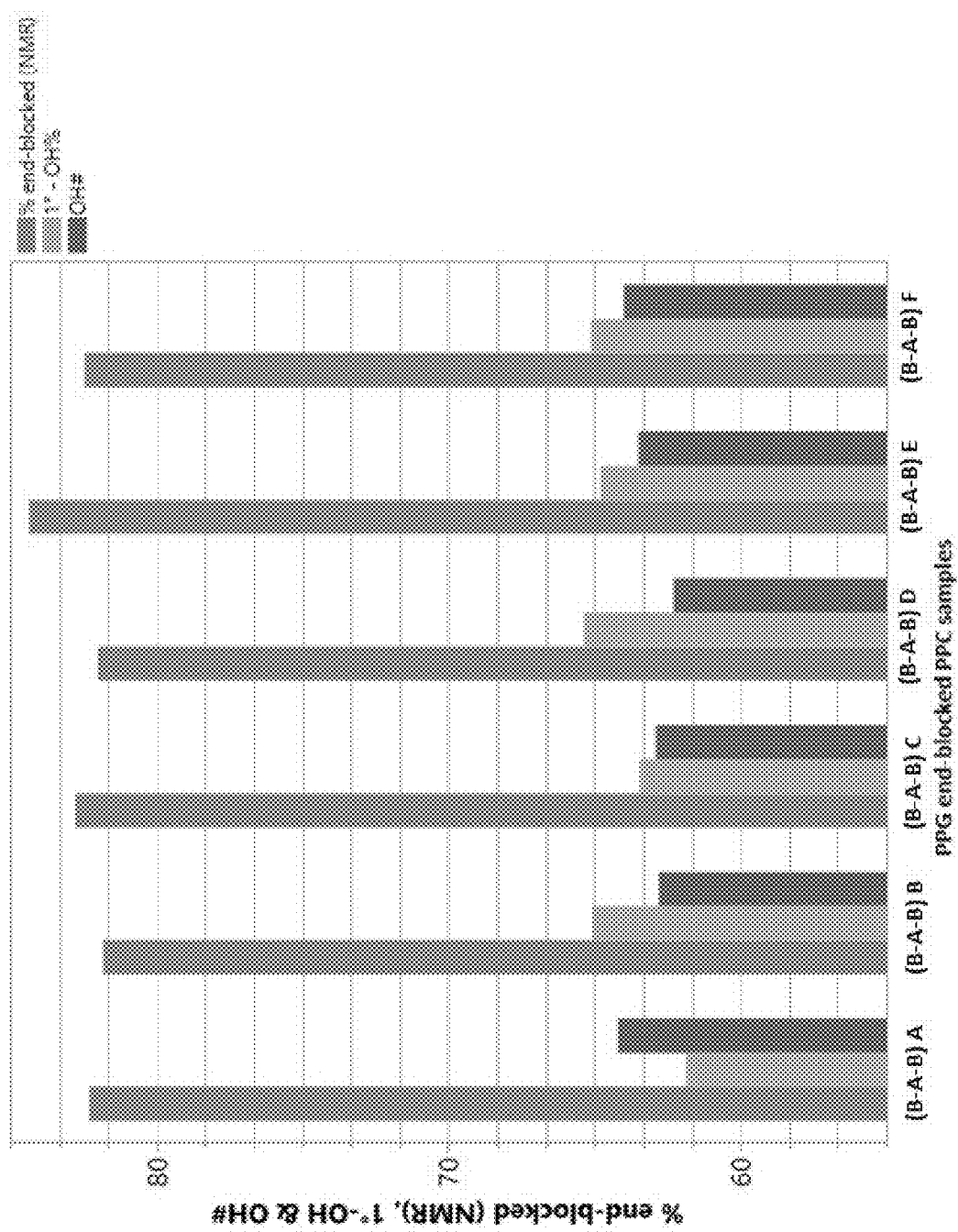
FIG. 5. End-blocking efficiency, primary hydroxyl end-group content, and OH # for different batches of PPG end-blocked PPC ((B-A-B) polymers A-F) synthesized using $B(C_6F_5)_3$ as a catalyst in the PPG homopolymerization step.
Figure 6:
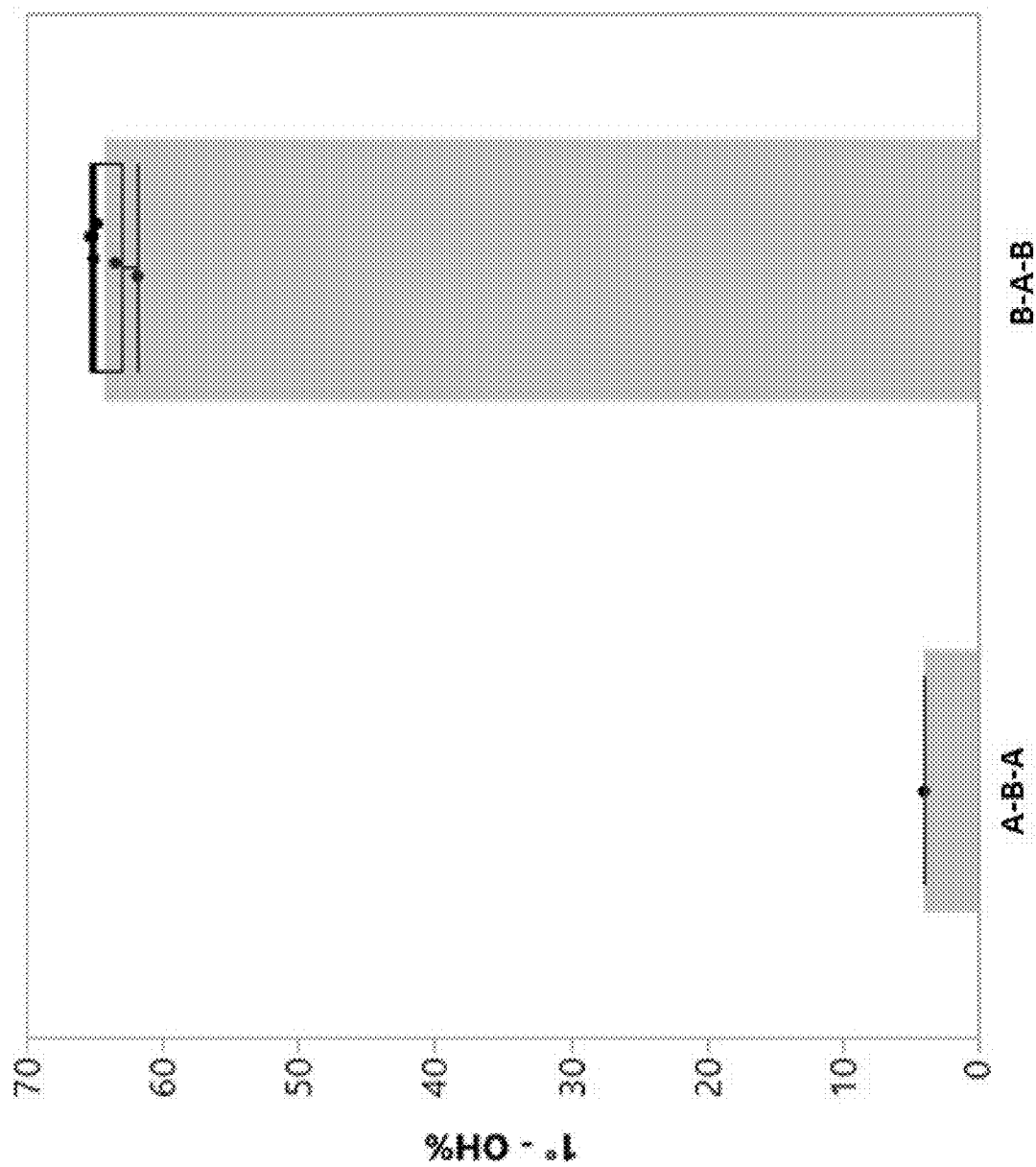
FIG. 6. Comparative primary hydroxyl end-group content for PPG end-blocked PPC (B-A-B, corresponds to (B-A-B) A-F in FIG. 5) versus a PPC end-blocked PPG (A-B-A).

End-Blocking Efficiency and Primary Hydroxyl End-Group Selectivity Using $B(C_6F_5)_3$ Six different batches of B-A-B polyols A-F) were synthesized and end-blocking efficiency was determined using $^1$H-NMR as described in Example 1. FIG. 5 and Table 3 depict the relation between end-blocking efficiency, primary hydroxyl content 1°-OH, and OH # for the six different batches. For all samples at least ~82% of PPC chains are end-blocked with PPG. FIG. 6 demonstrates that all B-A-B batches have 1°-OH content greater than 63%; this is different than the reference A-B-A copolymer where the end-blocks are PPC and the core is PPG and which only has about 4% 1°-OH content.

TABLE 3

| Copolymer | % End-blocked[1] | % 1° End-groups[2] | OH# (mg KOH/g)[3] |
|---|---|---|---|
| B-A-B A | 82.3 | 61.9 | 64 |
| B-A-B B | 81.8 | 65.1 | 63 |
| B-A-B C | 82.8 | 63.5 | 62 |
| B-A-B D | 82 | 65.4 | 62 |
| B-A-B E | 84.4 | 64.8 | 64 |
| B-A-B F | 82.5 | 65.1 | 64 |
| A-B-A | 0 | 5.1 | 58 |

[1]Determined by $^1$H NMR
[2]Determined by $^{19}$F NMR
[3]Determined by titration.

Gel-Permeation Chromatography (GPC) Characterization of B-A-B Copolymers

Figure 7A:
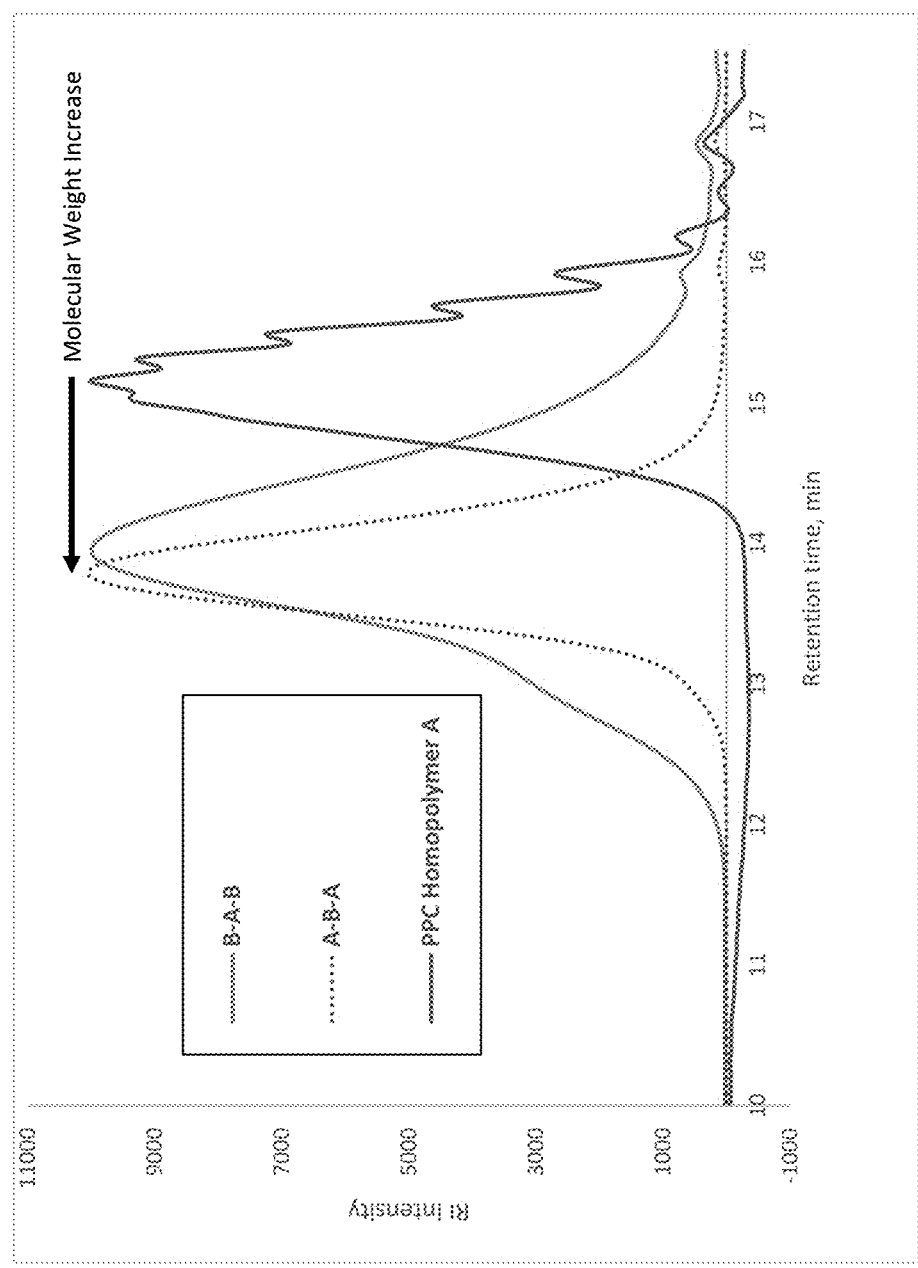
FIGS. 7A and 7B. Gel permeation chromatograms of PPG end-blocked PPC samples (B-A-B) versus various reference samples including PPC homopolymer and PPC end-blocked PPG (A-B-A). Earlier retention time indicates higher molecular weight.
Figure 7B:
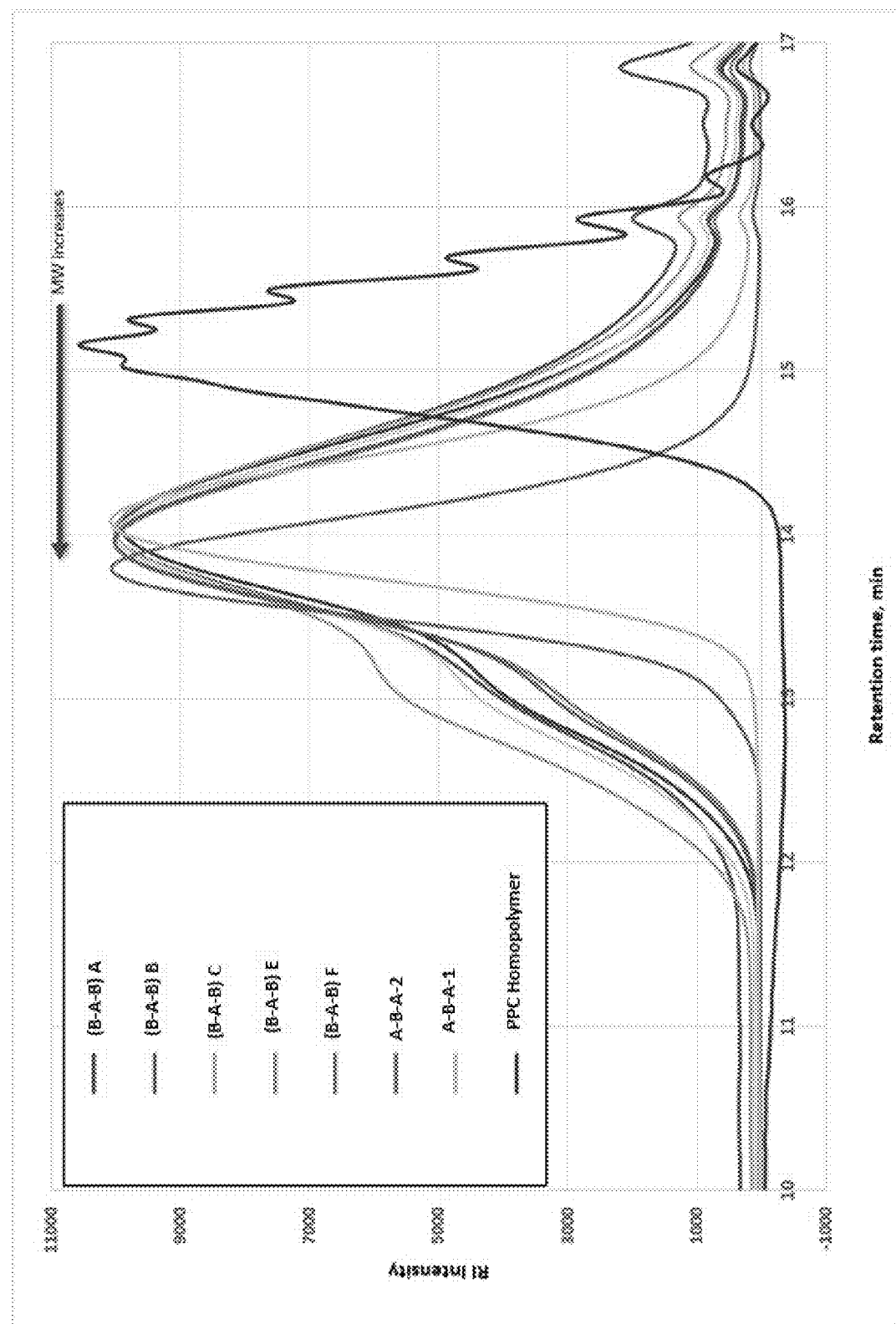

FIGS. 7A and B depict an example gel permeation chromatogram of starter PPC homopolymer (PPC Homopolymer A), a PPG end-capped PPC sample (B-A-B), and PPC end-blocked PPG (A-B-A). The peak for homopolymer PPC (PPC Homopolymer A) shifted to lower retention time after PPG end-blocking of PPC (B-A-B), evidencing an increase in molecular weight. Furthermore, the peak molecular weight of the B-A-B polyol is comparable to the A-B-A polyol, indicating that the molecular weight of the PPC homopolymer increased during the PPG formation. Polydispersity of B-A-B samples were slightly broader versus the A-B-A (1.25 versus 1.1, respectively).

Viscosity Characterization of B-A-B Triblock Copolymers

Figure 8A:
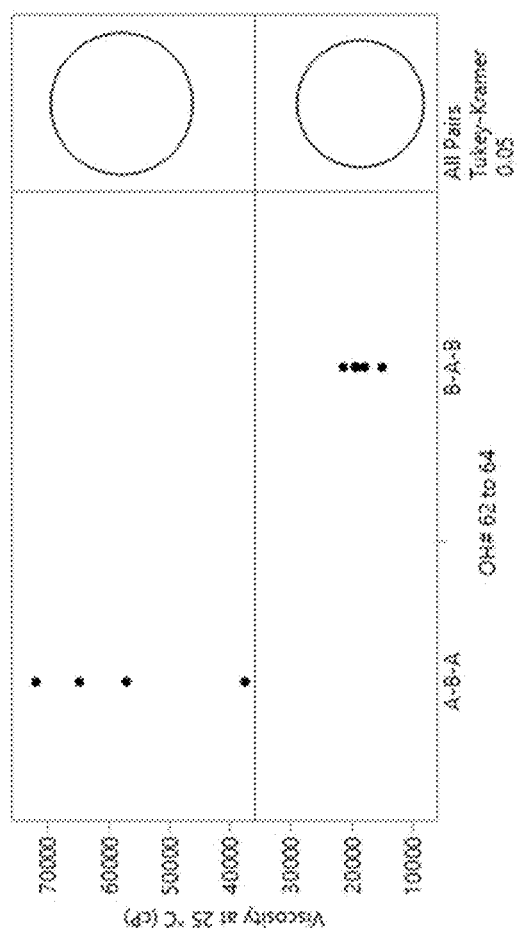
FIGS. 8A, 8B, and 8C. Viscosity of PPG end-blocked PPC samples (B-A-B) versus PPC end-blocked PPG reference samples (A-B-A) at different temperatures (25° C. and 75° C.).
Figure 8B:
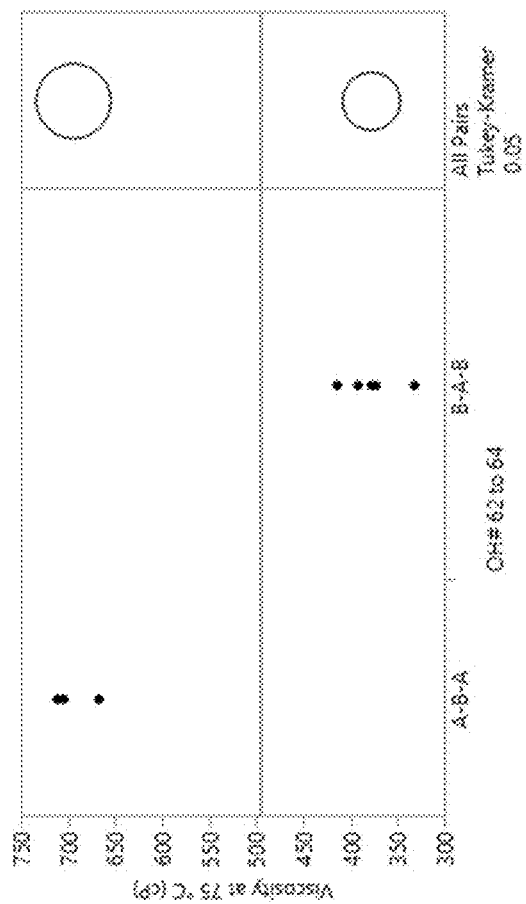
Figure 8C:
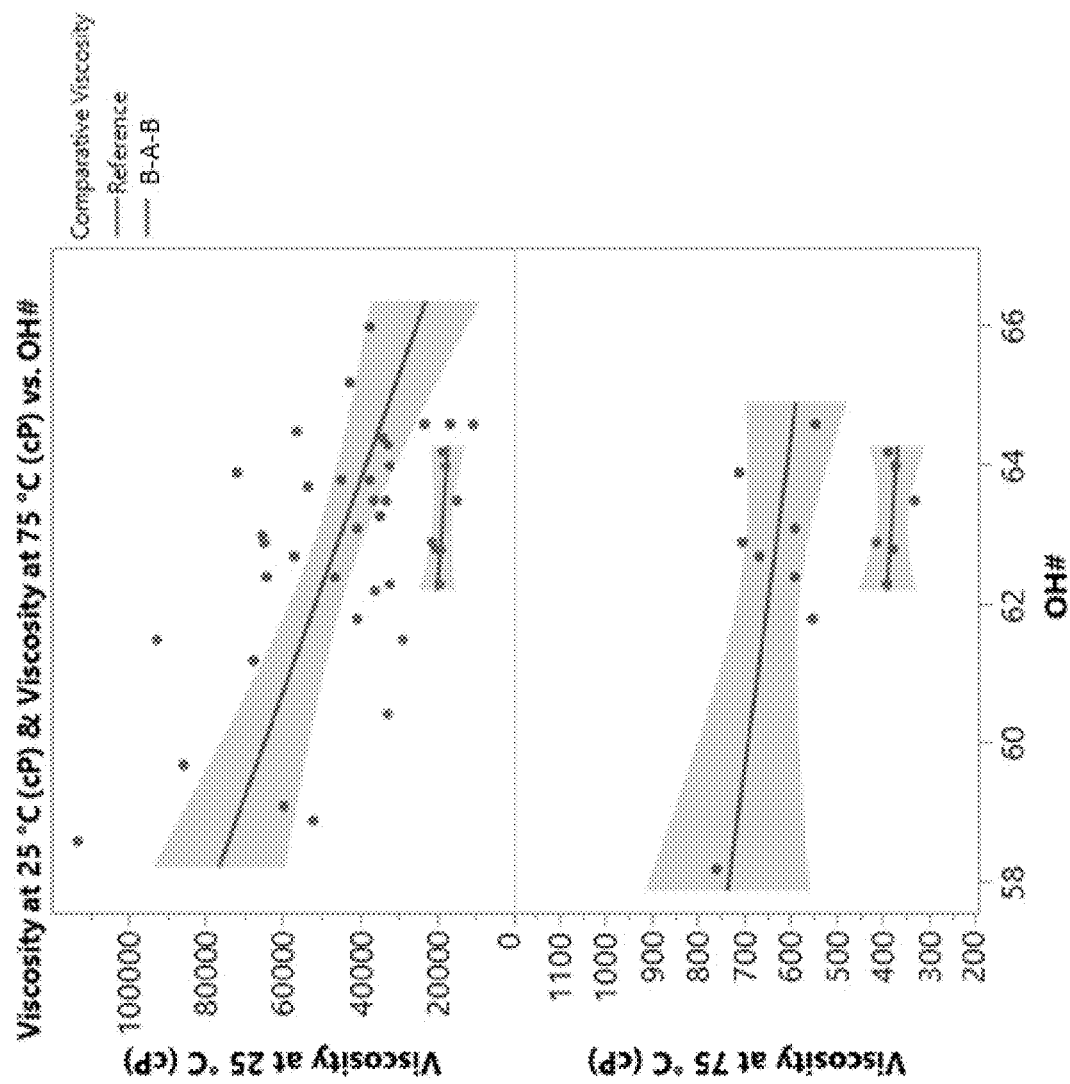

FIGS. 8A-C depict the viscosity, η, profiles of A-B-A and B-A-B polyols. On average, the viscosities of the B-A-B polyols are unexpectedly lower than the A-B-A polyols of comparable molecular weight at both 25 and 75° C.

Thermal Stability Characterization of B-A-B Triblock Copolymers

Figure 9A:
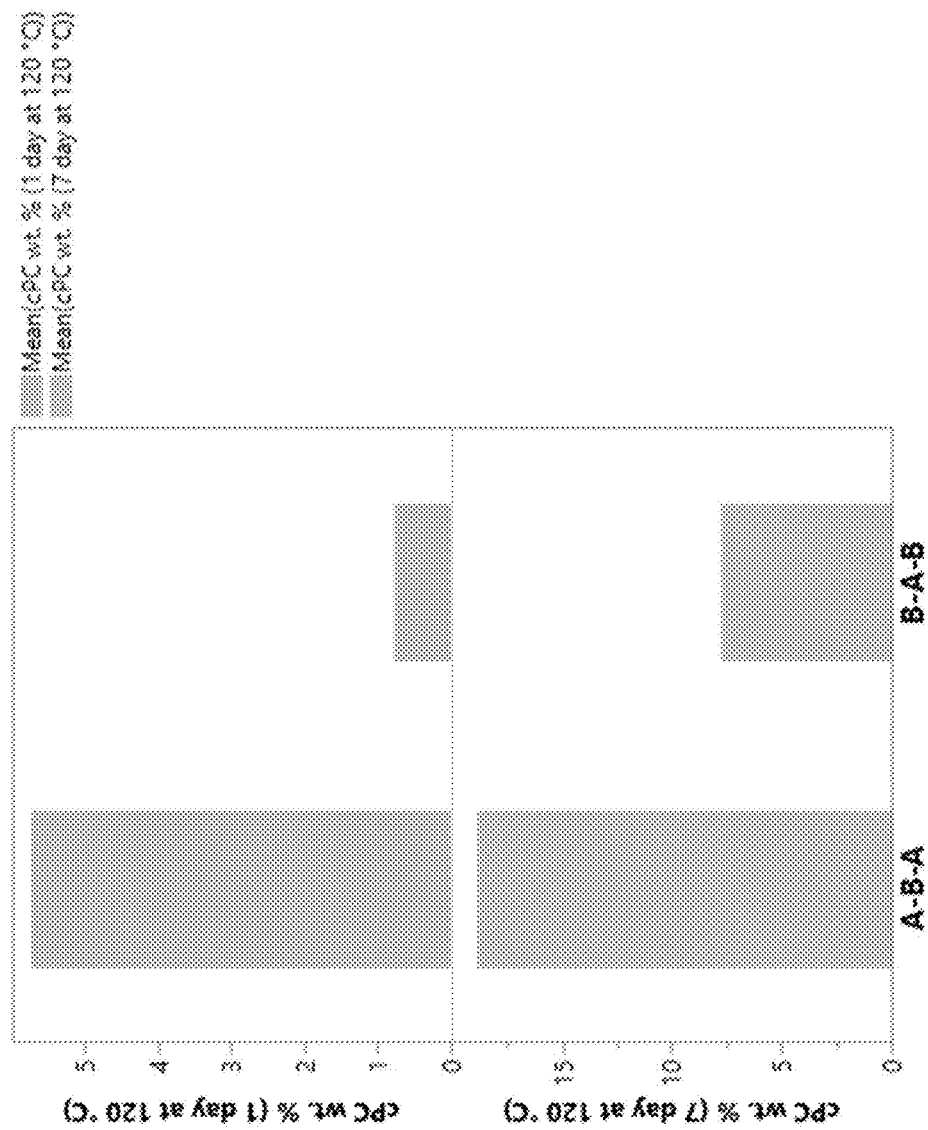
FIGS. 9A and 9B. Thermal stability of PPG end-blocked PPC samples (B-A-B) versus a PPC end-blocked PPG reference sample (A-B-A) after being exposed to heat for different durations of time (1 day and 7 days at 120° C.). The Y-axis represents the amount of cyclic polycarbonate (cPC) after exposure to elevated temperatures and resultant from polymer degradation.
Figure 9B:
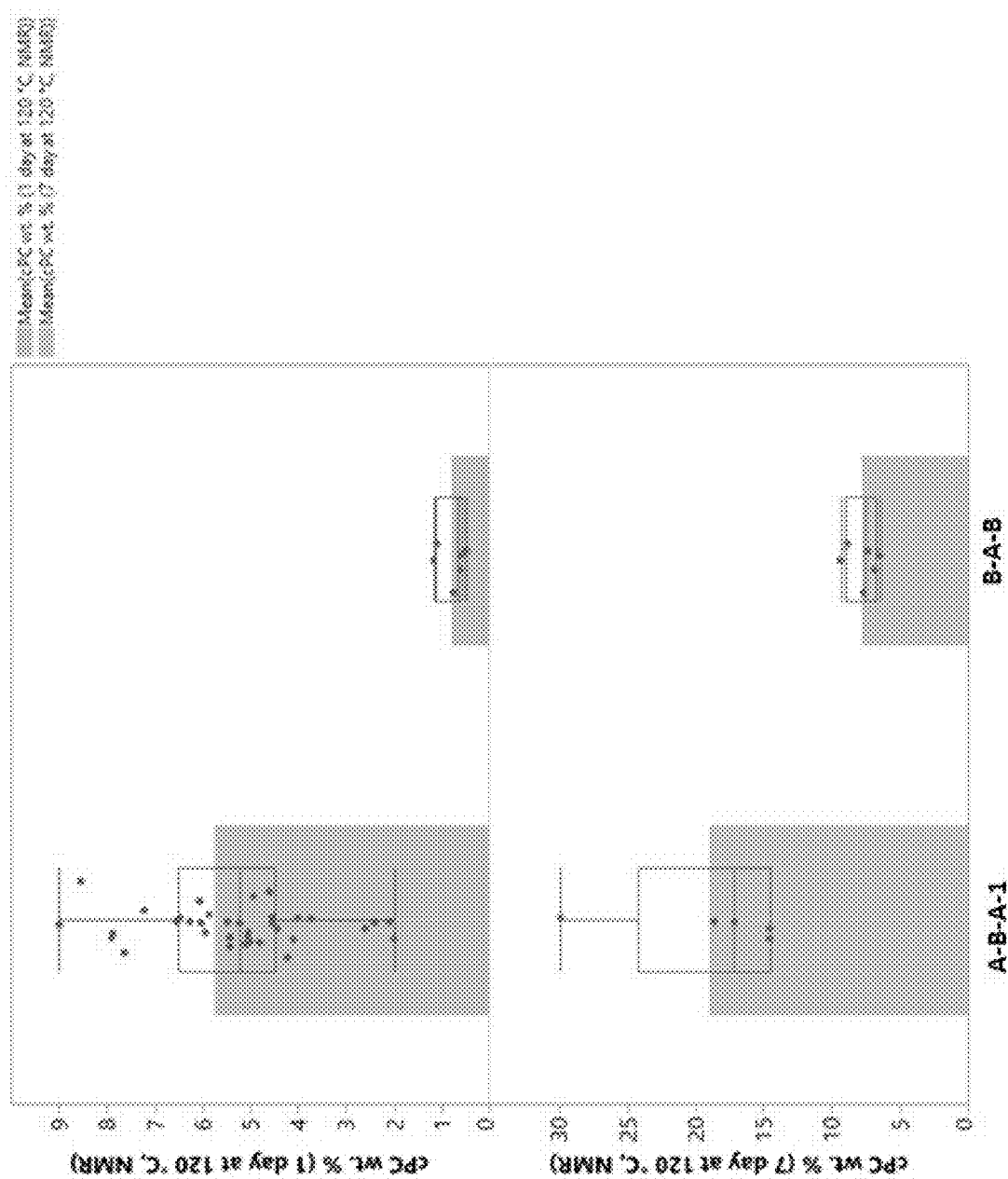

FIGS. 9A-B illustrate the results of thermal stability testing of different polyols at 120° C. after 1 and 7 days. PPC is known to degrade via a back-biting pathway that decreases polyol molecular weight and generates propylene carbonate. Samples subjected to the thermal stability test are analyzed by $^1$H NMR and the amount of propylene carbonate is determined. The more stable the polyol, the less propylene carbonate is generated in this test. As illustrated by FIG. 9, B-A-B polyols degrade less compared to A-B-A polyols.

Figure 10:
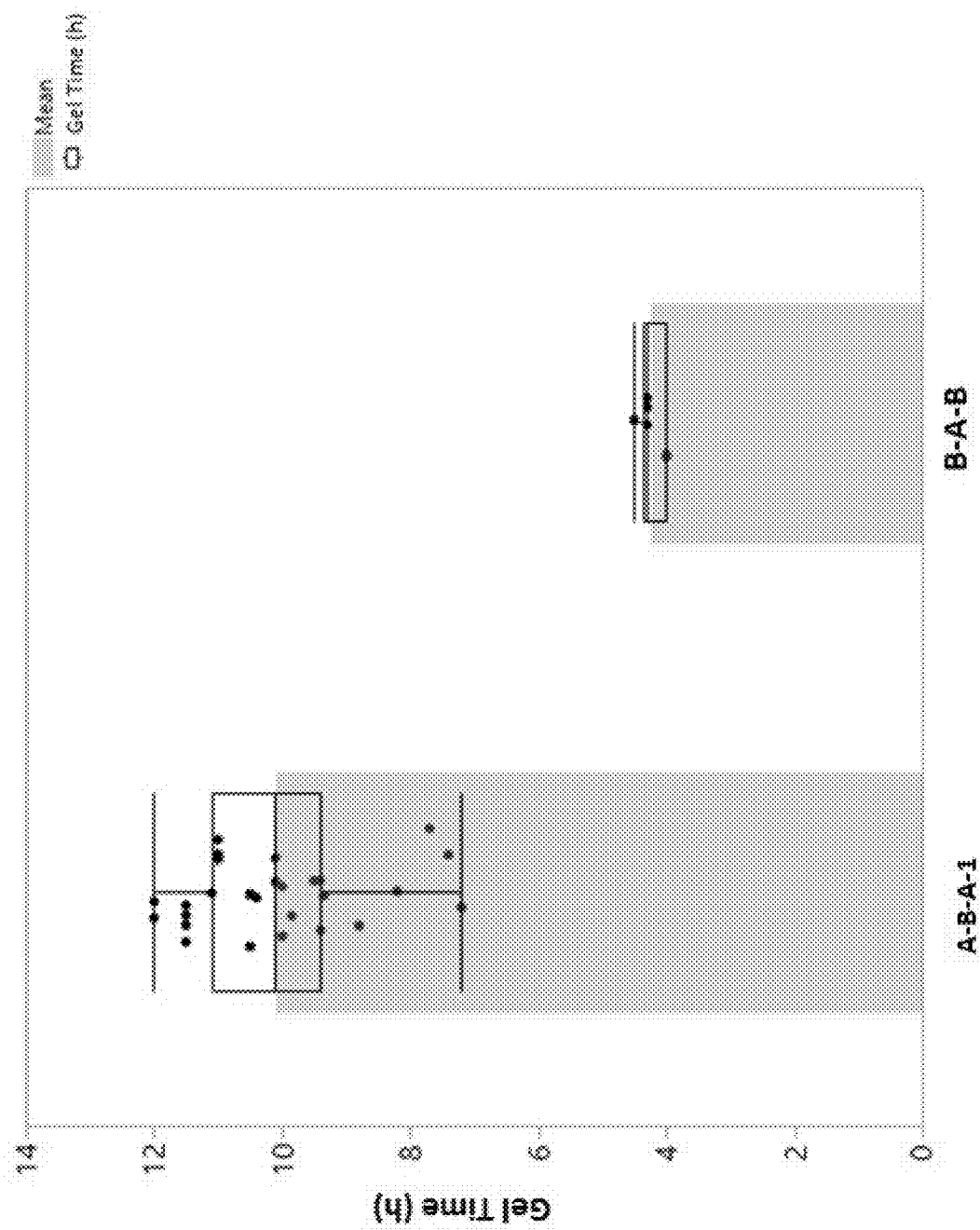
FIG. 10. Isocyanate gel time of PPG end-blocked PPC samples (B-A-B) versus a PPC end-blocked PPG reference sample (A-B-A) using MDI.

FIG. 10 demonstrates the gel time of different B-A-B triblock copolymer samples with MDI. B-A-B triblock copolymer samples exhibit much faster gel time with MDI (less than 5 hours) when compared to A-B-A copolymer Example 3: B-A-B Synthesis_Using $B(C_6F_5)_3$ in an Unquenched Integrated Process A PPC homopolymer was prepared as described in Example 1 using neopentyl glycol as the starter, but at the end of the reaction the polymerization mixture was not terminated (i.e., quenched) with acid and the polyol was not isolated. Instead, the reaction mixture was diluted with dimethyl succinate and the residual propylene oxide was removed via vacuum distillation and nitrogen sparge. The final concentration of the reaction mixture was 0.42 g polyol/g solution and the molecular weight of the polyol was determined to 800 Da (determined by $^1$H NMR spectroscopy).

10.6 g of the PPC homopolymer unquenched stock solution was added to a dry 3-neck 250 mL round bottom flask, containing 10 mL dry DBE-4, equipped with stir bar and thermocouple probe, and immersed in a water bath (at 19° C.). 2 mL of propylene oxide (PO) was added using an Eldex pump at a flow rate of 2 mL/min. The resulting solution was stirred for 15 min to achieve homogeneity. Separately, 44 mg of $B(C_6F_5)_3$ was dissolved in 2 mL dimethyl succinate. The catalyst solution was transferred to the reaction flask via cannula. The polymerization of PO was observed by a rise in reaction temperature to 35.9° C. after 7.5 minutes. After the solution cooled down, the remaining PO was added at 0.75 mL/min for 5 minutes. The reaction was then stirred for 30 minutes. The reaction was terminated by adding 150 µL hypophosphorous acid solution (50% w/v in H2O) dissolved in 2 mL of acetone. A portion of the solution was passed through a 2 cm Kyowaad 600 column. The filtrate was removed via rotatory evaporation, followed by high-vacuum Schlenk line at 100° C. and at 50 mTorr pressure for 4 h. The B-A-B polyol was obtained as a colorless viscous oil. The molecular weight was determined by $^1$H NMR spectroscopy to be 1218 Da. The end-blocking efficacy was calculated to be 44%.

Example 4: B-A-B Synthesis Using $B(C_6F_5)_3$ in a Quenched Integrated Process

The method of Example 3 was followed, but dipropylene glycol was used as the starter instead of neopentyl glycol, and after the dimethyl succinate was added at the end of the PPC homopolymer reaction, 100 µL of hypophosphorous acid solution (50% w/v in water) was added.

The final B-A-B polyol was obtained as a colorless oil and had a molecular weight of 1720 Da (determined by GPC).

Example 5: B-A-B Synthesis Using $BF_3$ in an Unquenched Integrated Process

The method of Example 3 was followed, but the catalyst used was a solution of $BF_3$-ethyl ether complex (150 µL)

dissolved in dimethyl succinate (2 mL). The final molecular weight of the B-A-B polyol was 1310 Da as determined by GPC. The end-blocking efficiency of this polyol was 60% and the primary hydroxyl content was 41%.

Example 6: One-Pot Synthesis of B-A-B

PPC homopolymer is first prepared using propylene oxide in excess in the presence of a cobalt salen catalyst (see, e.g., catalysts and methods disclosed in WO 2010/022388 and WO 2010/028362) and $CO_2$, and the reaction stirred. $CO_2$ pressure and/or the amount of polypropylene carbonate polymer formed is monitored. Once the $CO_2$ pressure is sufficiently diminished, or a suitable amount of polypropylene carbonate is provided, the remaining $CO_2$ is removed and $B(C_6F_5)_3$ is dissolved in 2 mL dimethyl succinate then transferred to the reaction flask via cannula. The reaction stirs for 30 minutes and is terminated by adding 150 μL hypophosphorous acid solution (50% w/v in $H_2O$) dissolved in 2 mL of acetone. A portion of the solution is passed through a 2 cm Kyowaad 600 column. The filtrate is removed via rotatory evaporation, followed by high-vacuum Schlenk line at 100° C. and at 50 mTorr pressure for 4 h.

The invention claimed is:

1. A method of making a block copolymer composition of the formula B-A-B, comprising the steps of:
   i) copolymerizing epoxide and carbon dioxide in the presence of a chain transfer agent and a first catalyst to provide a first polymer A; and
   ii) homopolymerizing epoxide on the chain ends of the first polymer A by addition of a second catalyst to provide a second polymer, B-A-B,
   wherein the first catalyst is a metal salen complex.

2. The method of claim 1, wherein A is an oligomer selected from a polycarbonate or polyethercarbonate chain.

3. The method of claim 1, wherein the epoxide homopolymerized in step ii) is residual epoxide from step i).

4. The method of claim 1, wherein step i) is not quenched until the addition of the second catalyst.

5. The method of claim 1, wherein the reaction is quenched prior to step ii).

6. The method of claim 1, wherein steps i) and ii) are accomplished in the same reactor.

7. The method of claim 1, wherein the first catalyst is a transition metal complex.

8. The method of claim 1, wherein the first catalyst has a structure:

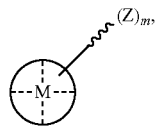

wherein:

⊕ comprises a multidentate ligand;
M is a metal atom; and
⸻〰️$(Z)_m$ represents one or more activating moieties covalently tethered to the multidentate ligand, where ⸻〰️ represents a linker moiety, each Z is an activating functional group, and m represents the number of Z groups present on a linker moiety and is an integer between 1 and 4 inclusive.

9. The method of claim 8, wherein the first catalyst is a metal complex having a structure:

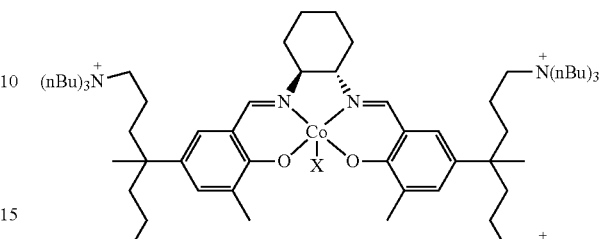

wherein X is a nucleophile capable of ring opening an epoxide.

10. The method of claim 1, wherein the second catalyst is selected from the group consisting of:

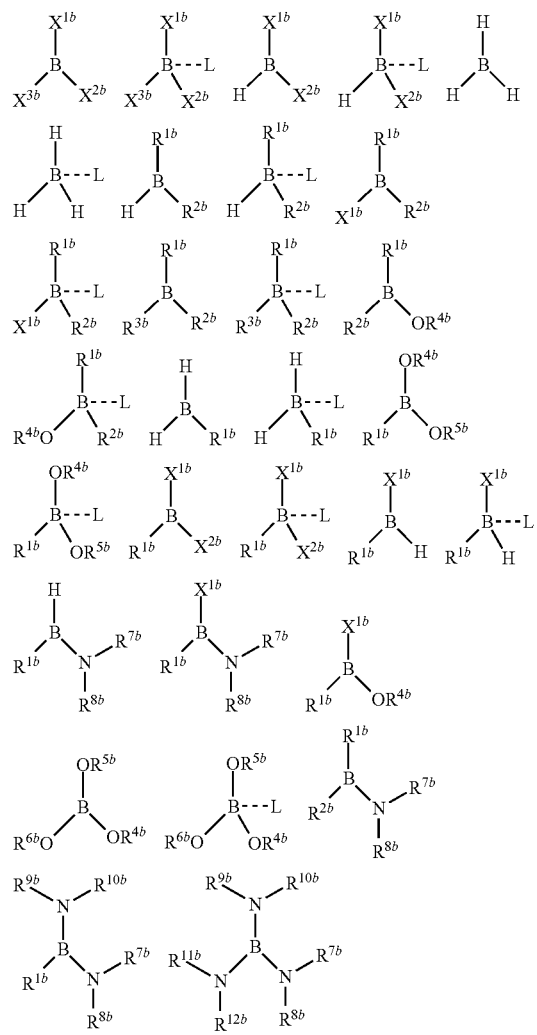

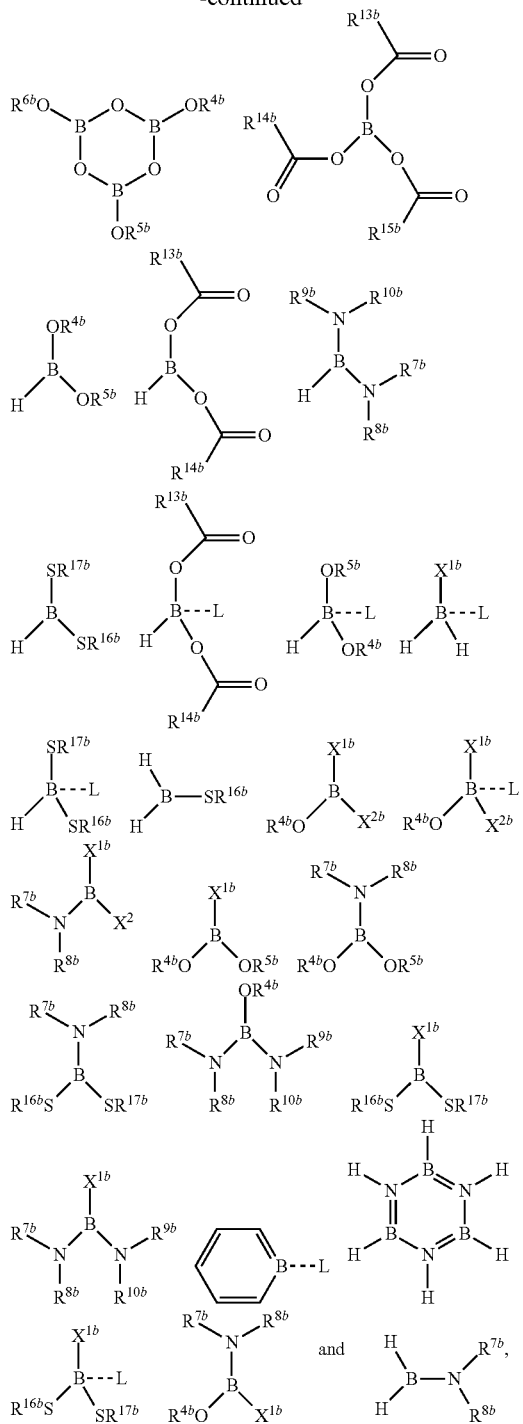

wherein:
each occurrence of $X^{1b}$, $X^{2b}$, and $X^{3b}$ is, independently, Cl, Br, I, or F;

each occurrence of $R^{1b}$, $R^{2b}$, and $R^{3b}$ is, independently, an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein any of $R^{1b}$ and $R^{2b}$ are optionally taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;

each occurrence of $R^{4b}$, $R^{5b}$, $R^{6b}$, $R^{7b}$, $R^{8b}$, $R^{9b}$, $R^{10b}$, $R^{11b}$, $R^{12b}$, $R^{13b}$, $R^{14b}$, $R^{15b}$, $R^{16b}$, and $R^{17b}$ is, independently, hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; wherein ($R^{4b}$ and $R^{5b}$), ($R^{7b}$ and $R^{8b}$), ($R^{9b}$ and $R^{10b}$), ($R^{11b}$ and $R^{12b}$), ($R^{7b}$ and $R^{9b}$) and ($R^{16b}$ and $R^{17b}$) can independently be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;

and L is a ligand.

11. The method of claim 1, wherein a second catalyst is selected from: Y(OTf)$_3$, Zn(OTf)$_2$, Ga(OTf)$_3$, Al(OTf)$_3$, (nBu)$_2$B(OTf), BF$_3$.OEt$_2$, BCl$_3$, P(C$_6$F$_5$)$_3$, Cu(BF$_4$)$_2$, [2,4,6-(CH$_3$)$_3$C$_6$H$_2$]$_2$BF, (CF$_3$SO$_2$)$_2$NH, Ph$_3$B+P$_1$-$^t$Bu, Et$_3$B+P$_1$-$^t$Bu, B(C$_6$F$_5$)$_3$, Yb(OTf)$_3$, Ce(OTf)$_3$, Sc(OTf)$_3$, Lu(OTf)$_3$, Fe(OTf)$_3$, Zr(OTf)$_4$, Hf(OTf)$_4$, Et$_3$B+P$_4$-$^t$Bu, Ph$_3$B+P$_4$-$^t$Bu, or combinations thereof.

12. The method of claim 1, wherein a second catalyst is selected from the group consisting of: BF$_3$.OEt$_2$, Cu(BF$_4$)$_2$, and B(C$_6$F$_5$)$_3$.

13. The method of claim 12, wherein a second catalyst is B(C$_6$F$_5$)$_3$.

14. The method of claim 1, wherein A is characterized in that it comprises greater than 80%, 90%, 95%, 98%, or 99% carbonate linkages relative to the total number of monomer linkages formed during copolymerization of A.

15. The method of claim 1, wherein A is characterized in that it comprises essentially no ether linkages.

* * * * *